(12) United States Patent
Yao et al.

(10) Patent No.: US 12,375,430 B2
(45) Date of Patent: Jul. 29, 2025

(54) METHOD AND DEVICE TO DECOMPRESS DATA PACKETS

(71) Applicant: Huawei Technologies Co., Ltd., Shenzhen (CN)

(72) Inventors: Chuting Yao, Beijing (CN); Ao Guo, Shanghai (CN); Jian Wang, Beijing (CN); Jianhua Yang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/634,668

(22) PCT Filed: Aug. 12, 2020

(86) PCT No.: PCT/CN2020/108732
§ 371 (c)(1),
(2) Date: Feb. 11, 2022

(87) PCT Pub. No.: WO2021/027854
PCT Pub. Date: Feb. 18, 2021

(65) Prior Publication Data
US 2022/0329543 A1 Oct. 13, 2022

(30) Foreign Application Priority Data
Aug. 15, 2019 (CN) .................. 201910755315.X

(51) Int. Cl.
*H04L 49/90* (2022.01)
*H04L 47/28* (2022.01)
(Continued)

(52) U.S. Cl.
CPC .............. *H04L 49/90* (2013.01); *H04L 47/28* (2013.01); *H04L 47/32* (2013.01); *H04L 47/34* (2013.01); *H04L 69/04* (2013.01)

(58) Field of Classification Search
CPC ...................................................... H04L 49/90
See application file for complete search history.

(56) References Cited

U.S. PATENT DOCUMENTS

2016/0142518 A1* 5/2016 Raina .................... H04W 28/06
370/230
2016/0142951 A1* 5/2016 Balasubramanian .......................
H04W 36/0033
370/331

(Continued)

FOREIGN PATENT DOCUMENTS

CN 106357548 A 1/2017
CN 107113291 A 8/2017
(Continued)

OTHER PUBLICATIONS

Catt, "More Details and Simulation Results of Deflate with 1 Byte UDC Header," 3GPP TSG-RAN WG2 #99, Berlin, Germany, Aug. 21-25, 2017, R2-1708358, 7 pages.
(Continued)

*Primary Examiner* — Jackie Zuniga Abad
(74) *Attorney, Agent, or Firm* — Conley Rose, P.C.

(57) ABSTRACT

A communication method includes that a first device deletes a first data packet. The first device sends first signaling to a second device, where the first signaling includes or indicates a first buffer, the first buffer is used to compress a second data packet or used to decompress a compressed second data packet, a serial number of the first data packet and a serial number of the second data packet are consecutive, the serial number of the second data packet follows the serial number of the first data packet, and the second device is a receiving device of the compressed second data packet.

17 Claims, 28 Drawing Sheets

(51) Int. Cl.
    *H04L 47/32*     (2022.01)
    *H04L 47/34*     (2022.01)
    *H04L 69/04*     (2022.01)

(56) References Cited

U.S. PATENT DOCUMENTS

| | | | |
|---|---|---|---|
| 2019/0141567 A1* | 5/2019 | Liu | H04L 69/04 |
| 2019/0141571 A1 | 5/2019 | Kim et al. | |
| 2019/0141773 A1 | 5/2019 | Kim et al. | |
| 2020/0084664 A1 | 3/2020 | Wu | |
| 2020/0344644 A1* | 10/2020 | Liu | H04L 69/04 |

FOREIGN PATENT DOCUMENTS

| | | |
|---|---|---|
| CN | 107113667 A | 8/2017 |
| CN | 108347468 A | 7/2018 |
| CN | 108810984 A | 11/2018 |
| CN | 109802922 A | 5/2019 |
| CN | 110073643 A | 7/2019 |
| WO | 2019093961 A1 | 5/2019 |
| WO | 2019098750 A1 | 5/2019 |
| WO | 2019139376 A1 | 7/2019 |

OTHER PUBLICATIONS

Huawei, HiSilicon, "Discussion on checksum failure handling for UDC," 3GPP TSG RAN2 Meeting #100, R2-1712715, Reno, Nevada, USA, Nov. 27-Dec. 1, 2017, 4 pages.

* cited by examiner

METHOD AND DEVICE TO DECOMPRESS DATA PACKETS

CROSS-REFERENCE TO RELATED APPLICATIONS

This is a U.S. National Stage of International Patent Application No. PCT/CN2020/108732 filed on Aug. 12, 2020, which claims priority to Chinese Patent Application No. 201910755315.X filed on Aug. 15, 2019. Both of the aforementioned applications are hereby incorporated by reference in their entireties.

TECHNICAL FIELD

This application relates to the field of communication technologies, and in particular, to a communication method and a device.

BACKGROUND

In acknowledged mode (acknowledged mode, AM) transmission in a long term evolution (long term evolution, LTE) system, an uplink data compression (uplink data compression, UDC) technology is introduced and implemented at a packet data convergence protocol (packet data convergence protocol, PDCP) layer. The UDC technology is mainly used for some data packets having a large amount of duplicate content, for example, data packets used for transmitting the session initiation protocol (session initiation protocol, SIP) in a voice over LTE (voice over long term evolution, VoLTE) service. In the UDC technology, a difference part between data packets is transmitted, to reduce an amount of data that needs to be transmitted.

Because only the difference part is transmitted, a receive end needs to decompress a compressed data packet based on a previously received data packet. Currently, a transmit end and the receive end each maintain a buffer (buffer). The transmit end places original information of a compressed data packet into the buffer, and compresses a next data packet based on content included in the buffer. When receiving a new compressed data packet, the receive end decompresses the compressed data packet based on content included in the buffer. It can be learned that the content in the buffer of the transmit end needs to be consistent with the content in the buffer of the receive end, to ensure that the receive end implements correct decompression.

A PDCP layer of the transmit end may delete some data packets, and does not send these data packets to the receive end. For example, the PDCP layer of the transmit end sends a compressed data packet 1, a compressed data packet 2, and a compressed data packet 4 to the receive end, but deletes a data packet 3 and does not send a compressed data packet 3 to the receive end. However, a data packet 4 is compressed based on the data packet 3. In other words, the buffer of the transmit end includes the data packet 3. After the receive end receives the compressed data packet 4, because the receive end does not receive the compressed data packet 3, and the buffer of the receive end does not include the data packet 3, an error occurs when the receive end decompresses the compressed data packet 4. In this case, the receive end sends a control (control) protocol data unit (protocol data unit, PDU) to the transmit end, to indicate the decompression error. After the transmit end receives the control PDU, for a data packet that has not been compressed, the transmit end may no longer compress the data packet based on content in the buffer, but compress the data packet based on preset information. Then, after receiving a compressed data packet, the receive end normally decompresses the compressed data packet based on the preset information. However, the receive end unsuccessfully decompresses all compressed data packets received in a time period between a moment at which the receive end finds a decompression failure and a moment at which the receive end receives a data packet that can be correctly decompressed. Consequently, a large quantity of data packets are lost.

SUMMARY

Embodiments of this application provide a communication method and a device, to increase a rate of correctly decompressing a data packet.

According to a first aspect, a first communication method is provided. The method includes: A first device deletes a first data packet. The first device sends first signaling to a second device, where the first signaling includes or indicates a first buffer, the first buffer is used to compress a second data packet or used to decompress a compressed second data packet, a serial number of the first data packet and a serial number of the second data packet are consecutive, the serial number of the second data packet follows the serial number of the first data packet, and the second device is a receiving device of the compressed second data packet.

The method may be executed by a first communication apparatus. The first communication apparatus may be a communication device or a communication apparatus, for example, a chip system, that can support a communication device in implementing functions of the method. For example, the communication device is a first device. For example, the first device is a terminal device or a network device.

In this embodiment of this application, if the first device deletes the first data packet, the first device may determine the first buffer corresponding to the second data packet, where the first buffer is used to compress the second data packet or used to decompress the compressed second data packet. Then, the first device may indicate the first buffer to the second device, so that the second device can decompress the compressed second data packet by using the first buffer. In this way, even if the first device deletes the first data packet, because a buffer state of the first device can keep consistent with a buffer state of the second device, the first device can still correctly decompress the compressed second data packet whose sequence number follows that of the first data packet. This increases a success rate of decompressing a data packet by a receive end, and decreases a probability that a data packet is lost.

With reference to the first aspect, in a first possible implementation of the first aspect, the first signaling is a control PDU.

The first signaling may alternatively be in another form, and the first signaling is not limited in this embodiment of this application.

With reference to the first aspect or the first possible implementation of the first aspect, in a second possible implementation of the first aspect, the first signaling further includes the serial number of the first data packet, the serial number of the second data packet, or a serial number of the first buffer.

The first signaling may further include other information, so that the second device can accurately determine a data packet corresponding to the first buffer.

According to a second aspect, a second communication method is provided. The method includes: A second device receives first signaling from a first device. A PDCP layer of the second device decompresses a compressed second data packet by using a first buffer included in or indicated by the first signaling.

The method may be executed by a second communication apparatus. The second communication apparatus may be a communication device or a communication apparatus, for example, a chip system, that can support a communication device in implementing functions of the method. For example, the communication device is a second device. For example, the second device is a terminal device or a network device.

With reference to the second aspect, in a first possible implementation of the second aspect, that a second device receives first signaling from a first device includes: The second device receives the first signaling from the first device before a reordering timer of the PDCP layer expires, where the reordering timer is used by the second device to detect a data packet that has not been received.

The second device may receive the first signaling before the reordering timer expires.

With reference to the first possible implementation of the second aspect, in a second possible implementation of the second aspect, that the second device decompresses a compressed second data packet by using a first buffer included in or indicated by the first signaling includes:

when the reordering timer expires, the second device decompresses the compressed second data packet by using the first buffer included in or indicated by the first signaling; or when receiving the first signaling, the second device decompresses the compressed second data packet by using the first buffer included in or indicated by the first signaling.

The second device may continue to wait until the reordering timer expires, and then decompress the compressed second data packet. This decreases an occurrence probability of an error. Alternatively, the second device does not need to wait until the reordering timer expires, and can decompress the compressed second data packet by using the first buffer provided that the second device receives the first signaling. This helps reduce a delay, and improve processing efficiency.

With reference to the second aspect, the first possible implementation of the second aspect, or the second possible implementation of the second aspect, in a third possible implementation of the second aspect, before the second device receives the first signaling from the first device, the method further includes:

the second device receives the compressed second data packet from the first device;

the second device unsuccessfully decompresses the compressed second data packet; and the second device stores the compressed second data packet.

It is likely that the second device has received the compressed second data packet before receiving the first buffer. In this case, the second device may normally decompress the compressed second data packet. Because there is no first buffer, the second device may unsuccessfully decompress the compressed second data packet. If the second device unsuccessfully decompresses the compressed second data packet, the second device may store the compressed second data packet and wait for arrival of the first buffer. This decreases a quantity of lost data packets.

With reference to the second aspect, the first possible implementation of the second aspect, the second possible implementation of the second aspect, or the third possible implementation of the second aspect, in a fourth possible implementation of the second aspect, the first signaling further includes a serial number of a first data packet, a serial number of the second data packet, or a serial number of the first buffer.

For technical effects achieved in the second aspect or the possible implementations of the second aspect, refer to the descriptions of the technical effects achieved in the first aspect or the possible implementations of the first aspect.

According to a third aspect, a third communication method is provided. The method includes: A PDCP layer of a first device deletes a first data packet. The first device sends first information to a second device, where the first information indicates that a second data packet is used only for decompression or buffer state synchronization, and the second data packet is a compressed first data packet.

The method may be executed by a third communication apparatus. The third communication apparatus may be a communication device or a communication apparatus, for example, a chip system, that can support a communication device in implementing functions of the method. For example, the communication device is a first device. For example, the first device is a terminal device or a network device.

In this method, although the PDCP layer of the first device deletes the first data packet, the first device may still continue to send the compressed first data packet. In this way, a buffer state of the first device can keep consistent with a buffer state of the second device, and the second device can decompress a subsequent data packet based on the compressed first data packet. This decreases a quantity of lost data packets.

With reference to the third aspect, in a first possible implementation of the third aspect, that the first device sends first information to a second device includes:

the first device sends the second data packet to the second device, where the second data packet carries a first identifier corresponding to the PDCP layer or an RLC layer, and the first identifier indicates that the second data packet is used only for decompression or buffer state synchronization; or the first device sends a control PDU to the second device, where the control PDU carries the second data packet, and the control PDU indicates that the second data packet is used only for decompression or buffer state synchronization.

The first device may directly carry the first identifier to indicate that the second data packet is used only for decompression or buffer state synchronization. This indication manner is clear. Alternatively, the first device may use the control PDU to indicate that the second data packet is used only for decompression or buffer state synchronization, without using dedicated indication information. This helps reduce signaling overheads.

With reference to the first possible implementation of the third aspect, in a second possible implementation of the third aspect, the control PDU includes a serial number of the first data packet or a serial number of the second data packet.

In this way, the second device can learn about a function of the compressed second data packet more clearly.

According to a fourth aspect, a fourth communication method is provided. The method includes: A second device receives first information from a first device, where the first information indicates that a second data packet is used only for decompression or buffer state synchronization. A PDCP layer of the second device decompresses a compressed third data packet based on the second data packet, where a serial number of the compressed third data packet follows a serial number of the second data packet.

The method may be executed by a fourth communication apparatus. The fourth communication apparatus may be a communication device or a communication apparatus, for example, a chip system, that can support a communication device in implementing functions of the method. For example, the communication device is a second device. For example, the second device is a terminal device or a network device.

With reference to the fourth aspect, in a first possible implementation of the fourth aspect, that a second device receives first information from a first device includes, where the first information indicates that a second data packet is used only for decompression or buffer state synchronization:

the second device receives the second data packet from the first device, where the second data packet carries a first identifier corresponding to the PDCP layer or an RLC layer, and the first identifier indicates that the second data packet is used only for decompression or buffer state synchronization or the second device receives a control PDU from the second device, where the control PDU carries the second data packet, and the control PDU indicates that the second data packet is used only for decompression or buffer state synchronization.

With reference to the fourth aspect or the first possible implementation of the fourth aspect, in a second possible implementation of the fourth aspect, the method further includes:

the PDCP layer of the second device decompresses the second data packet, to obtain a first data packet; and the PDCP layer of the second device does not transfer the first data packet to an upper layer of the PDCP layer.

Because the second data packet is used only for decompression and cannot be used for other purposes, the PDCP layer of the second device may not transfer the first data packet to the upper layer, to avoid occurrence of an error.

With reference to the first possible implementation of the fourth aspect, in a third possible implementation of the fourth aspect, the control PDU includes a serial number of the first data packet or a serial number of the second data packet.

For technical effects achieved in the fourth aspect or the possible implementations of the fourth aspect, refer to the descriptions of the technical effects achieved in the third aspect or the possible implementations of the third aspect.

According to a fifth aspect, a fifth communication method is provided. The method includes: A first device deletes a first data packet. The first device resets a buffer, and compresses a second data packet by using a reset buffer, to obtain a compressed second data packet, where the second data packet is a data packet that has not been compressed by the first device. The first device sends the compressed second data packet to a second device.

The method may be executed by a fifth communication apparatus. The fifth communication apparatus may be a communication device or a communication apparatus, for example, a chip system, that can support a communication device in implementing functions of the method. For example, the communication device is a first device. For example, the first device is a terminal device or a network device.

In this embodiment of this application, when deleting the first data packet, the first device may reset the buffer in a timely manner without waiting for a control PDU (indicating a decompression error) from the second device. Compared with a solution in which the first device resets the buffer after receiving a control PDU from the second device, this solution in this embodiment of this application can decrease a quantity of data packets that have been compressed before the buffer is reset, reduce impact of a deleted data packet on a subsequent data packet, and decrease a quantity of data packets that cannot be correctly decompressed by the second device, namely, decrease a quantity of lost data packets.

With reference to the fifth aspect, in a first possible implementation of the fifth aspect, the method further includes:

the first device receives a control PDU from the second device, where the control PDU indicates that a compressed third data packet is unsuccessfully decompressed; and the first device resets the buffer again when a serial number of the compressed third data packet is greater than a serial number of the second data packet; otherwise, the first device keeps the buffer unchanged.

If the serial number of the compressed third data packet is greater than the serial number of the second data packet, it indicates that the compressed third data packet is compressed by using the reset buffer. In this case, if the compressed third data packet is still unsuccessfully decompressed, a problem may occur on the reset buffer, and the first device may reset the buffer again, so that a buffer state of the first device keeps consistent with a buffer state of the second device.

With reference to the fifth aspect or the first possible implementation of the fifth aspect, in a second possible implementation of the fifth aspect, that the first device resets a buffer includes:

the first device clears the buffer;

the first device clears the buffer, and then configures a predefined dictionary for the buffer; or the first device configures a predefined dictionary for the buffer.

The foregoing describes several manners used by the first device to reset the buffer, and a specific manner used by the first device to reset the buffer is not limited in this embodiment of this application.

With reference to the fifth aspect or the first possible implementation of the fifth aspect, in a third possible implementation of the fifth aspect, after the first device resets the buffer, the method further includes: The first device configures a predefined dictionary for the buffer.

That the first device resets the buffer may include the following: The first device clears the buffer, and configures the predefined dictionary for the buffer. Alternatively, that the first device resets the buffer only includes the following: The first device clears the buffer. In this case, after the first device resets the buffer (that is, clears the buffer), the first device may further configure the predefined dictionary for the buffer. In other words, whether the operations of clearing the buffer and configuring the predefined dictionary for the buffer all belong to the operation of "resetting the buffer" or belong to different operations is not limited.

According to a sixth aspect, a sixth communication method is provided. The method includes: A first device deletes a first data packet. The first device receives a control PDU from a second device, where the control PDU indicates that a compressed second data packet is unsuccessfully decompressed. The first device resets a buffer, and compresses at least one data packet by using a reset buffer, where the at least one data packet includes all or some data packets that have not been sent by the first device to the second device.

The method may be executed by a sixth communication apparatus. The sixth communication apparatus may be a communication device or a communication apparatus, for example, a chip system, that can support a communication device in implementing functions of the method. For example, the communication device is a first device. For example, the first device is a terminal device or a network device.

In this embodiment of this application, when the first device deletes the first data packet (or after the first device deletes the first data packet), if the first device receives the control PDU (indicating a decompression error) from the second device, the first device may reset the buffer, and may compress, by using the reset buffer, a data packet that has not been sent, or a data packet that has not been sent and a data packet that has been sent. This manner can decrease a quantity of data packets compressed by using the buffer that has not been reset, decrease a quantity of data packets that cannot be correctly decompressed by the second device, and decrease a quantity of lost data packets.

With reference to the sixth aspect, in a first possible implementation of the sixth aspect, the at least one data packet further includes all or some data packets that have been sent by the first device to the second device, a serial number of a third data packet in the at least one data packet is greater than or equal to a serial number of the compressed second data packet, when the serial number of the third data packet is greater than the serial number of the compressed second data packet, the serial number of the third data packet and the serial number of the compressed second data packet are consecutive, and the third data packet is a data packet with a smallest serial number in the at least one data packet.

The at least one data packet may further include a data packet that has been sent. That is, the data packet that has been sent is also re-compressed by using the reset buffer. In this case, even if the second device already receives data packets that have been compressed not by using the reset buffer, and unsuccessfully decompresses these data packets, the second device may subsequently receive these data packets again that are compressed by using the reset buffer, and the second device can successfully decompress these data packets. This is equivalent to a case that no data packet is lost.

With reference to the sixth aspect or the first possible implementation of the sixth aspect, in a second possible implementation of the sixth aspect, that the first device resets a buffer includes:

the first device clears the buffer;

the first device clears the buffer, and then configures a predefined dictionary for the buffer; or the first device configures a predefined dictionary for the buffer.

The foregoing describes several manners used by the first device to reset the buffer, and a specific manner used by the first device to reset the buffer is not limited in this embodiment of this application.

With reference to the sixth aspect or the first possible implementation of the sixth aspect, in a third possible implementation of the sixth aspect, after the first device resets the buffer, the method further includes: The first device configures a predefined dictionary for the buffer.

That the first device resets the buffer may include the following: The first device clears the buffer, and configures the predefined dictionary for the buffer. Alternatively, that the first device resets the buffer only includes the following: The first device clears the buffer. In this case, after the first device resets the buffer (that is, clears the buffer), the first device may further configure the predefined dictionary for the buffer. In other words, whether the operations of clearing the buffer and configuring the predefined dictionary for the buffer all belong to the operation of "resetting the buffer" or belong to different operations is not limited.

According to a seventh aspect, a seventh communication method is provided. The method includes: A first device compresses a first data packet to obtain a compressed first data packet. The first device does not delete the compressed first data packet when a first deletion condition is met, or the first device sets a discard timer in a first manner, so that the compressed first data packet does not meet a second deletion condition.

The method may be executed by a seventh communication apparatus. The seventh communication apparatus may be a communication device or a communication apparatus, for example, a chip system, that can support a communication device in implementing functions of the method. For example, the communication device is a first device. For example, the first device is a terminal device or a network device.

In this embodiment of this application, the first device may not delete the compressed first data packet, so that a buffer state of the first device can keep consistent with a buffer state of the second device. This decreases a probability that the second device cannot perform decompression, and decreases a quantity of lost data packets.

With reference to the seventh aspect, in a first possible implementation of the seventh aspect, the first manner includes:

the first device sets timing duration of the discard timer to infinity; or the first device disables the discard timer after compressing the first data packet.

Whether the first manner is setting the timing duration of the discard timer to infinity or disabling the discard timer, the first manner can prevent the discard timer from expiry, so that the compressed first data packet does not meet the second deletion condition, and the first device does not delete the compressed first data packet.

With reference to the first possible implementation of the seventh aspect, in a second possible implementation of the seventh aspect, the method further includes: The first device receives a first message from a second device, where the first message indicates that the timing duration of the discard timer is infinity.

The timing duration of the discard timer is infinity, and may be determined by the first device or may be indicated by the second device.

According to an eighth aspect, a first communication apparatus is provided. For example, the communication apparatus is the first communication apparatus described above. The communication apparatus is configured to perform the method according to any one of the first aspect or the possible implementations of the first aspect. Specifically, the communication apparatus may include modules configured to perform the method according to any one of the first aspect or the possible implementations of the first aspect. For example, the communication apparatus includes a processing module and a transceiver module. The transceiver module may be one functional module. The functional module can implement both an information receiving function and an information sending function. Alternatively, the transceiver module max be a general term of a sending module and a receiving module. The sending module is configured to implement an information sending function, and the receiving module is configured to implement an information receiving function. For example, the communication apparatus is a first device.

The processing module is configured to delete a first data packet.

The transceiver module is configured to send first signaling to a second device, where the first signaling includes or indicates a first buffer, the first buffer is used to compress a second data packet or used to decompress a compressed second data packet, a serial number of the first data packet and a serial number of the second data packet are consecutive, the serial number of the second data packet follows the serial number of the first data packet, and the second device is a receiving device of the compressed second data packet.

With reference to the eighth aspect, in a first possible implementation of the eighth aspect, the first signaling is a control PDU.

With reference to the eighth aspect or the first possible implementation of the eighth aspect, in a second possible implementation of the eighth aspect, the first signaling further includes the serial number of the first data packet, the serial number of the second data packet, or a serial number of the first buffer.

For technical effects achieved in the eighth aspect or the possible implementations of the eighth aspect, refer to the descriptions of the technical effects achieved in the first aspect or the possible implementations of the first aspect.

According to a ninth aspect, a second communication apparatus is provided. For example, the communication apparatus is the second communication apparatus described above. The communication apparatus is configured to perform the method according to any one of the second aspect or the possible implementations of the second aspect. Specifically, the communication apparatus may include modules configured to perform the method according to any one of the second aspect or the possible implementations of the second aspect. For example, the communication apparatus includes a processing module and a transceiver module. The transceiver module may be one functional module. The functional module can implement both an information receiving function and an information sending function. Alternatively, the transceiver module may be a general term of a sending module and a receiving module. The sending module is configured to implement an information sending function, and the receiving module is configured to implement an information receiving function. For example, the communication apparatus is a second device.

The transceiver module is configured to receive first signaling from a first device.

The processing module is configured to decompress a compressed second data packet by using a PDCP layer of the first device by using a first buffer included in or indicated by the first signaling.

With reference to the ninth aspect, in a first possible implementation of the ninth aspect, the transceiver module is configured to receive the first signaling from the first device in the following manner: receiving the first signaling from the first device before a reordering timer of the PDCP layer expires, where the reordering timer is used by the second device to detect a data packet that has not been received.

With reference to the first possible implementation of the ninth aspect, in a second possible implementation of the ninth aspect, the processing module is configured to decompress, in the following manner, the compressed second data packet by using the first buffer indicated by the first signaling:

when the reordering timer expires, decompressing the compressed second data packet by using the first buffer included in or indicated by the first signaling; or when the first signaling is received, decompressing the compressed second data packet by using the first buffer included in or indicated by the first signaling.

With reference to the ninth aspect, the first possible implementation of the ninth aspect, or the second possible implementation of the ninth aspect, in a third possible implementation of the ninth aspect, the transceiver module is further configured to receive the compressed second data packet from the first device before receiving the first signaling from the first device;

the processing module is further configured to unsuccessfully decompress the compressed second data packet; and the processing module is further configured to store the compressed second data packet.

With reference to the ninth aspect, the first possible implementation of the ninth aspect, the second possible implementation of the ninth aspect, or the third possible implementation of the ninth aspect, in a fourth possible implementation of the ninth aspect, the first signaling further includes a serial number of a first data packet, a serial number of the second data packet, or a serial number of the first buffer.

For technical effects achieved in the ninth aspect or the possible implementations of the ninth aspect, refer to the descriptions of the technical effects achieved in the second aspect or the possible implementations of the second aspect.

According to a tenth aspect, a third communication apparatus is provided. For example, the communication apparatus is the third communication apparatus described above. The communication apparatus is configured to perform the method according to any one of the third aspect or the possible implementations of the third aspect. Specifically, the communication apparatus may include modules configured to perform the method according to any one of the third aspect or the possible implementations of the third aspect. For example, the communication apparatus includes a processing module and a transceiver module. The transceiver module may be one functional module. The functional module can implement both an information receiving function and an information sending function. Alternatively, the transceiver module may be a general term of a sending module and a receiving module. The sending module is configured to implement an information sending function, and the receiving module is configured to implement an information receiving function. For example, the communication apparatus is a first device.

The processing module is configured to delete a first data packet by using a PDCP layer of the first device.

The transceiver module is configured to send first information to a second device, where the first information indicates that a second data packet is used only for decompression or buffer state synchronization, and the second data packet is a compressed first data packet.

With reference to the tenth aspect, in a first possible implementation of the tenth aspect, the transceiver module is configured to send the first information to the second device in the following manner:

sending the second data packet to the second device, where the second data packet carries a first identifier corresponding to the PDCP layer or an RLC layer, and the first identifier indicates that the second data packet is used only for decompression or buffer state synchronization; or sending a control PDU to the second device, where the control PDU carries the second data packet, and the control PDU indicates that the second data packet is used only for decompression or buffer state synchronization.

With reference to the first possible implementation of the tenth aspect, in a second possible implementation of the tenth aspect, the control PDU includes a serial number of the first data packet or a serial number of the second data packet.

For technical effects achieved in the tenth aspect or the possible implementations of the tenth aspect, refer to the descriptions of the technical effects achieved in the third aspect or the possible implementations of the third aspect.

According to an eleventh aspect, a fourth communication apparatus is provided. For example, the communication apparatus is the fourth communication apparatus described above. The communication apparatus is configured to perform the method according to any one of the fourth aspect or the possible implementations of the fourth aspect. Specifically, the communication apparatus may include modules configured to perform the method according to any one of the fourth aspect or the possible implementations of the fourth aspect. For example, the communication apparatus includes a processing module and a transceiver module. The transceiver module may be one functional module. The functional module can implement both an information receiving function and an information sending function. Alternatively, the transceiver module may be a general term of a sending module and a receiving module. The sending module is configured to implement an information sending function, and the receiving module is configured to implement an information receiving function. For example, the communication apparatus is a second device.

The transceiver module is configured to receive first information from a first device, where the first information indicates that a second data packet is used only for decompression or buffer state synchronization.

The processing module is configured to decompress a compressed third data packet based on the second data packet by using a PDCP layer of the second device, where a serial number of the compressed third data packet follows a serial number of the second data packet.

With reference to the eleventh aspect, in a first possible implementation of the eleventh aspect, the transceiver module is configured to receive the first information from the first device in the following manner, where the first information indicates that the second data packet is used only for decompression or buffer state synchronization:

receiving the second data packet from the first device, where the second data packet carries a first identifier corresponding to the PDCP layer or an RLC layer, and the first identifier indicates that the second data packet is used only for decompression or buffer state synchronization; or receiving a control PDU from the second device, where the control PDU carries the second data packet, and the control PDU indicates that the second data packet is used only for decompression or buffer state synchronization.

With reference to the eleventh aspect or the first possible implementation of the eleventh aspect, in a second possible implementation of the eleventh aspect, the processing module is further configured to:

decompress the second data packet by using the PDCP layer of the second device, to obtain a first data packet; and skip transferring the first data packet to an upper layer of the PDCP layer by using the PDCP layer of the second device.

With reference to the first possible implementation of the eleventh aspect, in a third possible implementation of the eleventh aspect, the control PDU includes a serial number of a first data packet or the serial number of the second data packet.

For technical effects achieved in the eleventh aspect or the possible implementations of the eleventh aspect, refer to the descriptions of the technical effects achieved in the fourth aspect or the possible implementations of the fourth aspect.

According to a twelfth aspect, a fifth communication apparatus is provided. For example, the communication apparatus is the fifth communication apparatus described above. The communication apparatus is configured to perform the method according to any one of the fifth aspect or the possible implementations of the fifth aspect. Specifically, the communication apparatus may include modules configured to perform the method according to any one of the fifth aspect or the possible implementations of the fifth aspect. For example, the communication apparatus includes a processing module and a transceiver module. The transceiver module may be one functional module. The functional module can implement both an information receiving function and an information sending function. Alternatively, the transceiver module may be a general term of a sending module and a receiving module. The sending module is configured to implement an information sending function, and the receiving module is configured to implement an information receiving function. For example, the communication apparatus is a first device.

The processing module is configured to delete a first data packet.

The processing module is further configured to: reset a buffer, and compress a second data packet by using a reset buffer, to obtain a compressed second data packet, where the second data packet is a data packet that has not been compressed by the first device.

The transceiver module is configured to send the compressed second data packet to a second device.

With reference to the twelfth aspect, in a first possible implementation of the twelfth aspect, the transceiver module is further configured to receive a control PDU from the second device, where the control PDU indicates that a compressed third data packet is unsuccessfully decompressed; and the processing module is further configured to: reset the buffer again when a serial number of the compressed third data packet is greater than a serial number of the second data packet; otherwise, keep the buffer unchanged.

With reference to the twelfth aspect or the first possible implementation of the twelfth aspect, in a second possible implementation of the twelfth aspect, the processing module is configured to reset the buffer in the following manner:

clearing the buffer;

clearing the buffer, and then configuring a predefined dictionary for the buffer; or configuring a predefined dictionary for the buffer.

With reference to the twelfth aspect or the first possible implementation of the twelfth aspect, in a third possible implementation of the twelfth aspect, the processing module is further configured to configure a predefined dictionary for the buffer after resetting the buffer.

For technical effects achieved in the twelfth aspect or the possible implementations of the twelfth aspect, refer to the descriptions of the technical effects achieved in the fifth aspect or the possible implementations of the fifth aspect.

According to a thirteenth aspect, a sixth communication apparatus is provided. For example, the communication apparatus is the sixth communication apparatus described above. The communication apparatus is configured to perform the method according to any one of the sixth aspect or the possible implementations of the sixth aspect. Specifically, the communication apparatus may include modules configured to perform the method according to any one of the sixth aspect or the possible implementations of the sixth aspect. For example, the communication apparatus includes a processing module and a transceiver module. The transceiver module may be one functional module. The functional module can implement both an information receiving function and an information sending function. Alternatively, the transceiver module may be a general term of a sending module and a receiving module. The sending module is configured to implement an information sending function, and the receiving module is configured to implement an information receiving function. For example, the communication apparatus is a first device.

The processing module is configured to delete a first data packet.

The transceiver module is configured to receive a control PDU from a second device, where the control PDU indicates that a compressed second data packet is unsuccessfully decompressed.

The processing module is further configured to: reset a buffer, and compress at least one data packet by using a reset buffer, where the at least one data packet includes all or some data packets that have not been sent by the first device to the second device.

With reference to the thirteenth aspect, in a first possible implementation of the thirteenth aspect, the at least one data packet further includes all or some data packets that have been sent by the first device to the second device, a serial number of a third data packet in the at least one data packet is greater than or equal to a serial number of the compressed second data packet, when the serial number of the third data packet is greater than the serial number of the compressed second data packet, the serial number of the third data packet and the serial number of the compressed second data packet are consecutive, and the third data packet is a data packet with a smallest serial number in the at least one data packet.

With reference to the thirteenth aspect or the first possible implementation of the thirteenth aspect, in a second possible implementation of the thirteenth aspect, the processing module is configured to reset the buffer in the following manner:
clearing the buffer;
clearing the buffer, and then configuring a predefined dictionary for the buffer; or
configuring a predefined dictionary for the buffer.

With reference to the thirteenth aspect or the first possible implementation of the thirteenth aspect, in a third possible implementation of the thirteenth aspect, the processing module is further configured to configure a predefined dictionary for the buffer after resetting the buffer.

For technical effects achieved in the thirteenth aspect or the possible implementations of the thirteenth aspect, refer to the descriptions of the technical effects achieved in the sixth aspect or the possible implementations of the sixth aspect.

According to a fourteenth aspect, a seventh communication apparatus is provided. For example, the communication apparatus is the seventh communication apparatus described above. The communication apparatus is configured to perform the method according to any one of the seventh aspect or the possible implementations of the seventh aspect. Specifically, the communication apparatus may include modules configured to perform the method according to any one of the seventh aspect or the possible implementations of the seventh aspect. For example, the communication apparatus includes a processing module and a transceiver module. The transceiver module may be one functional module. The functional module can implement both an information receiving function and an information sending function. Alternatively, the transceiver module may be a general term of a sending module and a receiving module. The sending module is configured to implement an information sending function, and the receiving module is configured to implement an information receiving function. For example, the communication apparatus is a first device.

The processing module is configured to compress a first data packet to obtain a compressed first data packet.

The processing module is further configured to: skip deleting the compressed first data packet when a first deletion condition is met, or set a discard timer in a first manner, so that the compressed first data packet does not meet a second deletion condition.

With reference to the fourteenth aspect, in a first possible implementation of the fourteenth aspect, the first manner includes:
the first device sets timing duration of the discard timer to infinity; or
the first device disables the discard timer after compressing the first data packet.

With reference to the first possible implementation of the fourteenth aspect, in a second possible implementation of the fourteenth aspect, the transceiver module is configured to receive a first message from a second device, where the first message indicates that the timing duration of the discard timer is infinity.

For technical effects achieved in the fourteenth aspect or the possible implementations of the fourteenth aspect, refer to the descriptions of the technical effects achieved in the seventh aspect or the possible implementations of the seventh aspect.

According to a fifteenth aspect, an eighth communication apparatus is provided. For example, the communication apparatus is the first communication apparatus described above. The communication apparatus includes a processor and a memory. Optionally, the communication apparatus further includes a transceiver. The processor, the memory, and the transceiver are configured to implement the method according to any one of the first aspect or the possible implementations of the first aspect. For example, the communication apparatus is a chip disposed in a communication device. For example, the transceiver is implemented by using an antenna, a feeder, and a codec in the communication device. Alternatively, if the communication apparatus is a chip disposed in a communication device, the transceiver is, for example, a communication interface on the chip. The communication interface is connected to a radio frequency transceiver component in the communication device, to receive and send information by using the radio frequency transceiver component. For example, the communication device is a first device.

The processor is configured to delete a first data packet.

The transceiver is configured to send first signaling to a second device, where the first signaling includes or indicates a first buffer, the first buffer is used to compress a second data packet or used to decompress a compressed second data packet, a serial number of the first data packet and a serial number of the second data packet are consecutive, the serial number of the second data packet follows the serial number of the first data packet, and the second device is a receiving device of the compressed second data packet.

With reference to the fifteenth aspect, in a first possible implementation of the fifteenth aspect, the first signaling is a control PDU.

With reference to the fifteenth aspect or the first possible implementation of the fifteenth aspect, in a second possible implementation of the fifteenth aspect, the first signaling further includes the serial number of the first data packet, the serial number of the second data packet, or a serial number of the first buffer.

For technical effects achieved in the fifteenth aspect or the possible implementations of the fifteenth aspect, refer to the descriptions of the technical effects achieved in the first aspect or the possible implementations of the first aspect.

According to a sixteenth aspect, a ninth communication apparatus is provided. For example, and the communication apparatus is the second communication apparatus described above. The communication apparatus includes a processor and a memory. Optionally, the communication apparatus further includes a transceiver. The processor, the memory, and the transceiver are configured to implement the method according to any one of the second aspect or the possible implementations of the second aspect. For example, the communication apparatus is a chip disposed in a communication device. For example, the transceiver is implemented by using an antenna, a feeder, and a codec in the communication device. Alternatively, if the communication apparatus is a chip disposed in a communication device, the transceiver is, for example, a communication interface on the chip. The communication interface is connected to a radio frequency transceiver component in the communication device, to receive and send information by using the radio frequency transceiver component. For example, the communication device is a second device.

The transceiver is configured to receive first signaling from a first device.

The processor is configured to decompress a compressed second data packet by using a PDCP layer of the first device by using a first buffer included in or indicated by the first signaling.

With reference to the sixteenth aspect, in a first possible implementation of the sixteenth aspect, the transceiver is configured to receive the first signaling from the first device in the following manner: receiving the first signaling from the first device before a reordering timer of the PDCP layer expires, where the reordering timer is used by the second device to detect a data packet that has not been received.

With reference to the first possible implementation of the sixteenth aspect, in a second possible implementation of the sixteenth aspect, the processor is configured to decompress, in the following manner, the compressed second data packet by using the first buffer indicated by the first signaling:

when the reordering timer expires, decompressing the compressed second data packet by using the first buffer included in or indicated by the first signaling; or when the first signaling is received, decompressing the compressed second data packet by using the first buffer included in or indicated by the first signaling.

With reference to the sixteenth aspect, the first possible implementation of the sixteenth aspect, or the second possible implementation of the sixteenth aspect, in a third possible implementation of the sixteenth aspect, the transceiver is further configured to receive the compressed second data packet from the first device before receiving the first signaling from the first device;

the processor is further configured to unsuccessfully decompress the compressed second data packet; and the processor is further configured to store the compressed second data packet.

With reference to the sixteenth aspect, the first possible implementation of the sixteenth aspect, the second possible implementation of the sixteenth aspect, or the third possible implementation of the sixteenth aspect, in a fourth possible implementation of the sixteenth aspect, the first signaling further includes a serial number of a first data packet, a serial number of the second data packet, or a serial number of the first buffer.

For technical effects achieved in the sixteenth aspect or the possible implementations of the sixteenth aspect, refer to the descriptions of the technical effects achieved in the second aspect or the possible implementations of the second aspect.

According to a seventeenth aspect, a tenth communication apparatus is provided. For example, the communication apparatus is the third communication apparatus described above. The communication apparatus includes a processor and a memory. Optionally, the communication apparatus further includes a transceiver. The processor, the memory, and the transceiver are configured to implement the method according to any one of the third aspect or the possible implementations of the third aspect. For example, the communication apparatus is a chip disposed in a communication device. For example, the transceiver is implemented by using an antenna, a feeder, and a codec in the communication device. Alternatively, if the communication apparatus is a chip disposed in a communication device, the transceiver is, for example, a communication interface on the chip. The communication interface is connected to a radio frequency transceiver component in the communication device, to receive and send information by using the radio frequency transceiver component. For example, the communication device is a first device.

The processor is configured to delete a first data packet by using a PDCP layer of the first device.

The transceiver is configured to send first information to a second device, where the first information indicates that a second data packet is used only for decompression or buffer state synchronization, and the second data packet is a compressed first data packet.

With reference to the seventeenth aspect, in a first possible implementation of the seventeenth aspect, the transceiver is configured to send the first information to the second device in the following manner:

sending the second data packet to the second device, where the second data packet carries a first identifier corresponding to the PDCP layer or an RLC layer, and the first identifier indicates that the second data packet is used only for decompression or buffer state synchronization; or sending a control PDU to the second device, where the control PDU carries the second data packet, and the control PDU indicates that the second data packet is used only for decompression or buffer state synchronization.

With reference to the first possible implementation of the seventeenth aspect, in a second possible implementation of the seventeenth aspect, the control PDU includes a serial number of the first data packet or a serial number of the second data packet.

For technical effects achieved in the seventeenth aspect or the possible implementations of the seventeenth aspect, refer to the descriptions of the technical effects achieved in the third aspect or the possible implementations of the third aspect.

According to an eighteenth aspect, an eleventh communication apparatus is provided. For example, the communication apparatus is the fourth communication apparatus described above. The communication apparatus includes a processor and a memory. Optionally, the communication apparatus further includes a transceiver. The processor, the memory, and the transceiver are configured to implement the method according to any one of the fourth aspect or the possible implementations of the fourth aspect. For example, the communication apparatus is a chip disposed in a communication device. For example, the transceiver is implemented by using an antenna, a feeder, and a codec in the communication device. Alternatively, if the communication apparatus is a chip disposed in a communication device, the transceiver is, for example, a communication interface on the chip. The communication interface is connected to a radio frequency transceiver component in the communication device, to receive and send information by using the radio frequency transceiver component. For example, the communication device is a second device.

The transceiver is configured to receive first information from a first device, where the first information indicates that a second data packet is used only for decompression or buffer state synchronization.

The processor is configured to decompress a compressed third data packet based on the second data packet by using a PDCP layer of the second device, where a serial number of the compressed third data packet follows a serial number of the second data packet.

With reference to the eighteenth aspect, in a first possible implementation of the eighteenth aspect, the transceiver is configured to receive the first information from the first device in the following manner, where the first information indicates that the second data packet is used only for decompression or buffer state synchronization:

receiving the second data packet from the first device, where the second data packet carries a first identifier corresponding to the PDCP layer or an RLC layer, and the first identifier indicates that the second data packet is used only for decompression or buffer state synchronization; or receiving a control PDU from the second device, where the control PDU carries the second data packet, and the control PDU indicates that the second data packet is used only for decompression or buffer state synchronization.

With reference to the eighteenth aspect or the first possible implementation of the eighteenth aspect, in a second possible implementation of the eighteenth aspect, the processor is further configured to:

decompress the second data packet by using the PDCP layer of the second device, to obtain a first data packet; and skip transferring the first data packet to an upper layer of the PDCP layer by using the PDCP layer of the second device.

With reference to the first possible implementation of the eighteenth aspect, in a third possible implementation of the eighteenth aspect, the control PDU includes a serial number of a first data packet or the serial number of the second data packet.

For technical effects achieved in the eighteenth aspect or the possible implementations of the eighteenth aspect, refer to the descriptions of the technical effects achieved in the fourth aspect or the possible implementations of the fourth aspect.

According to a nineteenth aspect, a twelfth communication apparatus is provided. For example, the communication apparatus is the fifth communication apparatus described above. The communication apparatus includes a processor and a memory. Optionally, the communication apparatus further includes a transceiver. The processor, the memory, and the transceiver are configured to implement the method according to any one of the fifth aspect or the possible implementations of the fifth aspect. For example, the communication apparatus is a chip disposed in a communication device. For example, the transceiver is implemented by using an antenna, a feeder, and a codec in the communication device. Alternatively, if the communication apparatus is a chip disposed in a communication device, the transceiver is, for example, a communication interface on the chip. The communication interface is connected to a radio frequency transceiver component in the communication device, to receive and send information by using the radio frequency transceiver component. For example, the communication device is a first device.

The processor is configured to delete a first data packet.

The processor is further configured to: reset a buffer, and compress a second data packet by using a reset buffer, to obtain a compressed second data packet, where the second data packet is a data packet that has not been compressed by the first device.

The transceiver module is configured to send the compressed second data packet to a second device.

With reference to the nineteenth aspect, in a first possible implementation of the nineteenth aspect, the transceiver is further configured to receive a control PDU from the second device, where the control PDU indicates that a compressed third data packet is unsuccessfully decompressed; and the processor is further configured to: reset the buffer again when a serial number of the compressed third data packet is greater than a serial number of the second data packet; otherwise, keep the buffer unchanged.

With reference to the nineteenth aspect or the first possible implementation of the nineteenth aspect, in a second possible implementation of the nineteenth aspect, the processor is configured to reset the buffer in the following manner:

clearing the buffer;

clearing the buffer, and then configuring a predefined dictionary for the buffer; or configuring a predefined dictionary for the buffer.

With reference to the nineteenth aspect or the first possible implementation of the nineteenth aspect, in a third possible implementation of the nineteenth aspect, the processor is further configured to configure a predefined dictionary for the buffer after resetting the buffer.

For technical effects achieved in the nineteenth aspect or the possible implementations of the nineteenth aspect, refer to the descriptions of the technical effects achieved in the fifth aspect or the possible implementations of the fifth aspect.

According to a twentieth aspect, a thirteenth communication apparatus is provided. For example, the communication apparatus is the sixth communication apparatus described above. The communication apparatus includes a processor and a memory. Optionally, the communication apparatus further includes a transceiver. The processor, the memory, and the transceiver are configured to implement the method according to any one of the sixth aspect or the possible implementations of the sixth aspect. For example, the communication apparatus is a chip disposed in a communication device. For example, the transceiver is implemented by using an antenna, a feeder, and a codec in the communication device. Alternatively, if the communication apparatus is a chip disposed in a communication device, the transceiver is, for example, a communication interface on the chip. The communication interface is connected to a radio frequency transceiver component in the communication device, to receive and send information by using the radio frequency transceiver component. For example, the communication device is a first device.

The processor is configured to delete a first data packet.

The transceiver is configured to receive a control PDU from a second device, where the control PDU indicates that a compressed second data packet is unsuccessfully decompressed.

The processor is further configured to: reset a buffer, and compress at least one data packet by using a reset buffer, where the at least one data packet includes all or some data packets that have not been sent by the first device to the second device.

With reference to the twentieth aspect, in a first possible implementation of the twentieth aspect, the at least one data packet further includes all or some data packets that have been sent by the first device to the second device, a serial number of a third data packet in the at least one data packet is greater than or equal to a serial number of the compressed second data packet, when the serial number of the third data packet is greater than the serial number of the compressed second data packet, the serial number of the third data packet and the serial number of the compressed second data packet are consecutive, and the third data packet is a data packet with a smallest serial number in the at least one data packet.

With reference to the twentieth aspect or the first possible implementation of the twentieth aspect, in a second possible implementation of the twentieth aspect, the processor is configured to reset the buffer in the following manner:

clearing the buffer;

clearing the buffer, and then configuring a predefined dictionary for the buffer; or configuring a predefined dictionary for the buffer.

With reference to the twentieth aspect or the first possible implementation of the twentieth aspect, in a third possible implementation of the twentieth aspect, the processor is further configured to configure a predefined dictionary for the buffer after resetting the buffer.

For technical effects achieved in the twentieth aspect or the possible implementations of the twentieth aspect, refer to the descriptions of the technical effects achieved in the sixth aspect or the possible implementations of the sixth aspect.

According to a twenty-first aspect, a fourteenth communication apparatus is provided. For example, the communication apparatus is the seventh communication apparatus described above. The communication apparatus includes a processor and a memory. Optionally, the communication apparatus further includes a transceiver. The processor, the memory, and the transceiver are configured to implement the method according to any one of the seventh aspect or the possible implementations of the seventh aspect. For example, the communication apparatus is a chip disposed in a communication device. For example, the transceiver is implemented by using an antenna, a feeder, and a codec in the communication device. Alternatively, if the communication apparatus is a chip disposed in a communication device, the transceiver is, for example, a communication interface on the chip. The communication interface is connected to a radio frequency transceiver component in the communication device, to receive and send information by using the radio frequency transceiver component. For example, the communication device is a first device.

The processor is configured to compress a first data packet to obtain a compressed first data packet.

The processor is further configured to: skip deleting the compressed first data packet when a first deletion condition is met, or set a discard timer in a first manner, so that the compressed first data packet does not meet a second deletion condition.

With reference to the twenty-first aspect in a first possible implementation of the twenty-first aspect, the first manner includes:

the first device sets timing duration of the discard timer to infinity; or the first device disables the discard timer after compressing the first data packet.

With reference to the first possible implementation of the twenty-first aspect, in a second possible implementation of the twenty-first aspect, the transceiver is configured to receive a first message from a second device, where the first message indicates that the timing duration of the discard timer is infinity.

For technical effects achieved in the twenty-first aspect or the possible implementations of the twenty-first aspect, refer to the descriptions of the technical effects achieved in the seventh aspect or the possible implementations of the seventh aspect.

According to a twenty-second aspect, a fifteenth communication apparatus is provided. The communication apparatus may be the first communication apparatus in the foregoing method design. For example, the communication apparatus is a chip disposed in a communication device. For example, the communication device is a first device. The communication apparatus includes: a memory, configured to store computer-executable program code; and a processor, where the processor is coupled to the memory. The program code stored in the memory includes instructions. When the processor executes the instructions, the fifteenth communication apparatus is enabled to perform the method according to any one of the first aspect or the possible implementations of the first aspect.

The fifteenth communication apparatus may further include a communication interface. The communication interface may be a transceiver in the first device, and for example, implemented by using an antenna, a feeder, and a codec in the communication apparatus. Alternatively, if the fifteenth communication apparatus is a chip disposed in the first device, the communication interface may be an input/output interface on the chip, for example, an input/output pin.

According to a twenty-third aspect, a sixteenth communication apparatus is provided. The communication apparatus may be the second communication apparatus in the foregoing method design. For example, the communication apparatus is a chip disposed in a communication device. For example, the communication device is a second device. The communication apparatus includes: a memory, configured to store computer-executable program code; and a processor, where the processor is coupled to the memory. The program code stored in the memory includes instructions. When the processor executes the instructions, the sixteenth communication apparatus is enabled to perform the method according to any one of the second aspect or the possible implementations of the second aspect.

The sixteenth communication apparatus may further include a communication interface. The communication interface may be a transceiver in the second device, and for example, implemented by using an antenna, a feeder, and a codec in the communication apparatus. Alternatively, if the sixteenth communication apparatus is a chip disposed in the second device, the communication interface may be an input/output interface on the chip, for example, an input/output pin.

According to a twenty-fourth aspect, a seventeenth communication apparatus is provided. The communication apparatus may be the third communication apparatus in the foregoing method design. For example, the communication apparatus is a chip disposed in a communication device. For example, the communication device is a first device. The communication apparatus includes: a memory, configured to store computer-executable program code; and a processor, where the processor is coupled to the memory. The program code stored in the memory includes instructions. When the processor executes the instructions, the seventeenth communication apparatus is enabled to perform the method according to any one of the third aspect or the possible implementations of the third aspect.

The seventeenth communication apparatus may further include a communication interface. The communication interface may be a transceiver in the first device, and for example, implemented by using an antenna, a feeder, and a codec in the communication apparatus. Alternatively, if the seventeenth communication apparatus is a chip disposed in the first device, the communication interface may be an input/output interface on the chip, for example, an input/output pin.

According to a twenty-fifth aspect, an eighteenth communication apparatus is provided. The communication apparatus may be the fourth communication apparatus in the foregoing method design. For example, the communication apparatus is a chip disposed in a communication device. For example, the communication device is a second device. The communication apparatus includes: a memory, configured to store computer-executable program code; and a processor, where the processor is coupled to the memory. The program code stored in the memory includes instructions. When the processor executes the instructions, the eighteenth communication apparatus is enabled to perform the method according to any one of the fourth aspect or the possible implementations of the fourth aspect.

The eighteenth communication apparatus may further include a communication interface. The communication interface may be a transceiver in the second device, and for example, implemented by using an antenna, a feeder, and a codec in the communication apparatus. Alternatively, if the eighteenth communication apparatus is a chip disposed in the second device, the communication interface may be an input/output interface on the chip, for example, an input/output pin.

According to a twenty-sixth aspect, a nineteenth communication apparatus is provided. The communication apparatus may be the fifth communication apparatus in the foregoing method design. For example, the communication apparatus is a chip disposed in a communication device. For example, the communication device is a first device. The communication apparatus includes: a memory, configured to store computer-executable program code; and a processor, where the processor is coupled to the memory. The program code stored in the memory includes instructions. When the processor executes the instructions, the nineteenth communication apparatus is enabled to perform the method according to any one of the fifth aspect or the possible implementations of the fifth aspect.

The nineteenth communication apparatus may further include a communication interface. The communication interface may be a transceiver in the first device, and for example, implemented by using an antenna, a feeder, and a codec in the communication apparatus. Alternatively, if the nineteenth communication apparatus is a chip disposed in the first device, the communication interface may be an input/output interface on the chip, for example, an input/output pin.

According to a twenty-seventh aspect, a twentieth communication apparatus is provided. The communication apparatus may be the sixth communication apparatus in the foregoing method design. For example, the communication apparatus is a chip disposed in a communication device. For example, the communication device is a first device. The communication apparatus includes: a memory, configured to store computer-executable program code; and a processor, where the processor is coupled to the memory. The program code stored in the memory includes instructions. When the processor executes the instructions, the twentieth communication apparatus is enabled to perform the method according to any one of the sixth aspect or the possible implementations of the sixth aspect.

The twentieth communication apparatus may further include a communication interface. The communication interface may be a transceiver in the first device, and for example, implemented by using an antenna, a feeder, and a codec in the communication apparatus. Alternatively, if the twentieth communication apparatus is a chip disposed in the first device, the communication interface may be an input/output interface on the chip, for example, an input/output pin.

According to a twenty-eighth aspect, a twenty-first communication apparatus is provided. The communication apparatus may be the seventh communication apparatus in the foregoing method design. For example, the communication apparatus is a chip disposed in a communication device. For example, the communication device is a first device. The communication apparatus includes: a memory, configured to store computer-executable program code; and a processor, where the processor is coupled to the memory. The program code stored in the memory includes instructions. When the processor executes the instructions, the twenty-first communication apparatus is enabled to perform the method according to any one of the seventh aspect or the possible implementations of the seventh aspect.

The twenty-first communication apparatus may further include a communication interface. The communication interface may be a transceiver in the first device, and for example, implemented by using an antenna, a feeder, and a codec in the communication apparatus. Alternatively, if the twenty-first communication apparatus is a chip disposed in the first device, the communication interface may be an input/output interface on the chip, for example, an input/output pin.

According to a twenty-ninth aspect, a communication system is provided. The communication system may include the first communication apparatus according to the eighth aspect, the eighth communication apparatus according to the fifteenth aspect, or the fifteenth communication apparatus according to the twenty-second aspect, and include the second communication apparatus according to the ninth aspect, the ninth communication apparatus according to the sixteenth aspect, or the sixteenth communication apparatus according to the twenty-third aspect.

According to a thirtieth aspect, a communication system is provided. The communication system may include the third communication apparatus according to the tenth aspect, the tenth communication apparatus according to the seventeenth aspect, or the seventeenth communication apparatus according to the twenty-fourth aspect, and include the fourth communication apparatus according to the eleventh aspect, the eleventh communication apparatus according to the eighteenth aspect, or the eighteenth communication apparatus according to the twenty-fifth aspect.

The communication system according to the twenty-ninth aspect and the communication system according to the thirtieth aspect may be a same communication system, or may be different communication systems.

According to a thirty-first aspect, a computer storage medium is provided. The computer-readable storage medium stores instructions. When the instructions are run on a computer, the computer is enabled to perform the method according to any one of the first aspect or the possible implementations of the first aspect.

According to a thirty-second aspect, a computer storage medium is provided. The computer-readable storage medium stores instructions. When the instructions are run on a computer, the computer is enabled to perform the method according to any one of the second aspect or the possible implementations of the second aspect.

According to a thirty-third aspect, a computer storage medium is provided. The computer-readable storage medium stores instructions. When the instructions are run on a computer, the computer is enabled to perform the method according to any one of the third aspect or the possible implementations of the third aspect.

According to a thirty-fourth aspect, a computer storage medium is provided. The computer-readable storage medium stores instructions. When the instructions are run on a computer, the computer is enabled to perform the method according to any one of the fourth aspect or the possible implementations of the fourth aspect.

According to a thirty-fifth aspect, a computer storage medium is provided. The computer-readable storage medium stores instructions. When the instructions are run on a computer, the computer is enabled to perform the method according to any one of the fifth aspect or the possible implementations of the fifth aspect.

According to a thirty-sixth aspect, a computer storage medium is provided. The computer-readable storage medium stores instructions. When the instructions are run on a computer, the computer is enabled to perform the method according to any one of the sixth aspect or the possible implementations of the sixth aspect.

According to a thirty-seventh aspect, a computer storage medium is provided. The computer-readable storage medium stores instructions. When the instructions are run on a computer, the computer is enabled to perform the method according to any one of the seventh aspect or the possible implementations of the seventh aspect.

According to a thirty-eighth aspect, a computer program product including instructions is provided. The computer program product stores the instructions. When the instructions are run on a computer, the computer is enabled to perform the method according to any one of the first aspect or the possible implementations of the first aspect.

According to a thirty-ninth aspect, a computer program product including instructions is provided. The computer program product stores the instructions. When the instructions are run on a computer, the computer is enabled to perform the method according to any one of the second aspect or the possible implementations of the second aspect.

According to a fortieth aspect, a computer program product including instructions is provided. The computer program product stores the instructions. When the instructions are run on a computer, the computer is enabled to perform the method according to any one of the third aspect or the possible implementations of the third aspect.

According to a forty-first aspect, a computer program product including instructions is provided. The computer program product stores the instructions. When the instructions are run on a computer, the computer is enabled to perform the method according to any one of the fourth aspect or the possible implementations of the fourth aspect.

According to a forty-second aspect, a computer program product including instructions is provided. The computer program product stores the instructions. When the instructions are run on a computer, the computer is enabled to perform the method according to any one of the fifth aspect or the possible implementations of the fifth aspect.

According to a forty-third aspect, a computer program product including instructions is provided. The computer program product stores the instructions. When the instructions are run on a computer, the computer is enabled to perform the method according to any one of the sixth aspect or the possible implementations of the sixth aspect.

According to a forty-fourth aspect, a computer program product including instructions is provided. The computer program product stores the instructions. When the instructions are run on a computer, the computer is enabled to perform the method according to any one of the seventh aspect or the possible implementations of the seventh aspect.

In the embodiments of this application, even if the first device deletes the first data packet, because the buffer state of the first device can keep consistent with the buffer state of the second device, the first device can still correctly decompress the compressed second data packet whose sequence number follows that of the first data packet. This increases a success rate of decompressing a data packet by a receive end, and decreases a probability that a data packet is lost.

DESCRIPTION OF EMBODIMENTS

Figure 1:
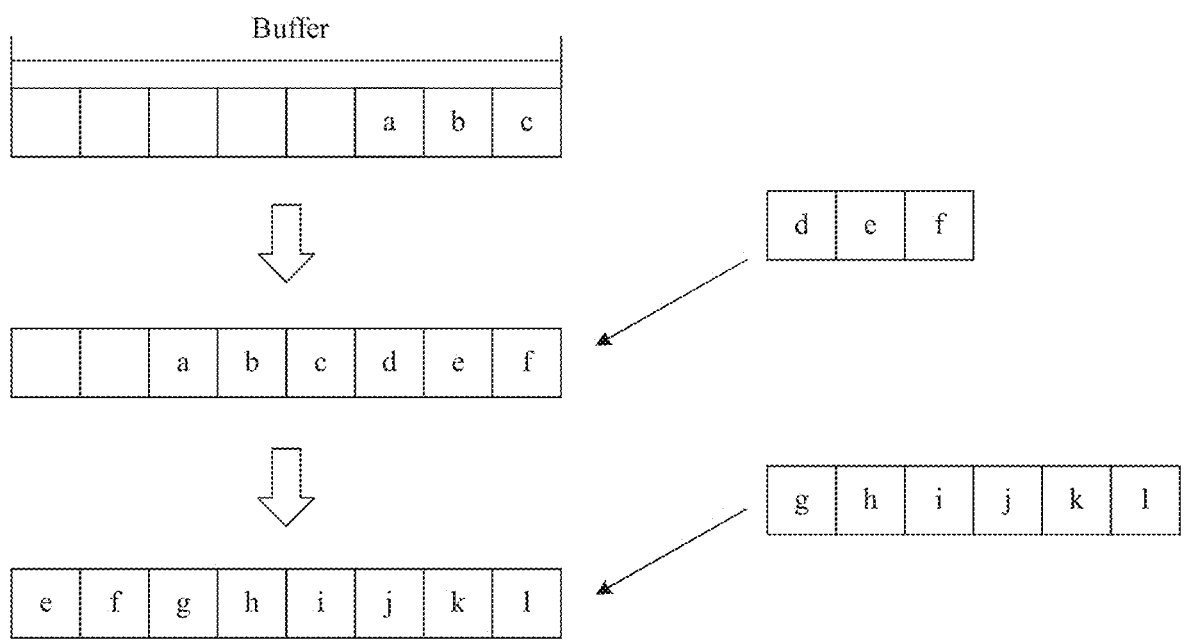
FIG. 1 is a schematic diagram of a UDC technology.

To make the objectives, technical solutions, and advantages of the embodiments of this application clearer, the following further describes the embodiments of this application in detail with reference to the accompanying drawings.

The following describes some terms in the embodiments of this application, to help a person skilled in the art have a better understanding.

(1) Terminal device: The terminal device includes a device that provides a voice and/or data connectivity for a user. Specifically, the terminal device includes a device that provides a voice for the user, includes a device that provides data connectivity for the user, or includes a device that provides a voice and data connectivity for the user. For example, the terminal device may include a handheld device having a wireless connection function or a processing device connected to a wireless modem. The terminal device may communicate with a core network through a radio access network (radio access network, RAN), and exchange a voice or data with the RAN, or exchange a voice and data with the RAN The terminal device may include user equipment (user equipment, UE), a wireless terminal device, a mobile terminal device, a device-to-device (device-to-device, D2D) communication terminal device, a vehicle-to-everything (vehicle to everything, V2X) terminal device, a machine-to-machine/machine type communication (machine-to-machine/machine type communication, M2M/MTC) terminal device, an internet of things (internet of things, IoT) terminal device, a subscriber unit (subscriber unit), a subscriber station (subscriber station), a mobile station (mobile station remote station (remote station), an access point (access point, AP), a remote terminal (remote terminal), an access terminal (access terminal), a user terminal (user terminal), a user agent (user agent), a user device (user device), or the like. For example, the terminal device may include a mobile phone (or referred to as a "cellular" phone), a computer with a mobile terminal device, or a portable, pocket-sized, handheld, or computer built-in mobile apparatus. For example, the terminal device may be a device such as a personal communication service (personal communication service, PCS) phone, a cordless telephone set, a session initiation protocol (session initiation protocol, SIP) phone, a wireless local loop (wireless local loop, WLL) station, or a personal digital assistant (personal digital assistant, PDA). The terminal device further includes a limited device, for example, a device with relatively low power consumption, a device with a limited storage capability, or a device with a limited computing capability. For example, the terminal device includes an information sensing device such as a barcode reader, a radio frequency identification (radio frequency identification, RFID) device, a sensor, a global positioning system (global positioning system, GPS), or a laser scanner.

By way of example but not limitation, the terminal device in the embodiments of this application may alternatively be a wearable device. The wearable device may also be referred to as a wearable intelligent device, an intelligent wearable device, or the like, and is a general term of wearable devices that are intelligently designed and developed for daily wear by using a wearable technology, for example, glasses, gloves, watches, clothes, and shoes. The wearable device is a portable device that can be directly worn by a user or integrated into clothes or an accessory of a user. The wearable device is not only a hardware device, but also implements a powerful function through software support, data exchange, and cloud interaction. In a broad sense, wearable intelligent devices include full-featured and large-sized devices that can implement all or some of functions without depending on smartphones, for example, smart watches or smart glasses, and include devices that focus only on one type of application function and need to collaboratively work with other devices such as smartphones, for example, various smart bands, smart helmets, or smart jewelry for monitoring physical signs.

However, if the various terminal devices described above are located in a vehicle (for example, placed in the vehicle or mounted in the vehicle), the terminal devices may be considered as vehicle-mounted terminal devices. For example, the vehicle-mounted terminal devices are also referred to as on-board units (on-board unit, OBU).

In the embodiments of this application, the terminal device may further include a relay (relay). Alternatively, it may be understood that any device that can perform data communication with a base station may be considered as the terminal device.

(2) Network device: The network device includes, for example, an access network (access network, AN) device such as a base station (for example, an access point), and may be a device that communicates with a wireless terminal device through an air interface by using one or more cells in an access network. Alternatively, for example, the network device in a vehicle-to-everything (vehicle-to-everything, V2X) technology is a road side unit (road side unit, RSU). The base station may be configured to perform mutual conversion between a received over-the-air frame and an IP packet, and serve as a router between a terminal device and a remaining part of the access network, where the remaining part of the access network may include an IP network. The RSU array be a fixed infrastructure entity supporting a V2X application, and may exchange a message with another entity supporting the V2X application. The network device may further coordinate attribute management of the air interface. For example, the network device may include an evolved NodeB (NodeB or eNB or eNodeB, evolved NodeB) in a long term evolution (long term evolution, LTE) system or a long term evolution-advanced (long term evolution-advanced, LTE-A) system, may include a next generation NodeB (next generation NodeB, gNB) in a $5^{th}$ generation ($5^{th}$ generation, 5G) new radio (new radio, NR) system (also briefly referred to as an NR system), or may include a centralized unit (centralized unit, CU) and a distributed unit (distributed unit, DU) in a cloud radio access network (cloud radio access network, Cloud RAN) system. This is not limited in the embodiments of this application.

A receiving device in the embodiments of this application may be a terminal device, or may be a network device. A sending device configured to send a data packet in the embodiments of this application may also be a terminal device, or may also be a network device. In addition, for example, in a case, the sending device is a network device, and the receiving device is a terminal device; in another case, both the sending device and the receiving device are network devices; in still another case, both the sending device and the receiving device are terminal devices. This is not specifically limited.

(3) The terms "system" and "network" may be used interchangeably in the embodiments of this application. "At least one" means one or more, and "a plurality of" means two or more. The term "and/or" describes an association relationship between associated objects and indicates that three relationships may exist. For example, A and/or B may indicate the following cases: Only A exists, both A and B exist, and only B exists, where A and B may be singular or plural. The character "/" usually indicates an "or" relationship between associated objects. "At least one of the following items (pieces)" or a similar expression thereof refers to any combination of these items, including any combination of singular items (pieces) or plural items (pieces). For example, at least one of a, b, or c may indicate: a, b, c, a and b, a and c, b and c, or a, b, and c, where a, b, and c may be singular or plural.

In addition, unless otherwise stated, ordinal numbers such as "first" and "second" in the embodiments of this application are used to distinguish between a plurality of objects, but are not intended to limit an order, a time sequence, priorities, or importance of the plurality of objects. For example, a first data packet and a second data packet are merely used to distinguish between different data packets, but do not indicate that content, priorities, a sending order, importance, or the like of the two data packets are different.

The foregoing describes concepts of some names used in the embodiments of this application. The following describes technical features of the embodiments of this application.

In AM transmission in an LTE system, a UDC technology is introduced and implemented at a PDCP layer. The UDC technology is mainly used for some data packets having a large amount of duplicate content, for example, data packets used for transmitting SIP in VoLTE. In the UDC technology, a difference part between data packets is transmitted, to reduce an amount of data that needs to be transmitted.

In the UDC, a terminal device serves as a transmit end to compress a data packet, and a network device serves as a receive end to decompress a data packet. Both compression and decompression are performed based on a same buffer state that is jointly maintained by the transmit end and the receive end. The buffer state may be content included in a buffer (or information included in a buffer). When compressing a data packet, the transmit end compresses the data packet based on a current buffer state. After successfully compressing the data packet, the transmit end places original information (before compression) of a currently compressed data packet from a backend of a buffer into the buffer. When the $1^{st}$ data packet is compressed the buffer may not include information about a previous data packet. In this case, the transmit end may compress the $1^{st}$ data packet based on preset information. For example, the preset information is a predefined dictionary. For example, as shown in FIG. 1, the buffer includes "abc". For example, "abc" is the preset information. When the transmit end needs to compress a data packet "def", the transmit end may compress the data packet "def" based on "abc". After compressing the data packet "def" and obtaining a compressed data packet 1, the transmit end may place "def" from the backend of the buffer into the buffer. Then, when the transmit end needs to compress a data packet "ghijkl", the transmit end may compress the data packet "ghijkl" based on "abcdef" in the buffer. In other words, the transmit end performs compression based on all content in the buffer each time. After compressing the data packet "ghijkl" and obtaining a compressed data packet 2, the transmit end may place the data packet "ghijkl" from the backend of the buffer into the buffer. Because storage space of the buffer is limited, "abcd" is squeezed out of the buffer according to a first in first out (first in first out, FIFO) principle. In this case, if the transmit end needs to compress another data packet, the transmit end performs compression based on "efghijkl" included in the buffer. After receiving the compressed data packet 1, the receive end may decompress the compressed data packet 1 based on the preset information "abc" in a buffer, to obtain the data packet "def", and place the data packet "def" from a backend of the buffer into the buffer. After receiving the data packet 2, the receive end may decompress the data packet 2 based on the information "abcdef" in the buffer, to obtain the data packet "ghijkl", and place the data packet "ghijkl" from the backend of the buffer into the buffer. In this case, "abcd" is squeezed out of the buffer. It can be learned that the buffer state of the receive end keeps consistent with the buffer state of the transmit end. This can ensure that the receive end can correctly perform decompression.

Figure 2:
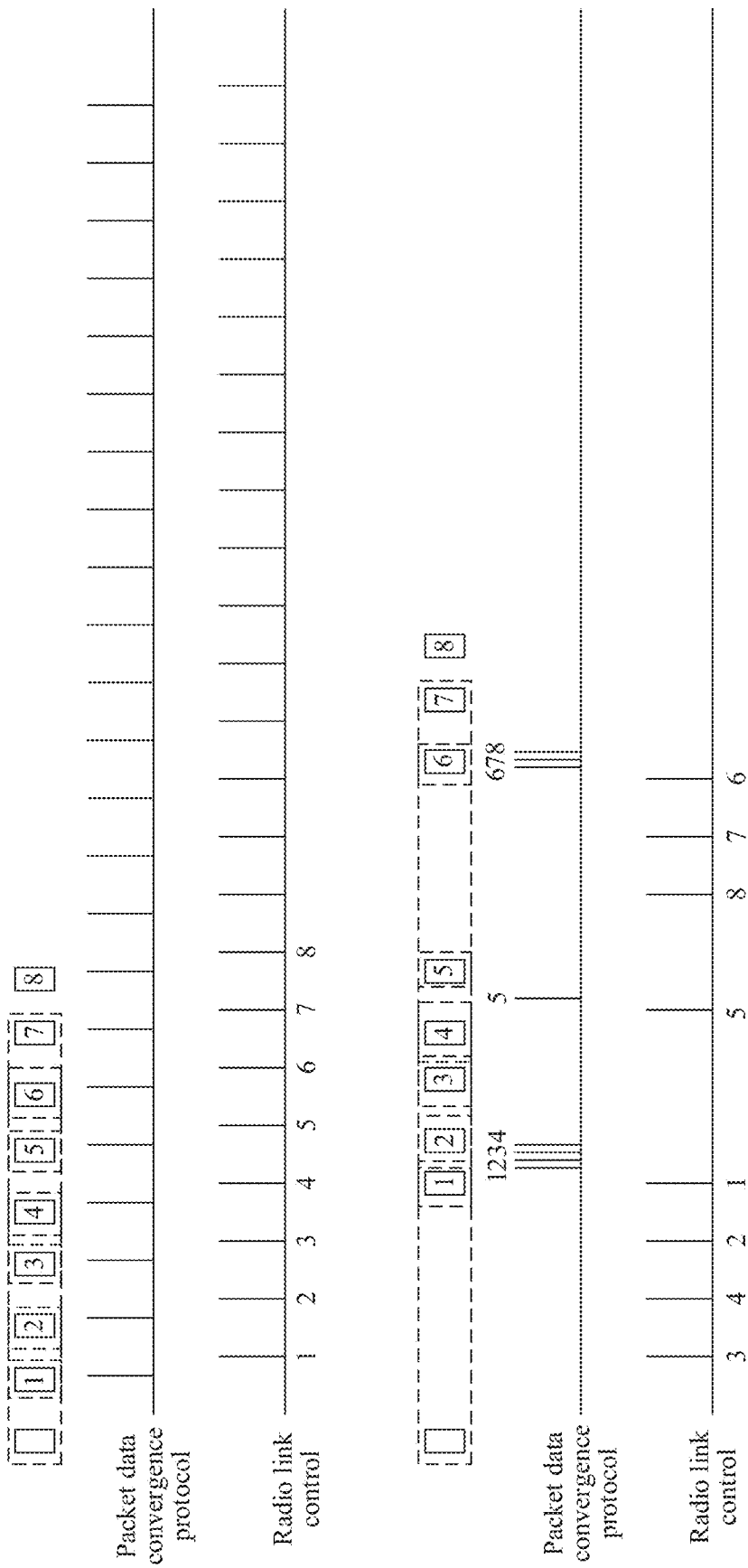
FIG. 2 is a schematic diagram of a data packet compression and decompression process in an LTE system.

FIG. 2 shows a data packet compression and decompression process in an LTE system. PDCP and RLC in upper two rows in FIG. 2 represent a PDCP layer and an RLC layer of a transmit end. For example, a size of a buffer is two data packets. Each dashed-line box represents content included in the buffer. In addition, a dashed-line box including "/" represents preset information included in the buffer. Each data packet is compressed based on content currently included in the buffer. PDCP and RLC in lower two rows in FIG. 2 represent a PDCP layer and an RLC layer of a receive end. In AM mode, the RLC layer supports a data retransmission mechanism. Therefore, although the transmit end sends data packets in order, the receive end may receive compressed data packets out of order. In the LTE system, the RLC layer of the receive end orders the received compressed data packets, and then transfers the ordered compressed data packets to the PDCP layer. For example, in FIG. 2, the RLC layer of the receive end receives a compressed data packet 1, a compressed data packet 2, a compressed data packet 3, and a compressed data packet 4 in order of the compressed data packet 3, the compressed data packet 4, the compressed data packet 2, and the compressed data packet 1. In this case, after receiving the compressed data packet 1, the RLC layer orders the four compressed data packets, and then transfers the four compressed data packets to the PDCP layer in regular order. After receiving the four compressed data packets, the PDCP layer sequentially decompresses the four compressed data packets. Then, the receive end receives a compressed data packet 5, the RLC layer of the receive end transfers the compressed data packet 5 to the PDCP layer, and the PDCP layer decompresses the compressed data packet 5. Then, the receive end further receives a compressed data packet 6, a compressed data packet 7, and a compressed data packet 8, and the receive end receives the three compressed data packets in order of the compressed data packet 8, the compressed data packet 7, and the compressed data packet 6. In this case, after receiving the compressed data packet 6, the RLC layer of the receive end orders the three compressed data packets, and then transfers the ordered three compressed data packets to the PDCP layer. After receiving the three compressed data packets, the PDCP layer sequentially decompresses the three compressed data packets. For example, the PDCP layer decompresses the compressed data packet 1 based on preset information included in the buffer, the PDCP layer decompresses the compressed data packet 2 based on the preset information included in the buffer and information obtained by decompressing the compressed data packet 1, and the PDCP layer decompresses the compressed data packet 3 based on the information obtained by decompressing the compressed data packet 1 and information obtained by decompressing the compressed data packet 2 (it is assumed that the buffer can accommodate content of two data packets, and therefore it is considered that the preset information has been squeezed out of the buffer). The rest may be deduced by analogy. All serial numbers of data packets (or serial numbers of compressed data packets) shown in FIG. 2 are sequence numbers (sequence number, SN) of the data packets at the PDCP layer, or the serial numbers may alternatively be understood as count (count) values of the data packets at the PDCP layer.

Currently, the UDC applies only to the AM mode in LTE. Therefore, a packet loss that may occur on an air interface during transmission is not considered. Generally, the PDCP layer receives compressed data packets in order, to ensure that the buffer of the receive end is aligned with the buffer of the transmit end and that decompression is implemented in order.

For current transmission in LTE based on the UDC, the PDCP layer of the transmit end may discard some data packets in some cases. For example, after obtaining a data packet from an upper layer, the PDCP layer may enable a discard timer (discard timer). When the discard timer expires, if the data packet is not sent from the air interface of the transmit end, the PDCP layer deletes the data packet. In this case, if the data packet has been transferred to the RLC layer, the PDCP layer notifies the RLC layer to delete the data packet, to prevent the transmit end from sending the timeout data packet through the air interface. For example, the PDCP layer of the transmit end determines to delete the data packet 3. However, the compressed data packet 3 has been transferred to the RLC layer. In this case, the PDCP layer notifies the RLC layer to delete the compressed data packet 3. The RLC layer deletes the compressed data packet 3, and the RLC layer renumbers other compressed data packets at the RLC layer. For example, there are the compressed data packet 1, the compressed data packet 2, and the compressed data packet 4. In this case, the RLC layer renumbers the compressed data packet 4 as the compressed data packet 3 at the RLC layer. That is, the compressed data packet 1 at the PDCP layer is the compressed data packet 1 at the RCL layer, the compressed data packet 2 at the PDCP layer is the compressed data packet 2 at the RLC layer, but the compressed data packet 4 at the PDCP layer is the compressed data packet 3 at the RLC layer. It can be learned that a number at the PDCP layer is not necessarily consistent with a number at the RLC layer. After receiving the compressed data packet 1, the compressed data packet 2, and the compressed data packet 3, the RLC layer of the receive end transfers the compressed data packet 1, the compressed data packet 2, and the compressed data packet 3 to the PDCP layer. However, the compressed data packet 3 at the RLC layer is actually the compressed data packet 4 at the PDCP layer. If the PDCP layer of the transmit end compresses the compressed data packet 4 based on information about the compressed data packet 3, an error occurs when the PDCP layer of the receive end decompresses the compressed data packet 4 because the PDCP layer of the receive end does not have the compressed data packet 3. In the LTE system, there is a feedback mechanism for a decompression error in the UDC. When finding the decompression error, the receive end may send a control PDU to the transmit end, to indicate the decompression error. After receiving the control PDU, the transmit end resets (reset) the buffer starting from a currently to-be-compressed data packet, compresses the currently to-be-compressed data packet based on the preset information, and indicates, in a UDC header of the data packet, that the compressed data packet is a compressed data packet obtained after the buffer is reset. After receiving the compressed data packet, the receive end can determine, based on the UDC header of the compressed data packet, that the compressed data packet is a compressed data packet obtained after the buffer is reset. Then, the receive end resets and clears the buffer, and decompresses the compressed data packet. In this case, the receive end does not need to decompress the compressed data packet based on a previous data packet. This reduces dependence on the previous data packet, and decreases an occurrence probability of a decompression error.

Figure 3:
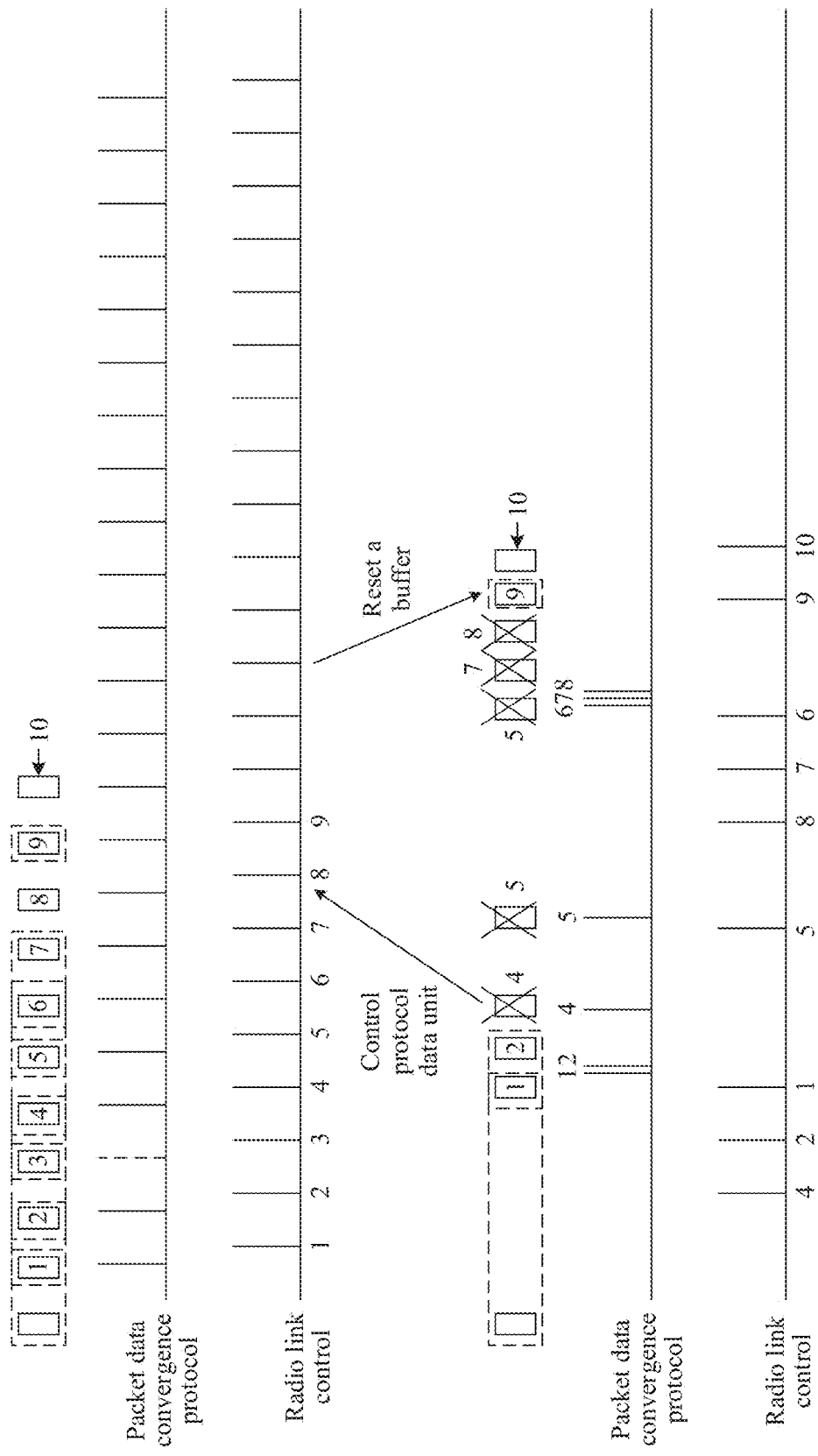
FIG. 3 is a schematic diagram of a feedback mechanism for a decompression error in an LTE system.

For example, FIG. 3 is a schematic diagram of a feedback mechanism for a decompression error in an LTE system. When a data packet 3 is deleted, a data packet 4, a data packet 5, a data packet 6, a data packet 7, and a data packet 8 have been compressed and packaged, and a transmit end normally sends these data packets. In this case, a receive end cannot correctly decompress a compressed data packet 4, a compressed data packet 5, a compressed data packet 6, a compressed data packet 7, and a compressed data packet 8. After unsuccessfully decompressing the compressed data packet 4, a PDCP layer of the receive end may send a control PDU to the transmit end, to notify the transmit end of a decompression error. The control PDU does not indicate any serial number corresponding to the error. Therefore, after receiving the control PDU, the transmit end may reset a buffer (currently, resetting the buffer is clearing the buffer). When the transmit end receives the control PDU, the transmit end has already sent the compressed data packet 4, the compressed data packet 5, the compressed data packet 6, the compressed data packet 7, and the compressed data packet 8, and it is assumed that a compressed data packet 9 is a currently to-be-compressed data packet. In this case, the transmit end can compress only a data packet 9 by using a reset buffer, and the receive end can normally decompress the compressed data packet 9 after receiving the compressed data packet 9.

To be specific, in a time period between a moment at which the receive end finds a decompression failure (the compressed data packet 4) and a moment at which the receive end receives a data packet (the compressed data packet 9) obtained after the buffer is reset, the receive end cannot decompress compressed data packets (that is, the compressed data packet 5, the compressed data packet 6, the compressed data packet 7, and the compressed data packet 8) whose sequence numbers fall within a range of 4 to 9, but discard these data packets. Consequently, a large quantity of data packets are lost, and an application layer needs to retransmit the data packets.

Currently, UDC is not used in an NR system. A clear solution is to directly apply an existing UDC mechanism to transmission of a data radio bearer (data radio bearer, DRB) in AM mode in the NR system. Different from the LTE system, in the NR system, the RLC layer is not responsible for reordering data packets, but the PDCP layer reorders the data packets. After receiving compressed data packets, the RLC layer of the receive end directly transfers the compressed data packets to the PDCP layer. The PDCP layer orders the compressed data packets. After ordering, the PDCP layer decompresses the ordered compressed data packets, and then transfers data packets obtained through decompression to an upper layer.

Figure 4:
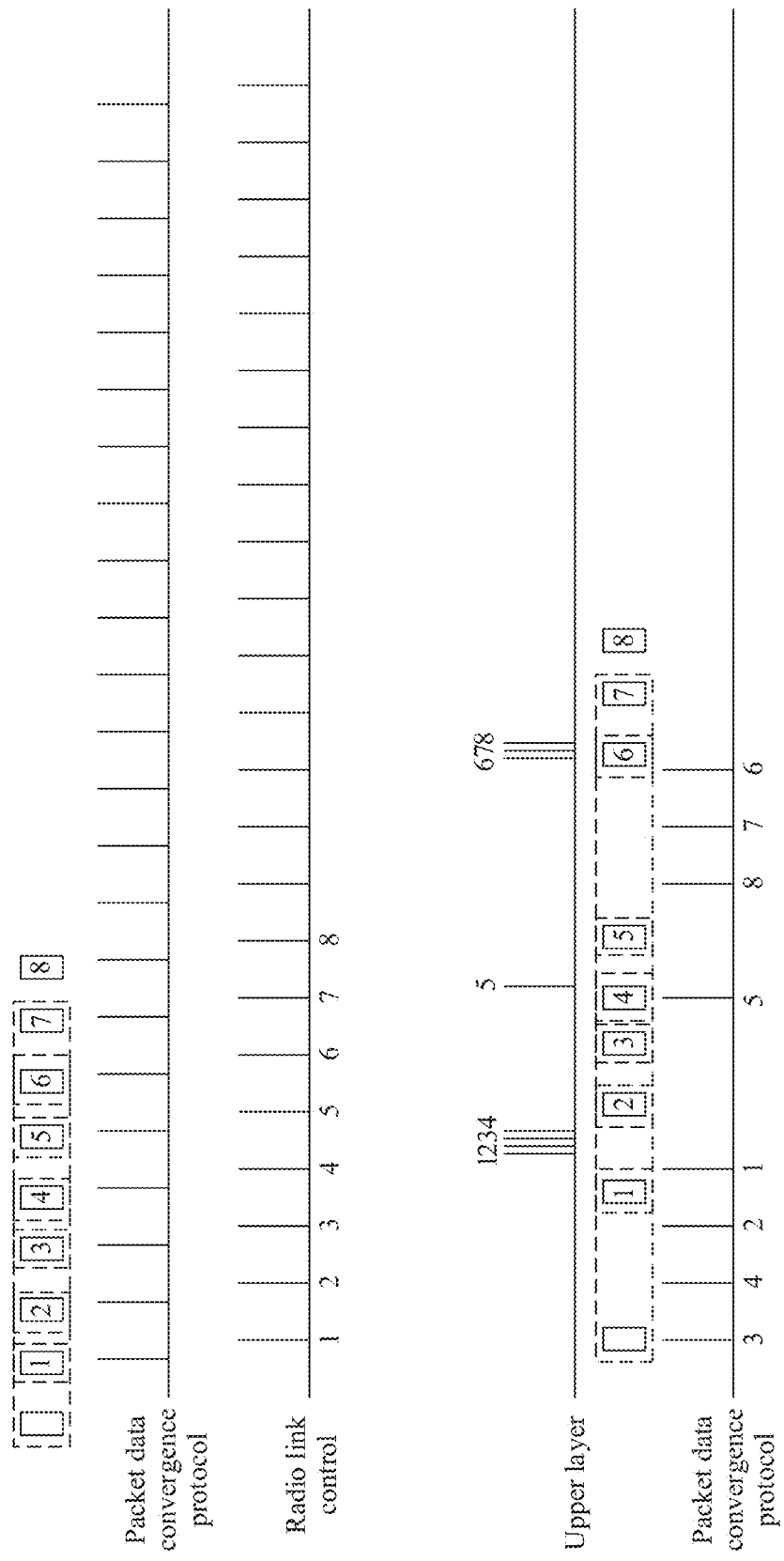
FIG. 4 is a schematic diagram of a data packet compression and decompression process in an NR system.

FIG. 4 shows a data packet compression and decompression process in an NR system. PDCP and RLC in upper two rows in FIG. 4 represent a PDCP layer and an RLC layer of a transmit end. For example, a size of a buffer is two data packets. Each dashed-line box represents content included in the buffer. In addition, a dashed-line box including "/" represents preset information included in the buffer. Each data packet is compressed based on content currently included in the buffer. PDCP in lower one row in FIG. 4 represents a PDCP layer of a receive end. After receiving a compressed data packet, an RLC layer of the receive end does not perform an operation such as ordering, but directly transfers the compressed data packet to the PDCP layer. Therefore, the RLC layer of the receive end is not shown in FIG. 4. For example, in FIG. 4, the PDCP layer of the receive end receives a compressed data packet 1, a compressed data packet 2, a compressed data packet 3, and a compressed data packet 4 in order of the compressed data packet 3, the compressed data packet 4, the compressed data packet 2, and the compressed data packet 1. In this case, after receiving the compressed data packet 1, the PDCP layer orders the four compressed data packets, decompresses the four compressed data packets in regular order, and then transfers data packets obtained through decompression to an upper layer of the PDCP layer. Then, the receive end receives a compressed data packet 5, and the PDCP layer of the receive end decompresses the compressed data packet 5, and then transfers a data packet 5 obtained through decompression to the upper layer. Then, the receive end further receives a compressed data packet 6, a compressed data packet 7, and a compressed data packet 8, and the receive end receives the three compressed data packets in order of the compressed data packet 8, the compressed data packet 7, and the compressed data packet 6. In this case, after receiving the compressed data packet 6, the PDCP layer of the receive end orders the three compressed data packets, sequentially decompresses the ordered three compressed data packets, and then transfers data packets obtained through decompression to the upper layer. For example, the PDCP layer decompresses the compressed data packet 1 based on preset information included in the buffer, the PDCP layer decompresses the compressed data packet 2 based on the preset information included in the buffer and information (that is, a data packet 1) obtained by decompressing the compressed data packet 1, and the PDCP layer decompresses the compressed data packet 3 based on the information (that is, the data packet 1) obtained by decompressing the compressed data packet 1 and information (that is, a data packet 2) obtained by decompressing the compressed data packet 2 (it is assumed that the buffer can accommodate content of two data packets, and therefore it is considered that the preset information has been squeezed out of the buffer). The rest may be deduced by analogy. All serial numbers of data packets (or serial numbers of compressed data packets) shown in FIG. 4 are sequence numbers of the data packets at the PDCP layer, or the serial numbers may alternatively be understood as count values of the data packets at the PDCP layer. Compared with LTE, the PDCP layer reorders data packets, and the PDCP layer decompresses only data packets to be transferred to the upper layer.

In addition, in the NR system, the PDCP layer of the transmit end may further perform preprocessing. To be specific, before an air interface grant (grant) is allocated at a bottom layer, the PDCP layer sends a compressed data packet to the RLC layer for preprocessing. For example, when only the compressed data packet 1 is transmitted through an air interface, the PDCP layer has already performed processing such as compression on a data packet 2, a data packet 3, a data packet 4, a data packet 5, a data packet 6, a data packet 7, and a data packet 8 and transferred the data packets to the RLC layer for further processing. Preprocessing reduces a data packet processing delay.

If a case similar to that in the LTE system in which the transmit end deletes a data packet occurs in the NR system, a similar event that batches of data packets are lost also occurs. In addition, in the NR system, if the PDCP layer of the receive end determines that received compressed data packets are out of order, for example, after receiving the compressed data packet 1 and the compressed data packet 2, the PDCP layer of the receive end should receive the compressed data packet 3 instead of the compressed data packet 4, the PDCP layer of the receive end enables a reordering timer (reordering timer), to wait for receiving the compressed data packet 3. In this case, the PDCP layer decompresses the received compressed data packets only after the compressed data packet 3 is received and the data packet 3 and the data packet 4 are ready to be transferred or only when the data packet 4 needs to be transferred to the upper layer because the reordering timer expires. It can be learned that after the PDCP layer of the transmit end deletes a data packet, the PDCP layer of the receive end cannot receive the deleted data packet. In this case, the PDCP layer of the receive end enables a reordering timer, to wait for receiving (or detecting) the deleted data packet. The PDCP layer of the receive end can decompress received compressed data packets only when the reordering timer expires. In this case, the PDCP layer of the receive end can find a decompression error, and then sends a control PDU to the transmit end. During running of the reordering timer, more compressed data packets may have been sent to the receive end, and the receive end cannot decompress these data packets. Consequently, a quantity of lost data packets is increased. In addition, because the PDCP layer of the transmit end performs a preprocessing function, more data packets have been compressed by using an unaligned buffer. Consequently, the receive end cannot decompress more compressed data packets. It can be learned that, because a preprocessing procedure is performed and the PDCP layer can find a problem only after the reordering timer expires, there may be a larger quantity of lost data packets in the NR system compared with the LTE system.

Figure 5:
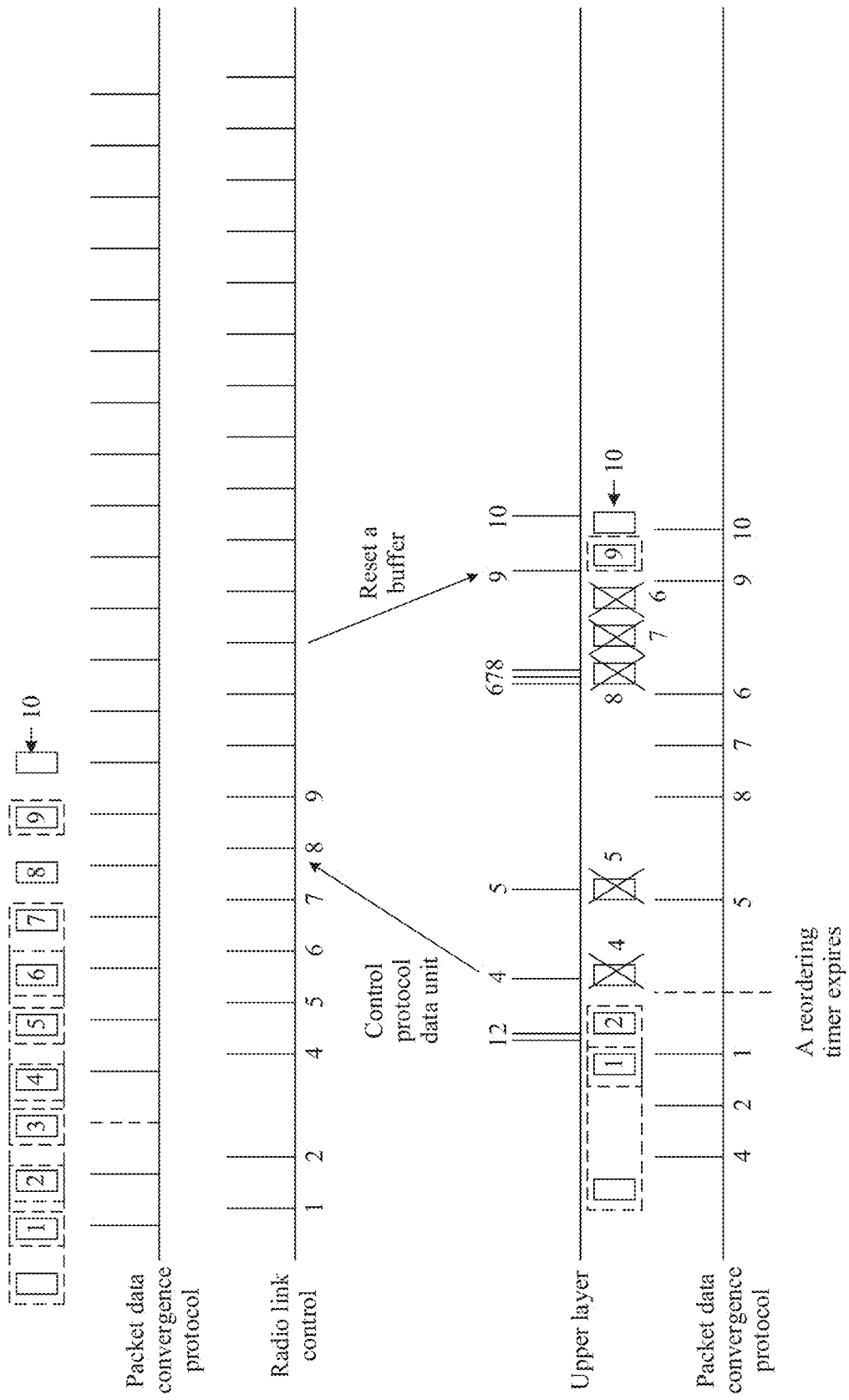
FIG. 5 is a schematic diagram of a feedback mechanism for a decompression error in an NR system.

FIG. 5 is a schematic diagram of a feedback mechanism for a decompression error in an NR system. When a data packet 3 is deleted, a data packet 4, a data packet 5, a data packet 6, a data packet 7, and a data packet 8 have been compressed and packaged, and a compressed data packet 4, a compressed data packet 5, a compressed data packet 6, a compressed data packet 7, and a compressed data packet 8 have been sent to an RLC layer of a transmit end due to preprocessing. If the transmit end normally sends these data packets, a receive end cannot correctly decompress the compressed data packet 4, the compressed data packet 5, the compressed data packet 6, the compressed data packet 7, and the compressed data packet 8. For example, the receive end receives a compressed data packet 1, a compressed data packet 2, and the compressed data packet 4 in order of the compressed data packet 4, the compressed data packet 2, and the compressed data packet 1. In this case, after receiving the compressed data packet 4, the receive end enables a reordering timer, to wait for receiving the compressed data packet 1, the compressed data packet 2, and the compressed data packet 3. Because the receive end cannot wait for the compressed data packet 3, when the reordering timer expires, a PDCP layer of the receive end may decompress the received compressed data packet 1, the compressed data packet 2, and the compressed data packet 4. During decompression, the PDCP layer of the receive end finds that the compressed data packet 4 is unsuccessfully decompressed, and therefore sends a control PDU to the transmit end. However, in a time period for waiting until the reordering timer expires, a plurality of compressed data packets may be sent to the receive end, or a plurality of data packets may be compressed by the transmit end. For example, when a PDCP layer of the transmit end receives the control PDU, the compressed data packet 5 and the compressed data packet 6 have been sent, the compressed data packet 7 and the compressed data packet 8 have been transferred to the RLC layer, and a data packet 9 is not compressed. If the PDCP layer of the transmit end resets a buffer, the PDCP layer of the transmit end can only start compression from the data packet 9 by using a reset buffer. In this case, after receiving a compressed data packet 9, the PDCP layer of the receive end can normally decompress the compressed data packet 9. However, the PDCP layer of the receive end cannot decompress the compressed data packet 4, the compressed data packet 5, the compressed data packet 6, the compressed data packet 7, and the compressed data packet 8. Consequently, a loss of these data packets is caused.

In addition, there is a non-standalone (non-standalone, NSA) scenario. In a current communication system, there is a case in which an NR PDCP layer is used, and only an LTE RLC bearer, for example, a master cell group (master cell group, MCG) bearer, is used; or there is a case in which an NR PDCP layer is used, but not only an LTE RLC bearer, for example, a split (split) bearer, is used. Similarly, in this case, the foregoing compression and decompression process in the NR system may be applied, but the LTE RLC layer and the NR PDCP layer each order data packets passing through the layers. In the NSA scenario, similarly, an event that batches of data packets are lost also occurs. Details are not described herein again. In addition, because both the NR PDCP layer and the LTE RLC layer need to order data packets, a time for finding a compression problem is later than that in the LTE system, and a quantity of lost data packets may be greater than that in the LTE system.

In view of this, the technical solutions in the embodiments of this application are provided. In the embodiments of this application, if a first device deletes a first data packet, the first device may determine a first buffer corresponding to a second data packet, where the first buffer is used to compress the second data packet or used to decompress a compressed second data packet. Then, the first device may indicate the first buffer to a second device, so that the second device can decompress the compressed second data packet by using the first buffer. In this way, even if the first device deletes the first data packet, because a buffer state of the first device can keep consistent with a buffer state of the second device, the first device can still correctly decompress the compressed second data packet whose sequence number follows that of the first data packet. This increases a success rate of decompressing a data packet by a receive end, and decreases a probability that a data packet is lost.

The technical solutions provided in the embodiments of this application may be applied to an LTE system, for example, may be applied to a common LTE system or the internet of vehicles such as vehicle to everything (vehicle to everything, V2X) or LTE-V, or may be applied to an NR system, for example, may be applied to a common NR system or the internet of vehicles such as V2X or NR-V, or may be applied to another similar communication system or a next-generation communication system.

Figure 6A:
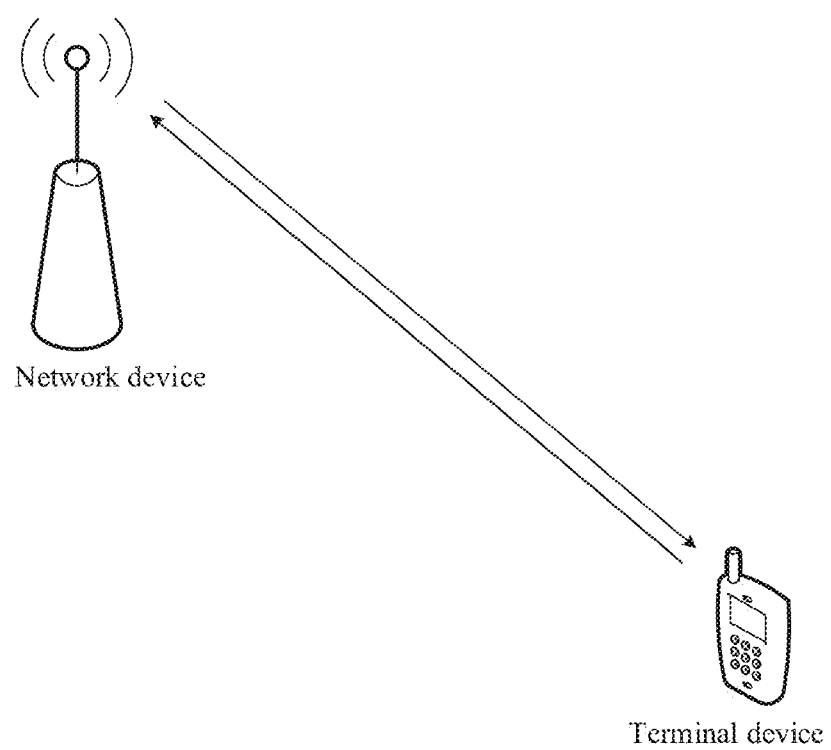
FIG. 6A is a schematic diagram of an application scenario according to an embodiment of this application.

FIG. 6A shows an application scenario according to an embodiment of this application. In FIG. 6A, one network device and one terminal device are included. For example, the network device operates in an evolved universal mobile telecommunications system terrestrial radio access (evolved UMTS terrestrial radio access, E-UTRA) system, or operates in an NR system. Certainly, in the embodiments of this application, one network device may serve a plurality of terminal devices. One terminal device is merely used as an example in FIG. 6A.

In addition, an actual application scenario according to an embodiment of this application is considered. When a user holds a terminal device and needs to perform an operation such as making a long term evolution voice bearer (voice over long term evolution, VoLTE)/voice over new radio (voice over new radio, VoNR) call or accessing the internet by using data traffic (for example, initiating a live broadcast, playing a game, or accessing the internet), the user needs to access a network. At an initial stage of accessing the network, the terminal device usually needs to report, to a base station, whether the terminal device has a capability of supporting data compression. When determining that the terminal device has the capability of supporting data compression, the base station may determine, based on a service initiated by the user, whether to configure a data compression-related parameter for the terminal device. When the base station configures the following: the terminal device can perform data compression, for example, can perform UDC, the terminal device may use a UDC manner in an uplink transmission process, for example, in a process of initiating a VoLTE/VoNR call or initiating a live broadcast. In this case, the terminal device may perform UDC by using a method provided in the embodiments of this application. This can reduce or even avoid a data packet loss caused by compression of uplink data. Similarly, the method provided in the embodiments of this application may also be used for compression of downlink data, to reduce or even avoid a data packet loss caused by compression of the downlink data.

Figure 6B:
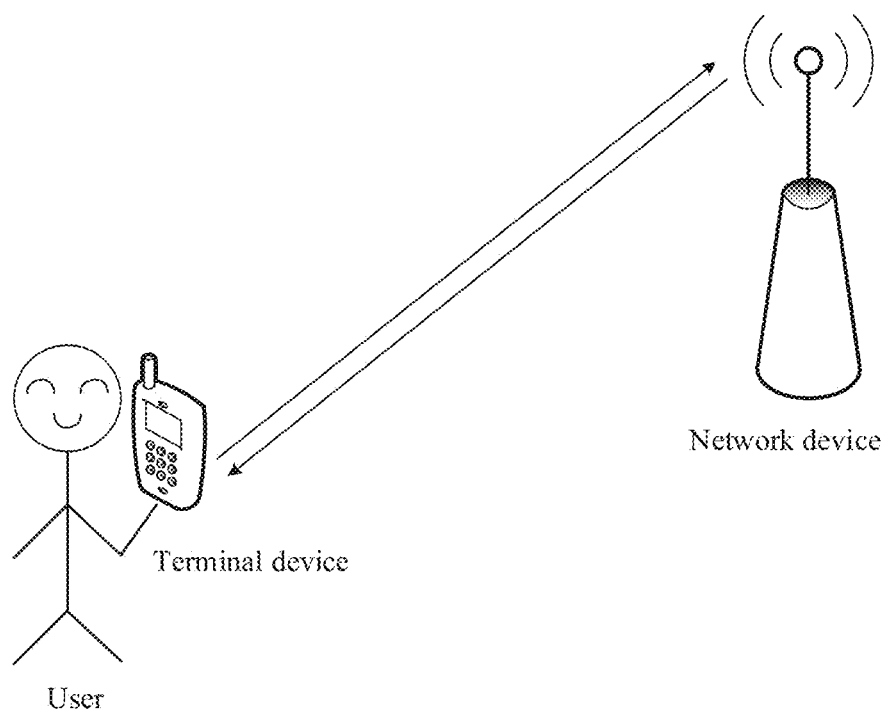
FIG. 6B is a schematic diagram of another application scenario according to an embodiment of this application.

The actual application scenario is considered. FIG. 6B is also a schematic diagram of an application scenario according to an embodiment of this application. FIG. 6B shows an example in which a user holds a terminal device to initiate a VoLTE/VoNR call.

The network device in FIG. 6A or FIG. 6B is, for example, a base station. The network device corresponds to a different device in a different system. For example, the network device may correspond to an eNB in a 4G system, and correspond to a 5G network device such as a gNB in a 5G system. In the 5G system, the network device may be a device on a hybrid network constituted by an LTE network device and an NR network device; and the network device and the terminal device form mixed radio-dual connectivity (mixed radio-dual connectivity, MR-DC). Certainly, the technical solutions provided in the embodiments of this application may also be applied to a future mobile communication system. Therefore, the network device in FIG. 6A or FIG. 6B may also correspond to a network device in the future mobile communication system. FIG. 6A or FIG. 6B shows an example in which the network device is the base station. Actually, with reference to the foregoing descriptions, the network device may alternatively be a device such as an RSU.

In addition, the embodiments of this application are not limited to communication between the network device and the terminal device, and may include communication between network devices or communication between terminal devices. For example, a first device described in the embodiments of this application may be a network device or a terminal device, and a second device described in the embodiments of this application may be a network device or a terminal device. A type combination manner for the first device and the second device is not limited.

The following describes, with reference to the accompanying drawings, the technical solutions provided in the embodiments of this application. It should be noted that, in the embodiments of this application, a serial number of a data packet before compression by a PDCP layer (which is also referred to as a data packet below) may be the same as a serial number of a corresponding compressed data packet. For example, a serial number of a first data packet is the same as a serial number of a compressed first data packet, and a serial number of a second data packet is the same as a serial number of a compressed second data packet. In addition, the technical solutions provided in the embodiments of this application may be applied to transmission of a DRB in AM, or may be applied to transmission of a DRB in unacknowledged mode (unacknowledged mode, UM).

Figure 7:
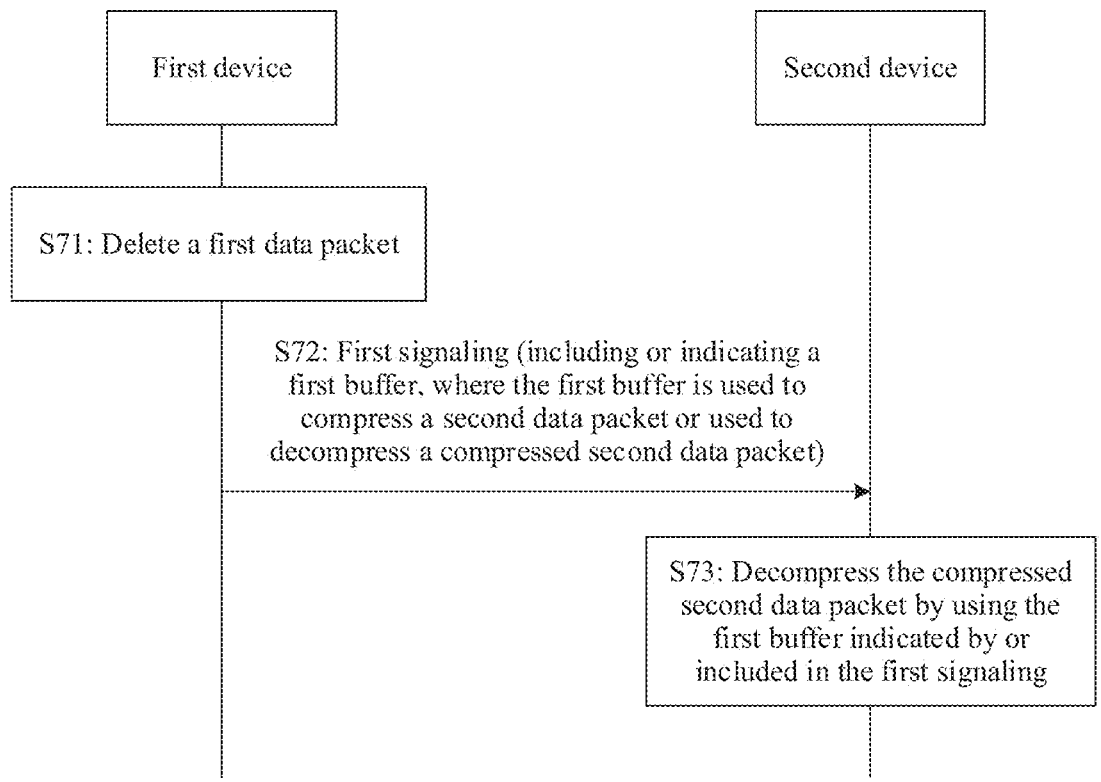
FIG. 7 is a flowchart of a first communication method according to an embodiment of this application.

An embodiment of this application provides a first communication method. FIG. 7 is a flowchart of the method. The following provides descriptions by using an example in which the method is applied to a network architecture shown in FIG. 6A or FIG. 6B. In addition, the method may be executed by two communication apparatuses. The two communication apparatuses are, for example, a first communication apparatus and a second communication apparatus. The first communication apparatus may be a network device or a communication apparatus that can support a network device in implementing functions of the method. Alternatively, the first communication apparatus may be a terminal device or a communication apparatus that can support a terminal device in implementing functions of the method. Certainly, the first communication apparatus may alternatively be another communication apparatus, for example, a chip system. Similarly, the second communication apparatus may be a network device or a communication apparatus that can support a network device in implementing functions of the method. Alternatively, the second communication apparatus may be a terminal device or a communication apparatus that can support a terminal device in implementing functions of the method. Certainly, the second communication apparatus may alternatively be another communication apparatus, for example, a chip system. In addition, implementations of the first communication apparatus and the second communication apparatus are not limited. For example, the first communication apparatus may be a network device, and the second communication apparatus may be a terminal device; both the first communication apparatus and the second communication apparatus may be network devices both the first communication apparatus and the second communication apparatus may be terminal devices; or the first communication apparatus may be a network device, and the second communication apparatus may be a communication apparatus that can support a terminal device in implementing functions of the method. The network device is, for example, a base station.

For ease of description, the following provides descriptions by using an example in which the method is performed by a network device and a terminal device, that is, by using an example in which the first communication apparatus is the network device and the second communication apparatus is the terminal device. Because this embodiment provides descriptions by using the example in which the method is applied to the network architecture shown in FIG. 6A or FIG. 6B, a second device described below may be the network device in the network architecture shown in FIG. 6A or FIG. 6B, and a first device described below may be the terminal device in the network architecture shown in FIG. 6A or FIG. 6B.

S71: The first device deletes a first data packet.

For example, after obtaining the first data packet from an upper layer, a PDCP layer of the first device may enable a discard timer. When the discard timer expires, if the first data packet is not sent from an air interface of the first device, the PDCP layer may delete the first data packet.

S72: The first device sends first signaling to the second device, and the second device receives the first signaling from the first device, where the first signaling includes or indicates a first buffer, the first buffer is used to compress a second data packet or used to decompress a compressed second data packet, a serial number of the first data packet and a serial number of the second data packet are consecutive, the serial number of the second data packet follows the serial number of the first data packet, and the second device is a receiving device of the compressed second data packet.

After deleting the first data packet, the first device may determine a buffer corresponding to the second data packet, for example, the first buffer. The first buffer is used to compress the second data packet, or may be used to decompress the compressed second data packet. That the first device determines the first buffer herein may be actually understood as: The first device determines a state of the buffer, or determines content in the buffer. In other words, the "first buffer" may be understood as the state of the buffer or the content included in the buffer, but not understood as a buffer (buffer) in a hardware sense. In this case, that the first buffer is used to compress the second data packet may be understood as: When the content included in the buffer (or the state of the buffer) is the first buffer, the content included in the buffer may be used to compress the second data packet. Similarly, that the first bullet is used to decompress the compressed second data packet may be understood as: When content included in the first buffer (or a state of the first buffer) is the first buffer, the content included in the buffer is used to decompress the compressed second data packet. For example, the first signaling may indicate that the first buffer corresponds to the second data packet (or corresponds to the compressed second data packet).

Figure 8:
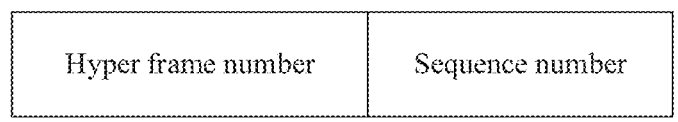
FIG. 8 is a schematic composition diagram of a count value of a data packet.

During transmission through the air interface, each data packet has a corresponding number at the PDCP layer. A number of a data packet at the PDCP layer may include two parts: a sequence number (sequence number, SN) and a hyper frame number (hyper frame number, HFN). The two parts are combined to form the number of the data packet, namely, a count (count) value of the data packet. FIG. 8 is a schematic composition diagram of a count value of a data packet. A serial number of a data packet in the embodiments of this application may be a sequence number of the data packet or a count value of the data packet.

The serial number of the second data packet and the serial number of the first data packet are consecutive, and the serial number of the second data packet follows the serial number of the first data packet. That the serial number of the second data packet follows the serial number of the first data packet means that the second data packet is a next data packet of the first data packet. The serial number of the second data packet may be greater than the serial number of the first data packet. Alternatively, if a maximum value of a serial number is fixed, when a serial number of a data packet is the maximum value, and a serial number of a next data packet of the data packet starts from 0 or 1, the serial number of the second data packet may be less than the serial number of the first data packet.

For example, the first device deletes the first data packet, and the second data packet is, for example, the data packet whose sequence number follows that of the first data packet. For example, a sequence number of the first data packet is 3. In this case, a sequence number of the second data packet is 4. The second data packet may have been compressed, and the second data packet has been compressed before the first data packet is deleted. Therefore, the second data packet has been compressed based on buffer content updated based on the first data packet. In this case, when deleting the first data packet or after deleting the first data packet, the first device may determine the first buffer corresponding to the second data packet, namely, determine the content included in the buffer during compression of the second data packet. For example, data packets to be sent by the first device include a data packet 1, a data packet 2, a data packet 3, and a data packet 4, the first data packet is the data packet 2, and the second data packet is the data packet 3. For example, the buffer can accommodate information of only two data packets. When the first device compresses the data packet 1, the buffer includes only preset information. The first device compresses the data packet 1 based on the preset information, and places the data packet 1 from a backend of the buffer into the buffer after compression is completed. When the first device compresses the data packet 1, the buffer includes only the preset information and the data packet 1. The first device compresses the data packet 2 based on the preset information and the data packet 1, and places the data packet 2 from the backend of the buffer into the buffer after compression is completed. In this case, the preset information is squeezed out of the buffer. When the first device compresses the data packet 3, the buffer includes only the data packet 1 and the data packet 2. The first device compresses the data packet 3 based on the data packet 1 and the data packet 2, and places the data packet 3 from the backend of the buffer into the buffer after compression is completed. In this case, the data packet 1 is squeezed out of the buffer. When the first device compresses the data packet 4, the buffer includes only the data packet 2 and the data packet 3. The first device compresses the data packet 4 based on the data packet 2 and the data packet 3, and places the data packet 4 from the backend of the buffer into the buffer after compression is completed. In this case, the data packet 2 is squeezed out of the buffer. Then, the first device deletes the data packet 3 (or deletes a compressed data packet 3). In this case, when deleting the data packet 3 or after deleting the data packet 3, the first device may determine a first buffer corresponding to the data packet 3, where the first buffer corresponding to the data packet 3 includes the data packet 1 and the data packet 2.

The first signaling is, for example, a control PDU, or may be signaling of another type. The first signaling may further include the serial number of the first data packet or the serial number of the second data packet. A serial number of a data packet is, for example, a corresponding SN or count value at the PDCP layer. The SN or the count value included in the first signaling indicates that the first buffer included in or indicated by the control PDU is a buffer used to decompress the compressed second data packet. This helps the second device quickly find a specific data packet whose deletion leads to the first buffer. Alternatively, the first signaling may further include a serial number of the first buffer. This is not specifically limited. In the embodiments of this application, the control PDU may be a control PDU at a PDCP layer.

S73: A PDCP layer of the second device decompresses the compressed second data packet by using the first buffer indicated by or included in the first signaling.

The first device may indicate the first buffer to the second device by using the first signaling, or the first signaling may include the first buffer. In this way, after receiving the first signaling, the second device can determine the first buffer corresponding to the second data packet, and correctly decompress the compressed second data packet by using the first buffer. In this manner, the second device can correctly decompress the compressed second data packet. This increases a success rate of decompression, prevents the compressed second data packet from being discarded by the second device, and decreases a quantity of lost data packets.

If the technical solution in this embodiment of this application is applied to an NR system, the second device enables a reordering timer to detect a data packet that has been considered to be sent by the second device but has not been received, where the data packet may include the deleted first data packet (certainly, the data packet detected by the second device should be a compressed first data packet). Before the reordering timer expires, if the second device receives the first signaling and the compressed second data packet, the second device may have two processing manners. In one processing manner, the second device waits until the reordering timer expires, and then decompresses the compressed second data packet by using the first buffer. In the other processing manner, the second device does not need to wait until the reordering timer expires, and can decompress the compressed second data packet by using the first buffer provided that the second device receives the first signaling and the compressed second data packet. This shortens processing time of the second device. If the first signaling includes the serial number of the first data packet or the serial number of the second data packet, the second device can quickly determine which data packet is decompressed by using the first buffer currently indicated by or included in the first signaling, and determine impact on the current reordering timer.

Figure 9A:
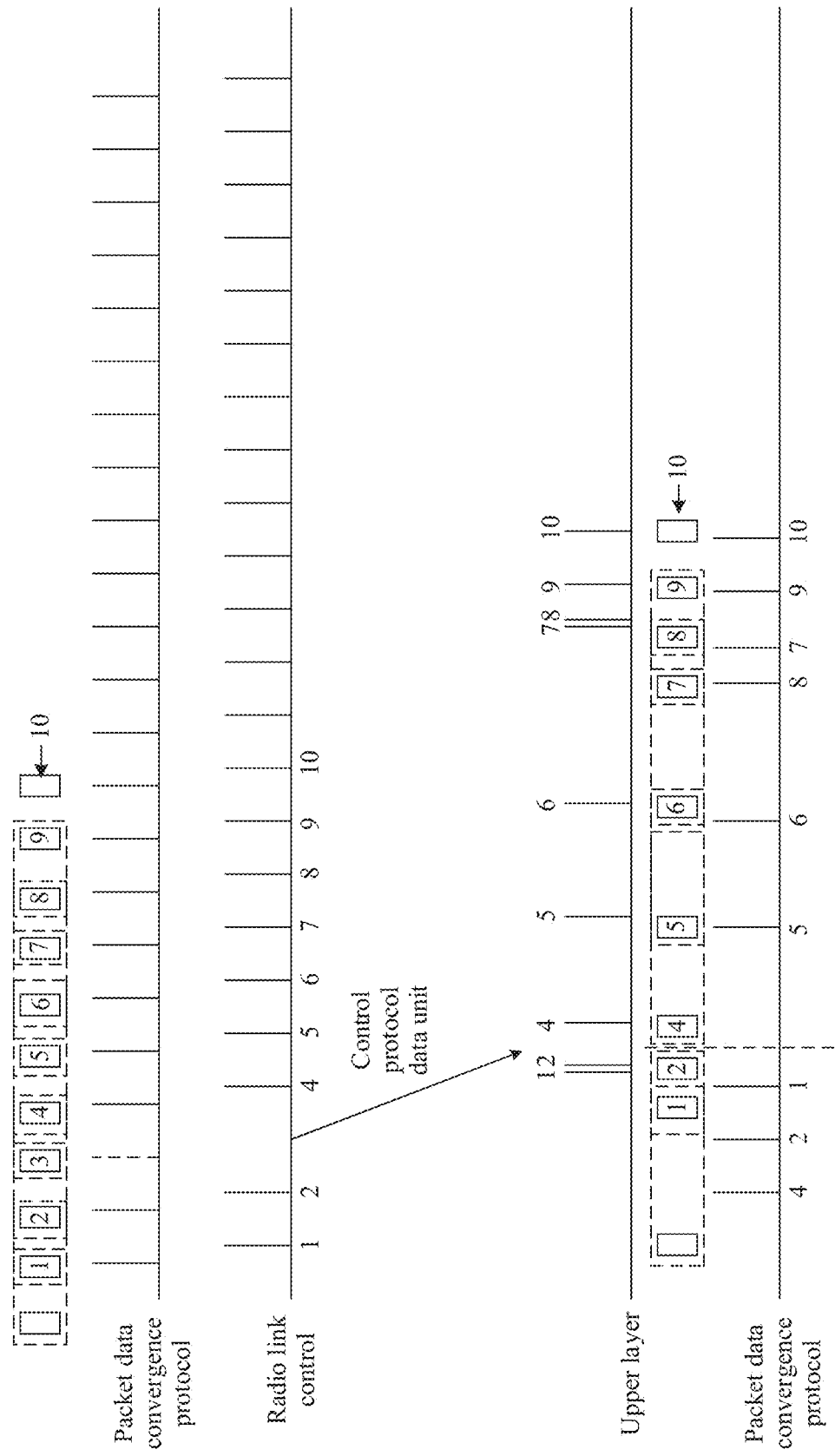
FIG. 9A shows an example of a processing process in an NR system according to an embodiment of this application.

For example, FIG. 9A shows an example of a processing process in an NR system. PDCP and RLC in upper two rows in FIG. 9A represent a PDCP layer and an RLC layer of a first device. For example, a size of a buffer is two data packets. Each dashed-line box represents content included in the buffer. In addition, a dashed-line box including "/" represents preset information included in the buffer. Each data packet is compressed based on content currently included in the buffer. PDCP in lower one row in FIG. 9A represents a PDCP layer of a second device. After receiving a compressed data packet, an RLC layer of the second device does not perform an operation such as ordering, but directly transfers the compressed data packet to the PDCP layer. Therefore, the RLC layer of the second device is not shown in FIG. 9A. For example, in FIG. 9A, if the first device deletes a data packet 3, the first device does not send a compressed data packet 3. The PDCP layer of the second device receives a compressed data packet 1, a compressed data packet 2, and a compressed data packet 4 in order of the compressed data packet 4, the compressed data packet 2, and the compressed data packet 1. In this case, after receiving the compressed data packet 4, the PDCP layer of the second device enables a reordering timer, to wait for receiving the compressed data packet 1, the compressed data packet 2, and the compressed data packet 3. Before the reordering timer expires, the PDCP layer of the second device further receives the compressed data packet 1 and the compressed data packet 2, but does not receive the compressed data packet 3. Therefore, the PDCP layer of the second device keeps the reordering timer running. Before the reordering timer expires, as shown by a vertical dashed line in FIG. 9A, the PDCP layer of the second device receives a control PDU sent by the first device, where the control PDU indicates a first buffer corresponding to the compressed data packet 4. In this case, the PDCP layer of the second device may not need to continue to wait until the reordering timer expires, but may directly decompress the compressed data packet 4 by using the first buffer corresponding to the compressed data packet 4. In addition, the reordering timer is used only for waiting for the compressed data packet 3, and the PDCP layer of the second device can decompress the compressed data packet 4, without requiring the compressed data packet 3. Therefore, the PDCP layer of the second device may alternatively disable the reordering timer. Alternatively, even if the PDCP layer of the second device receives the control PDU before the reordering timer expires, the PDCP layer of the second device still waits until the reordering timer expires, and then decompresses the compressed data packet 4 by using the first buffer corresponding to the compressed data packet 4. After decompressing the compressed data packet 4, the PDCP layer of the second device may transfer a data packet 1, a data packet 2, and a data packet 4 that are obtained through decompression to an upper layer. The PDCP layer of the second device may determine a data packet corresponding to the first buffer as quickly as possible based on a serial number of the first buffer carried in the control PDU or a serial number of the data packet corresponding to the first buffer. For example, if the control PDU carries a serial number of the data packet 4, that is, 4, it indicates that the first buffer is used to decompress the data packet 4; or if the control PDU carries a serial number of the data packet 3, that is, 3, it indicates that the first buffer is buffer content that needs to be updated after the data packet 3 is deleted.

Then, the second device receives a compressed data packet 5, and the PDCP layer of the second device decompresses the compressed data packet 5, and then transfers a data packet 5 obtained through decompression to the upper layer. Then, the second device further receives a compressed data packet 6, a compressed data packet 7, and a compressed data packet 8, and the PDCP layer of the second device receives the three compressed data packets in order of the compressed data packet 8, the compressed data packet 7, and the compressed data packet 6. In this case, after receiving the compressed data packet 8, the PDCP layer of the second device enables a reordering timer to wait for the compressed data packet 6 and the compressed data packet 7. After receiving the compressed data packet 6 and the compressed data packet 7, the PDCP layer of the second device disables the reordering timer, orders the three compressed data packets, sequentially decompresses the three ordered compressed data packets, and then transfers data packets obtained through decompression to the upper layer. For example, the PDCP layer of the second device decompresses the compressed data packet 1 based on preset information included in the buffer, the PDCP layer of the second device decompresses the compressed data packet 2 based on the preset information included in the buffer and information (that is, the data packet 1) obtained by decompressing the compressed data packet 1, and the PDCP layer of the second device decompresses the compressed data packet 3 based on the information (that is, the data packet 1) obtained by decompressing the compressed data packet 1 and information (that is, the data packet 2) obtained by decompressing the compressed data packet 2. The rest may be deduced by analogy. All serial numbers of data packets (or serial numbers of compressed data packets) shown in FIG. 9A are sequence numbers of the data packets at the PDCP layer.

In addition, in the example in the foregoing paragraph, if the PDCP layer of the second device decompresses the compressed second data packet before the reordering timer expires, the PDCP layer of the second device may disable the reordering timer. In other words, in this case, the reordering timer is used only for waiting for the compressed first data packet. Alternatively, there are other cases. For example, if the PDCP layer of the second device receives a compressed data packet 5, but does not receive a compressed data packet 1, a compressed data packet 2, a compressed data packet 3, and a compressed data packet 4, the PDCP layer of the second device enables a reordering timer, to wait for receiving the compressed data packet 1, the compressed data packet 2, the compressed data packet 3, and the compressed data packet 4. For example, if the PDCP layer of the first device deletes a data packet 2 and a data packet 4, the first device may send both a buffer 1 corresponding to a data packet 3 and a buffer 2 corresponding to a data packet 5 to the second device, where the buffer 1 is a buffer state corresponding to the data packet 3, and the buffer 2 is a buffer state corresponding to the data packet 5. However, at a moment before the reordering timer expires, if the PDCP layer of the second device first receives the buffer 2 corresponding to the data packet 5, but does not receive the buffer 1 corresponding to the data packet 3, the PDCP layer of the second device may decompress the compressed data packet 5 by using the buffer 2 corresponding to the data packet 5. In this case, the PDCP layer of the second device may not disable the reordering timer, but continue to wait for receiving the compressed data packet 2. Then, the PDCP layer of the second device may receive the buffer 1 corresponding to the data packet 3 before the reordering timer expires. In this case, the PDCP layer of the second device may decompress the compressed data packet 3 by using the buffer 1 corresponding to the data packet 3, and disable the reordering timer.

Figure 9B:
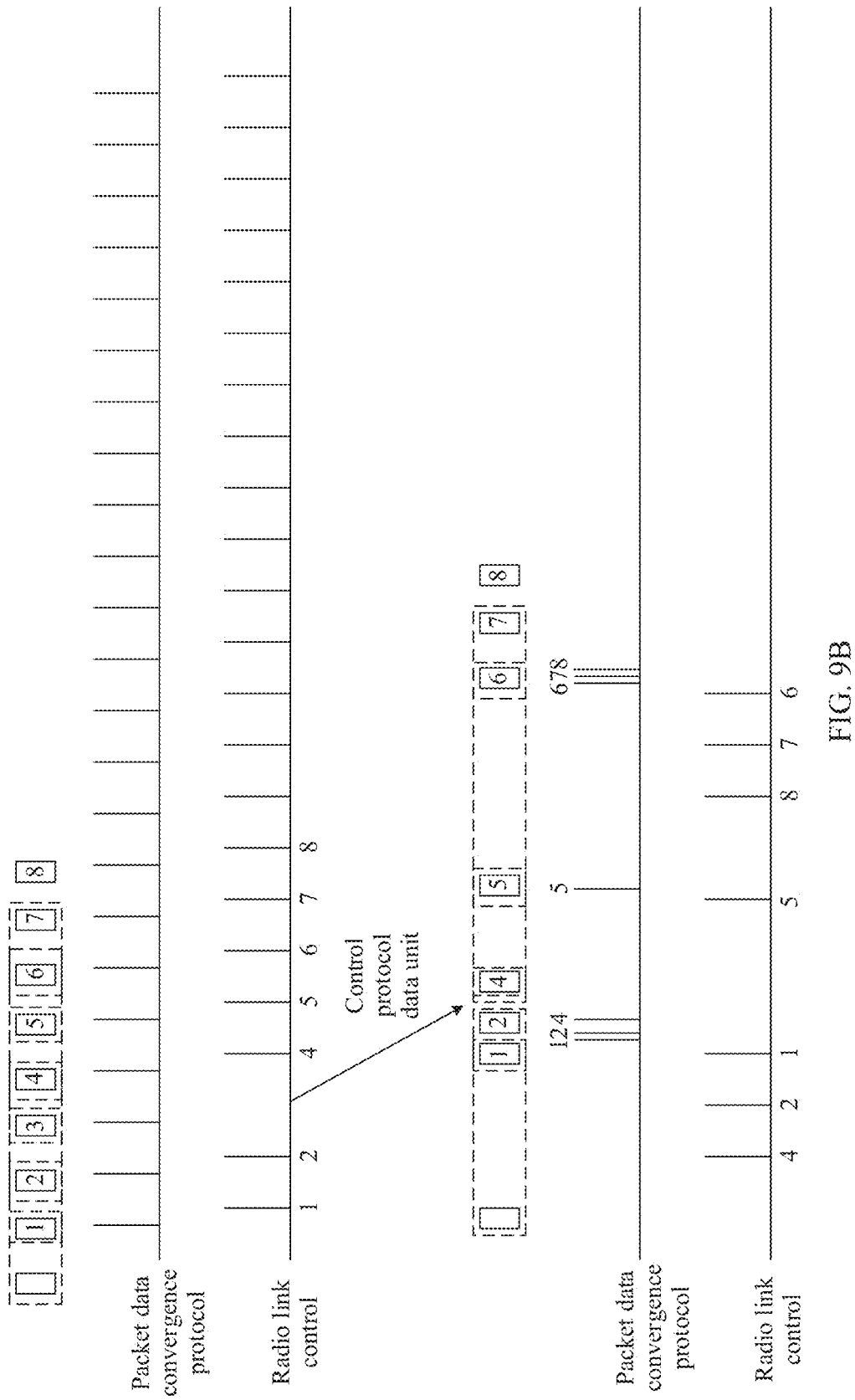
FIG. 9B shows an example of a processing process in an LTE system according to an embodiment of this application.

FIG. 9B also shows an example of a data packet compression and decompression process in an LTE system. PDCP and RLC in upper two rows in FIG. 9B represent a PDCP layer and an RLC layer of a first device. For example, a size of a buffer is two data packets. Each dashed-line box represents content included in the buffer. In addition, a dashed-line box including "/" represents preset information included in the buffer. Each data packet is compressed based on content currently included in the buffer. PDCP and RLC in lower two rows in FIG. 9B represent a PDCP layer and an RLC layer of a second device. In the LTE system, the RLC layer of the second device received compressed data packets, and then transfers the ordered compressed data packets to the PDCP layer. For example, if the PDCP layer of the first device deletes a data packet 3, the PDCP layer of the first device may send a control PDU to a receive end, to indicate a first buffer corresponding to a data packet 4. For example, the RLC layer of the second device receives a compressed data packet 1, a compressed data packet 2, and a compressed data packet 4 in order of the compressed data packet 4, the compressed data packet 2, and the compressed data packet 1 (the RLC layer of the first device has renumbered the compressed data packet 4, and for the RLC layer, a number of the compressed data packet 4 is 3 at the RLC layer). In this case, after receiving the compressed data packet 1, the RLC layer of the second device orders the three compressed data packets, and then transfers the three compressed data packets to the PDCP layer of the second device in regular order. After receiving the three compressed data packets, the PDCP layer of the second device sequentially decompresses the three compressed data packets. For the PDCP layer of the second device, the compressed data packet 4 is not the compressed data packet 3, and the compressed data packet 3 is not received. In this case, an error is bound to occur when the PDCP layer of the second device decompresses the compressed data packet 4. However, the PDCP layer of the second device further receives the control PDU from a transmit end. Therefore, the PDCP layer can correctly decompress the compressed data packet 4 based on an indication of the control PDU.

Then, the second device receives a compressed data packet 5, the RLC layer of the second device transfers the compressed data packet 5 to the PDCP layer of the second device, and the PDCP layer of the second device decompresses the compressed data packet 5. Then, the second device further receives a compressed data packet 6, a compressed data packet 7, and a compressed data packet 8, and the RLC layer of the second device receives the three data packets in order of the compressed data packet 8, the compressed data packet 7, and the compressed data packet 6. In this case, after receiving the compressed data packet 6, the RLC layer of the second device orders the three compressed data packets, and then transfers the ordered three compressed data packets to the PDCP layer of the second device. After receiving the three compressed data packets, the PDCP layer of the second device sequentially decompresses the three compressed data packets. For example, the PDCP layer of the second device decompresses the compressed data packet 1 based on preset information included in the buffer, the PDCP layer of the second device decompresses the compressed data packet 2 based on the preset information included in the buffer and information (that is, a data packet 1) obtained by decompressing the compressed data packet 1, and the PDCP layer of the second device decompresses the compressed data packet 3 based on the information (that is, the data packet 1) obtained by decompressing the compressed data packet 1 and information (that is, a data packet 2) obtained by decompressing the compressed data packet 2. The rest may be deduced by analogy. All serial numbers of data packets (or serial numbers of compressed data packets) shown in FIG. 9B are sequence numbers of the data packets at the PDCP layer.

In addition, a case is further considered: if the second device does not receive the first signaling when the second device receives the compressed second data packet or when the second device needs to decompress the compressed second data packet, the PDCP layer of the second device may continue to decompress the compressed second data packet, but the PDCP layer of the second device unsuccessfully decompresses the compressed second data packet. In this case, the second device may store the compressed second data packet, and then decompress, after receiving the first signaling, the compressed second data packet by using the first buffer indicated by or included in the first signaling. This decreases a probability that the second data packet is discarded. In an optional manner, considering that storage space of the second device is limited and it is not appropriate to wait for the first signaling for a long time, a first timer may be set. For example, the second device may enable the first timer when storing the compressed second data packet. If the first signaling is received before the first timer expires, the second device may decompress the compressed second data packet by using the first buffer indicated by the first signaling, and disable the first timer. However, if the second device does not receive the first signaling when the first timer expires, the second device may discard the compressed second data packet. This saves storage space of the second device. Timing duration of the first timer may be set by the second device, or may be specified according to a protocol.

In this embodiment of this application, if the first device deletes the first data packet, the first device may indicate the first buffer corresponding to the second data packet to the second device, so that the second device can decompress the second data packet by using the first buffer. In this way, even if the first device deletes the first data packet, because a buffer state of the first device can keep consistent with a buffer state of the second device, the first device can still correctly decompress the compressed second data packet whose serial number follows that of the first data packet. This increases a success rate of decompressing a compressed data packet by a receive end, and decreases a probability that a data packet is lost.

Figure 10:
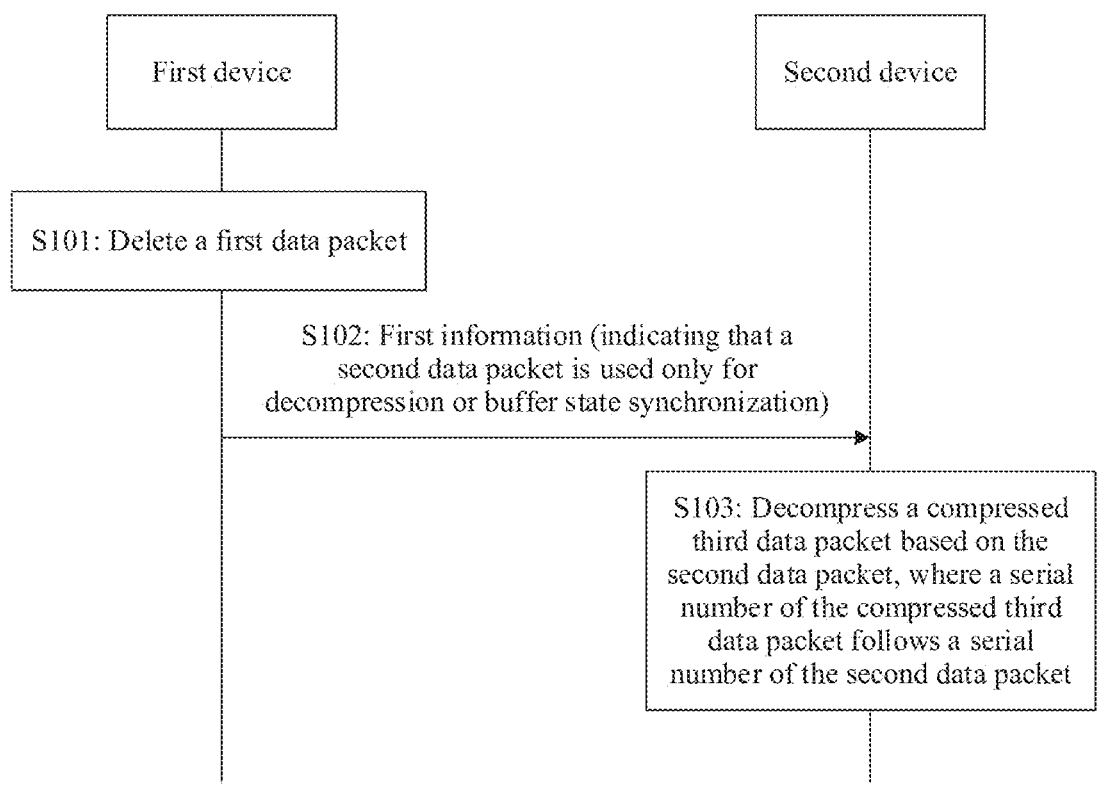
FIG. 10 is a flowchart of a second communication method according to an embodiment of this application.

An embodiment of this application provides a second communication method, to resolve same technical problems. FIG. 10 is a flowchart of the method. The following provides descriptions by using an example in which the method is applied to a network architecture shown in FIG. 6A or FIG. 6B. In addition, the method may be executed by two communication apparatuses. The two communication apparatuses are, for example, a third communication apparatus and a fourth communication apparatus. The third communication apparatus may be a network device or a communication apparatus that can support a network device in implementing functions of the method. Alternatively, the third communication apparatus may be a terminal device or a communication apparatus that can support a terminal device in implementing functions of the method. Certainly, the third communication apparatus may alternatively be another communication apparatus, for example, a chip system. Similarly, the fourth communication apparatus may be a network device or a communication apparatus that can support a network device in implementing functions of the method. Alternatively, the fourth communication apparatus may be a terminal device or a communication apparatus that can support a terminal device in implementing functions of the method. Certainly, the fourth communication apparatus may alternatively be another communication apparatus, for example, a chip system. In addition, implementations of the third communication apparatus and the fourth communication apparatus are not limited. For example, the third communication apparatus may be a network device, and the fourth communication apparatus may be a terminal device; both the third communication apparatus and the fourth communication apparatus may be network devices; both the third communication apparatus and the fourth communication apparatus may be terminal devices; or the third communication apparatus may be a network device, and the fourth communication apparatus may be a communication apparatus that can support a terminal device in implementing functions of the method. The network device is, for example, a base station.

For ease of description, the following provides descriptions by using an example in which the method is performed by a network device and a terminal device, that is, by using an example in which the third communication apparatus is the network device and the fourth communication apparatus is the terminal device. Because this embodiment provides descriptions by using the example in which the method is applied to the network architecture shown in FIG. 6A or FIG. 6B, a second device described below may be the network device in the network architecture shown in FIG. 6A or FIG. 6B, and a first device described below may be the terminal device in the network architecture shown in FIG. 6A or FIG. 6B.

S101: A PDCP layer of the first device deletes a first data packet.

For example, after obtaining the first data packet from an upper layer, the PDCP layer may enable a discard timer. When the discard timer expires, if the first data packet is not sent from an air interface of a transmit end, the PDCP layer deletes the first data packet. Alternatively, the PDCP layer of the first device may delete the first data packet for some other reasons.

S102: The first device sends first information to the second device, and the second device receives the first information from the first device, where the first information indicates that a second data packet is used only for decompression or buffer state synchronization, the second data packet is a compressed first data packet, and the second device is a receiving device of the second data packet.

In this embodiment of this application, the PDCP layer of the first device compresses the first data packet, to obtain the second data packet. Although the first device determines to delete the first data packet, the first device still sends the second data packet to the second device, and indicates that the second data packet is used only for decompression. After receiving the second data packet, the second device uses the second data packet only for decompressing another data packet, but does not use the second data packet for another purpose. Therefore, decompression of the another data packet can be completed, and the first data packet that should have been deleted is not used for another purpose.

The first device may send the first information to the second device in different manners, where the first information indicates that the second data packet is used only for decompression or buffer state synchronization.

Manner 1: The PDCP layer of the first device adds a first identifier to the second data packet, where the first identifier indicates that the second data packet is used only for decompression or buffer state synchronization. For example, the PDCP layer may add the first identifier to a header of the second data packet. The first information may include the first identifier.

In this manner, although the PDCP layer of the first device deletes the first data packet, before the deletion, the PDCP layer compresses the first data packet, to obtain the second data packet. The first device may add the first identifier to the second data packet at the PDCP layer, and still sends the second data packet to the second device. After sending the second data packet (for the PDCP layer, it may be considered that the second data packet is transferred to an RLC layer), the PDCP layer may delete the locally stored first data packet.

Manner 2: An RLC layer of the first device adds a first identifier to the second data packet, where the first identifier indicates that the second data packet is used only for decompression or buffer state synchronization. For example, the RLC layer may add the first identifier to a header of the second data packet. The first information may include the first identifier.

In this manner, the PDCP layer of the first device may determine to delete the first data packet. However, the first data packet has been compressed into the second data packet, and the second data packet may have been transferred to the RLC layer. In this case, the PDCP layer may notify the RLC layer to delete the second data packet. In addition, the PDCP layer may delete the locally stored first data packet. After receiving a notification from the PDCP layer, the RLC layer may add the first identifier to the second data packet, and continue to send the second data packet.

In Manner 1 and Manner 2, the first device may directly add the first identifier to the second data packet for indication, and therefore only needs to normally send the second data packet to the second device. After receiving the second data packet, the second device may determine, based on the first identifier carried in the second data packet, that the second data packet is used only for decompression, without requiring the first device to send quite much information for indication. This helps reduce signaling overheads.

Manner 3: The PDCP layer of the first device sends a control PDU to the second device, where the control PDU carries the second data packet, and the control PDU indicates that the second data packet is used only for decompression or buffer state synchronization. The first information may be the control PDU.

In this manner, a structure of the second data packet does not need to be changed, and no information needs to be added to the second data packet, but the second data packet needs to be carried in the control PDU and sent to the second device. The control PDU may be indicate that the second data packet is used only for decompression or buffer state synchronization. Then, after receiving the control PDU, the second device may determine that the data packet carried in the control PDU is a data packet used only for decompression or buffer state synchronization. This indication manner is simple and has a clear indication.

In an optional manner, the control PDU may further include a serial number of the first data packet or a serial number of the second data packet. A serial number of a data packet is added to the control PDU, so that the second device can determine a location of a corresponding data packet in a plurality of data packets.

S103: A PDCP layer of the second device decompresses a compressed third data packet based on the second data packet, where a serial number of the compressed third data packet follows the serial number of the second data packet. The serial number of the compressed third data packet may be the same as a serial number of a third data packet. In this case, the serial number of the third data packet follows the serial number of the second data packet, and the serial number of the compressed third data packet also follows the serial number of the second data packet.

The second device may determine, based on the first information, that the second data packet is used only for decompression. Then, the second device uses the second data packet only for decompression, but does not use the second data packet for another purpose. For example, after decompressing another data packet (for example, the compressed third data packet) based on the second data packet, the second device does not transfer a decompressed second data packet (that is, the first data packet) to an upper layer of the PDCP layer. For example, the second device may discard the first data packet (or discard a decompressed first data packet). The compressed third data packet is a data packet that needs to be decompressed based on the first data packet. For example, during decompression of the compressed third data packet, a buffer needs to include the first data packet. Therefore, the second device decompresses the second data packet, to obtain the first data packet, and then decompresses the compressed third data packet based on the first data packet.

Figure 11:
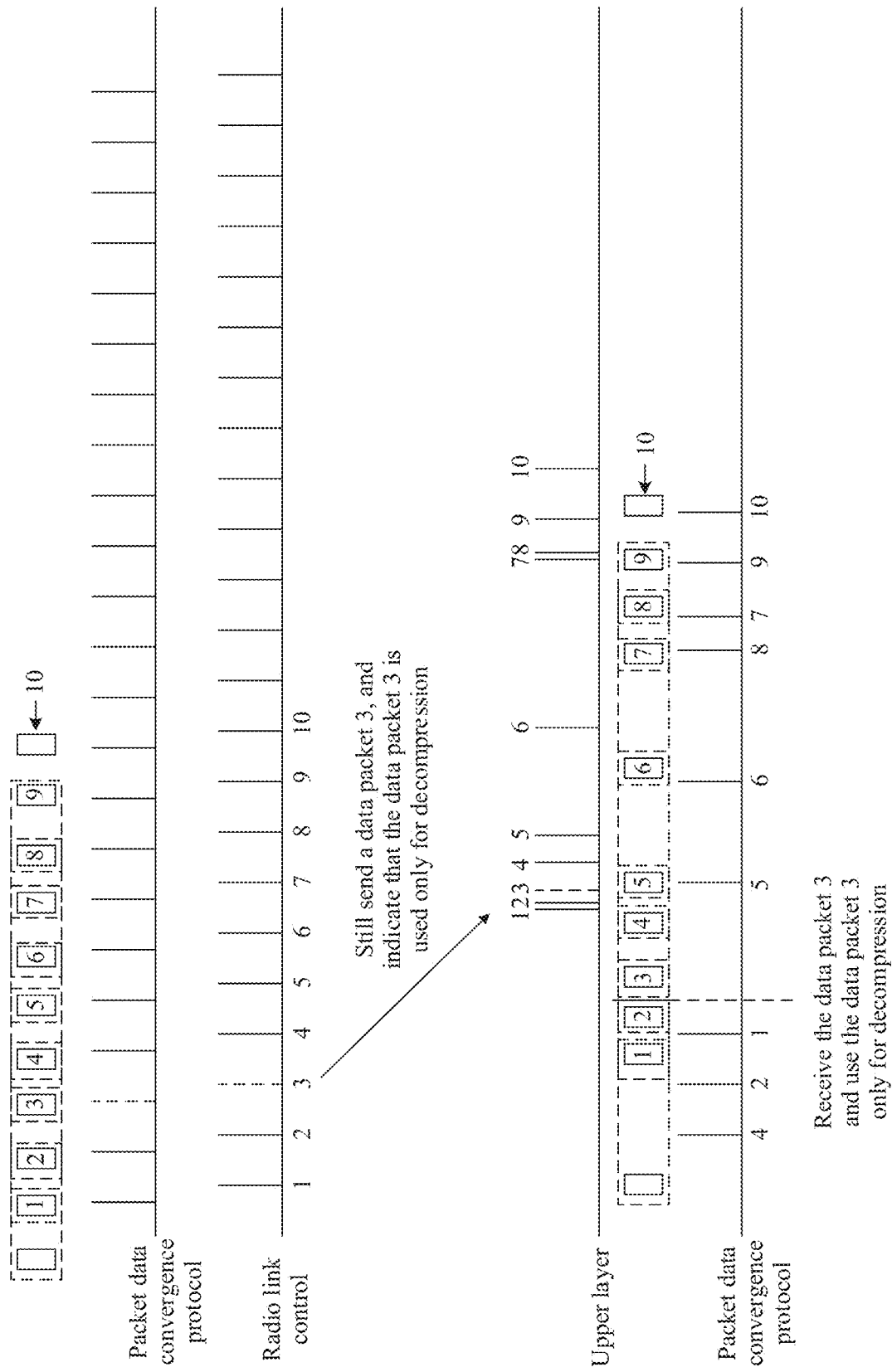
FIG. 11 shows an example of a processing process in an NR system according to an embodiment of this application.

For example, FIG. 11 shows an example of a processing process in an NR system. PDCP and RLC in upper two rows in FIG. 11 represent a PDCP layer and an RLC layer of a first device. For example, a size of a buffer is two data packets. Each dashed-line box represents content included in the buffer. In addition, a dashed-line box including "/" represents preset information included in the buffer. Each data packet is compressed based on content currently included in the buffer. PDCP in lower one row in FIG. 11 represents a PDCP layer of a second device. After receiving a data packet, an RLC layer of the second device does not perform an operation such as ordering, but directly transfers the data packet to the PDCP layer. Therefore, the RLC layer of the second device is not shown in FIG. 11. For example, in FIG. 11, even if the first device deletes a data packet 3, the first device may still continue to send a compressed data packet 3, and indicate, by using first information, that the compressed data packet 3 is used only for decompression. The PDCP layer of the second device receives a compressed data packet 1, a compressed data packet 2, the compressed data packet 3, and a compressed data packet 4 in order of the compressed data packet 3, the compressed data packet 4, the compressed data packet 2, and the compressed data packet 1. In this case, after receiving the compressed data packet 3, the PDCP layer of the second device enables a reordering timer, to wait for receiving the compressed data packet 1, the compressed data packet 2, and the compressed data packet 4. Before the reordering timer expires, if the PDCP layer of the second device receives the compressed data packet 1, the compressed data packet 2, and the compressed data packet 4, the PDCP layer of the second device disables the reordering timer, and orders the four compressed data packets. After ordering, the PDCP layer of the second device sequentially decompresses the compressed data packet 1, the compressed data packet 2, the compressed data packet 3, and the compressed data packet 4. The PDCP layer of the second device also receives the compressed data packet 3, and therefore can correctly decompress the compressed data packet 4 based on the compressed data packet 3. After decompression, the PDCP layer of the second device transfers a data packet 1, a data packet 2, and a data packet 4 that are obtained through decompression to an upper layer. However, because the compressed data packet 3 is used only for decompression, but not for another purpose, the PDCP layer of the second device does not transfer a data packet 3 obtained through decompression to the upper layer. Then, if the data packet 3 further needs to be used to decompress another data packet, the PDCP layer of the second device may temporarily store the data packet 3. If the data packet 3 does not need to be used to decompress another data packet, the PDCP layer of the second device may delete the data packet 3.

Then, the second device receives a compressed data packet 5, and the PDCP layer of the second device decompresses the compressed data packet 5, and then transfers a data packet 5 obtained through decompression to the upper layer. Then, the second device further receives a compressed data packet 6, a compressed data packet 7, and a compressed data packet 8, and the PDCP layer of the second device receives the three compressed data packets in order of the compressed data packet 8, the compressed data packet 7, and the compressed data packet 6. In this case, after receiving the compressed data packet 8, the PDCP layer of the second device enables a reordering timer, to wait for the compressed data packet 6 and the compressed data packet 7. After receiving the compressed data packet 6 and the compressed data packet 7, the PDCP layer of the second device disables the reordering timer, orders the three compressed data packets, sequentially decompresses the three ordered compressed data packets, and then transfers data packets obtained through decompression to the upper layer. For example, the PDCP layer of the second device decompresses the compressed data packet 1 based on preset information included in the buffer, the PDCP layer of the second device decompresses the compressed data packet 2 based on the preset information included in the buffer and information (that is, the data packet 1) obtained by decompressing the compressed data packet 1, and the PDCP layer of the second device decompresses the compressed data packet 3 based on the information (that is, the data packet 1) obtained by decompressing the compressed data packet 1 and information (that is, the data packet 2) obtained by decompressing the compressed data packet 2. The rest may be deduced by analogy. All serial numbers of data packets (or serial numbers of compressed data packets) shown in FIG. 11 are sequence numbers of the data packets at the PDCP layer.

Figure 12:
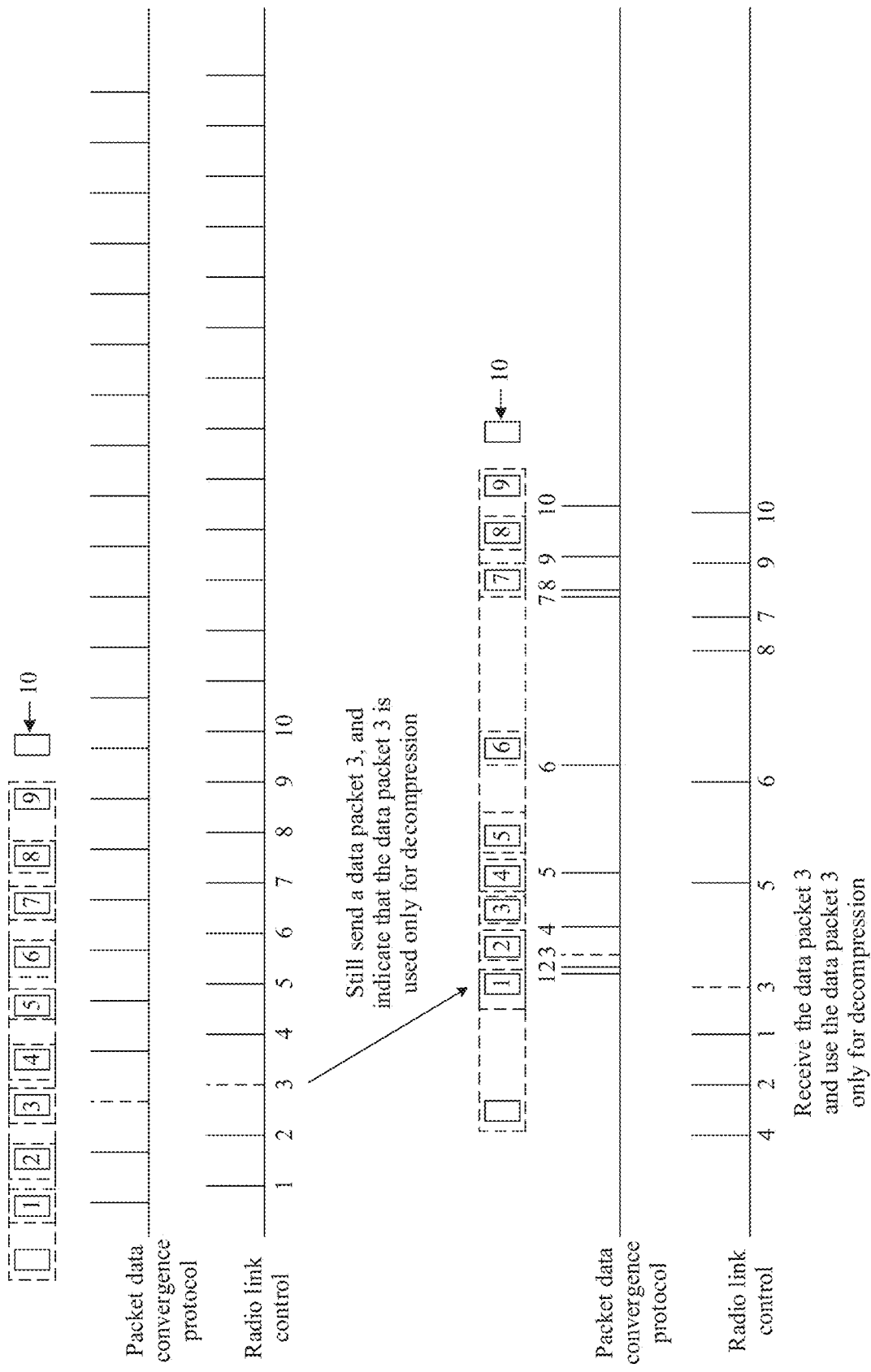
FIG. 12 shows an example of a processing process in an LTE system according to an embodiment of this application.

FIG. 12 also shows an example of a data packet compression and decompression process in an LTE system. PDCP and RLC in upper two rows in FIG. 12 represent a PDCP layer and an RLC layer of a first device. For example, a size of a buffer is two data packets. Each dashed-line box represents content included in the buffer. In addition, a dashed-line box including "/" represents preset information included in the buffer. Each data packet is compressed based on content currently included in the buffer. PDCP and RLC in lower two rows in FIG. 12 represent a PDCP layer and an RLC layer of a second device. In the LTE system, the RLC layer of the second device orders received compressed data packets, and then transfers the ordered compressed data packets to the PDCP layer. For example, the PDCP layer of the first device determines to delete a data packet 3. However, the PDCP layer of the first device still continues to send a compressed data packet 3, and indicates, by using first information, that the compressed data packet 3 is used only for decompression. For example, the RLC layer of the second device receives a compressed data packet 1, a compressed data packet 2, a compressed data packet 3, and a compressed data packet 4 in order of the compressed data packet 3, the compressed data packet 4, the compressed data packet 2, and the compressed data packet 1. In this case, after receiving the compressed data packet 1, the RLC layer of the second device orders the four compressed data packets, and then transfers the four compressed data packets to the PDCP layer of the second device in regular order. After receiving the four compressed data packets, the PDCP layer of the second device sequentially decompresses the four compressed data packets. The PDCP layer of the second device also receives the compressed data packet 3, and therefore the PDCP layer of the second device can correctly decompress the compressed data packet 4 based on the compressed data packet 3. After decompression, the PDCP layer of the second device transfers a data packet 1, a data packet 2, and a data packet 4 that are obtained through decompression to an upper layer. However, because the compressed data packet 3 is used only for decompression, but not for another purpose, the PDCP layer of the second device does not transfer a data packet 3 obtained through decompression to the upper layer. Then, if the data packet 3 further needs to be used to decompress another data packet, the PDCP layer of the second device may temporarily store the data packet 3. If the data packet 3 does not need to be used to decompress another data packet, the PDCP layer of the second device may delete the data packet 3.

Then, the second device receives a compressed data packet 5, the RLC layer of the second device transfers the compressed data packet 5 to the PDCP layer of the second device, and the PDCP layer of the second device decompresses the compressed data packet 5. Then, the second device further receives a compressed data packet 6, a compressed data packet 7, and a compressed data packet 8, and the RLC layer of the second device receives the three compressed data packets in order of the compressed data packet 8, the compressed data packet 7, and the compressed data packet 6. In this case, after receiving the compressed data packet 6, the RLC layer of the second device orders the three compressed data packets, and then transfers the ordered three compressed data packets to the PDCP layer of the second device. After receiving the three compressed data packets, the PDCP layer of the second device sequentially decompresses the three compressed data packets.

For example, the PDCP layer of the second device decompresses the compressed data packet 1 based on preset information included in the buffer, the PDCP layer of the second device decompresses the compressed data packet 2 based on the preset information included in the buffer and information (that is, the data packet 1) obtained by decompressing the compressed data packet 1, and the PDCP layer of the second device decompresses the compressed data packet 3 based on the information (that is, the data packet 1) obtained by decompressing the compressed data packet 1 and information (that is, the data packet 2) obtained by decompressing the compressed data packet 2. The rest may be deduced by analogy. All numbers of data packets shown in FIG. 12 are sequence numbers of the data packets at the PDCP layer.

In this embodiment of this application, although the PDCP layer of the first device determines to delete the first data packet, the first device still sends the compressed first data packet to the second device, and indicates that the compressed first data packet is used only for decompression. After receiving the compressed first data packet the second device uses the compressed first data packet only for decompressing another data packet, but does not use the compressed first data packet for another purpose. Therefore, decompression of the another data packet can be completed, an occurrence probability of a decompression error is decreased, and a quantity of lost data packets is correspondingly decreased. In addition, the first data packet that should have been deleted is not used for another purpose, so that an error is avoided.

Figure 13:
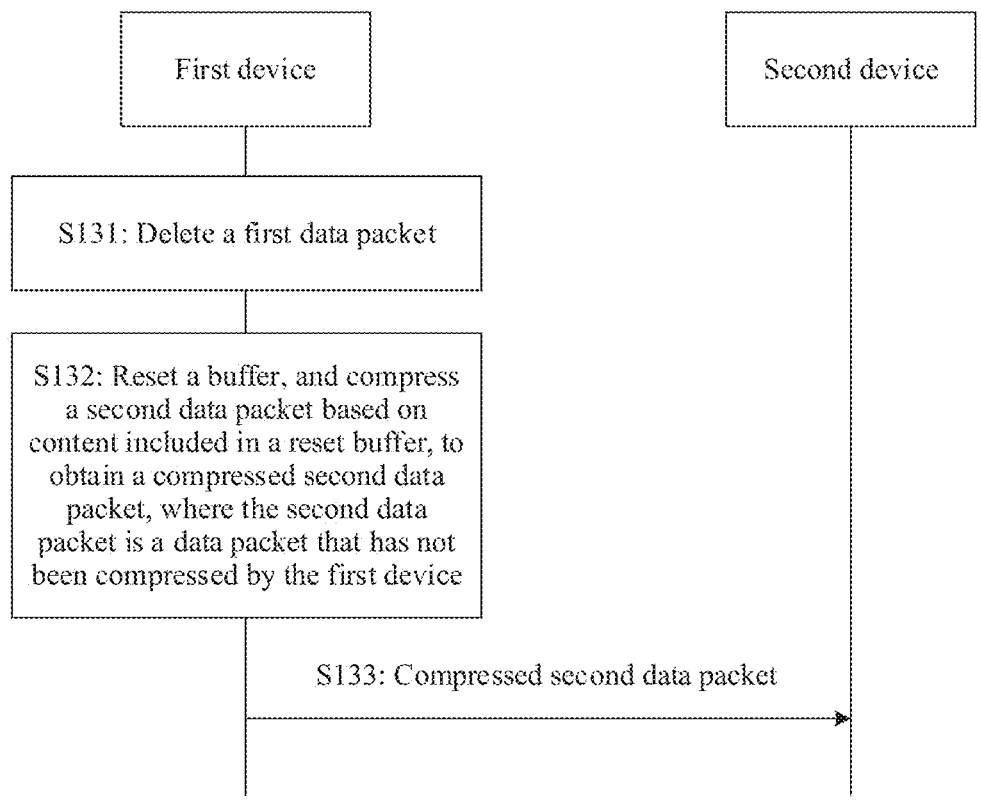
FIG. 13 is a flowchart of a third communication method according to an embodiment of this application.

An embodiment of this application provides a third communication method, to resolve same technical problems. FIG. 13 is a flowchart of the method. The following provides descriptions by using an example in which the method is applied to a network architecture shown in FIG. 6A or FIG. 6B. In addition, the method may be executed by two communication apparatuses. The two communication apparatuses are, for example, a fifth communication apparatus and a sixth communication apparatus. The fifth communication apparatus may be a network device or a communication apparatus that can support a network device in implementing functions of the method. Alternatively, the fifth communication apparatus may be a terminal device or a communication apparatus that can support a terminal device in implementing functions of the method. Certainly, the fifth communication apparatus may alternatively be another communication apparatus, for example, a chip system. Similarly, the sixth communication apparatus may be a network device or a communication apparatus that can support a network device in implementing functions of the method. Alternatively, the sixth communication apparatus may be a terminal device or a communication apparatus that can support a terminal device in implementing functions of the method. Certainly, the sixth communication apparatus may alternatively be another communication apparatus, for example, a chip system. In addition, implementations of the fifth communication apparatus and the sixth communication apparatus are not limited. For example, the fifth communication apparatus may be a network device, and the sixth communication apparatus may be a terminal device; both the fifth communication apparatus and the sixth communication apparatus may be network devices; both the fifth communication apparatus and the sixth communication apparatus may be terminal devices; or the fifth communication apparatus may be a network device, and the sixth communication apparatus may be a communication apparatus that can support a terminal device in implementing functions of the method. The network device is, for example, a base station.

For ease of description, the following provides descriptions by using an example in which the method is performed by a network device and a terminal device, that is, by using an example in which the fifth communication apparatus is the network device and the sixth communication apparatus is the terminal device. Because this embodiment provides descriptions by using the example in which the method is applied to the network architecture shown in FIG. 6A or FIG. 6B, a second device described below may be the network device in the network architecture shown in FIG. 6A or FIG. 6B, and a first device described below may be the terminal device in the network architecture shown in FIG. 6A or FIG. 6B.

S131: The first device deletes a first data packet.

For example, after obtaining the first data packet from an upper layer, a PDCP layer of the first device may enable a discard timer. When the discard timer expires, if the first data packet is not sent from an air interface of a transmit end, the PDCP layer deletes the first data packet. Alternatively, the PDCP layer of the first device may delete the first data packet for some other reasons.

S132: The first device resets a buffer, and compresses a second data packet based on content included in a reset buffer, to obtain a compressed second data packet, where the second data packet is a data packet that has not been compressed by the first device.

In the embodiments of this application, resetting (reset) the buffer may be clearing the buffer, clearing the buffer and then configuring preset information for the cleared buffer, or directly configuring preset information for the buffer. The preset information is, for example, a predefined dictionary (predefined dictionary). The predefined dictionary may be set by the first device, specified according to a protocol, or configured by the second device. Resetting the buffer is directly configuring a predefined dictionary for the buffer. In this case, it may be understood that original content in the buffer is overwritten with the predefined dictionary.

In addition, resetting the buffer may be clearing the buffer and then configuring a predefined dictionary for the buffer. In this case, resetting the buffer is understood as clearing the buffer and configuring the predefined dictionary for the buffer, and both the operations belong to the operation of "resetting the buffer". Alternatively, there may be another understanding. To be specific, resetting the buffer may be clearing the buffer; and configuring a predefined dictionary for the cleared buffer is another operation. In this case, it may be understood that after resetting the buffer (that is, clearing the buffer), the first device may further configure the predefined dictionary for the buffer. In other words, based on this understanding, the operation of "configuring a predefined dictionary for the cleared buffer" does not belong to the operation of "resetting the buffer", but is another operation performed after the operation of "resetting the buffer" ends. In addition, when data packets have similar content, compared with the operation of only clearing the buffer, the operation of clearing the buffer and then configuring a predefined dictionary for the buffer content can effectively improve a data packet compression rate for the cleared buffer.

For example, if the PDCP layer of the first device deletes a data packet 3, the first device may reset the buffer. In this case, if a data packet 4, a data packet 5, and a data packet 6 have been compressed, and a data packet 7 has not been compressed, the first device compresses the data packet 7 by using the reset buffer.

In addition, the first device may further add a second identifier to the compressed second data packet, where the second identifier indicates that the compressed second data packet is a data packet compressed by using the reset buffer. For example, the PDCP layer of the first device may add the second identifier to the compressed second data packet, for example, add the second identifier to a header of the compressed second data packet. Alternatively, an RLC layer of the first device may add the second identifier to the compressed second data packet, for example, add the second identifier to a header of the compressed second data packet. Alternatively, the second identifier may be added to the compressed second data packet in another manner.

S133: The first device sends the compressed second data packet to the second device, and the second device receives the compressed second data packet from the first device.

After compressing the second data packet by using the reset buffer, the first device may send the compressed second data packet to the second device. After receiving the compressed second data packet, the second device may determine, based on the second identifier, that the compressed second data packet is compressed by using the reset buffer, and the second device can correctly decompress the compressed second data packet to obtain the second data packet. For example, the second device may decompress the second data packet based on the preset information, to obtain the second data packet. When deleting the first data packet, the first device may reset the buffer in a timely manner without waiting for a control PDU (indicating a decompression error) from the second device. This can reduce impact of a deleted data packet on a subsequent data packet, and decrease a quantity of data packets that cannot be correctly decompressed by the second device, namely, decrease a quantity of lost data packets.

Certainly, although the first device resets the buffer in a timely manner, the second data packet is the $1^{st}$ data packet that has not been compressed. In other words, when the first device deletes the first data packet, there may be some data packets that have been compressed or sent before the second data packet, and the first device still continues to send these compressed data packets. After the second device receives these compressed data packets, because the first data packet is deleted, the second device cannot successfully decompress these compressed data packets. For example, if a third data packet has been compressed before the first data packet is deleted, an error occurs if the second device decompresses a compressed third data packet after receiving the compressed third data packet. The second device may send a control PDU to the first device, where the control PDU indicates that the compressed third data packet is unsuccessfully decompressed. For example, the control PDU may indicate an identifier of the compressed third data packet. The identifier of the compressed third data packet is, for example, a sequence number of the third data packet (for example, a corresponding sequence number at the PDCP layer), or another identifier that can indicate the compressed third data packet. After receiving the control PDU, the PDCP layer of the first device can determine, based on the control PDU, that the compressed third data packet is unsuccessfully decompressed. In this case, the first device may compare the sequence number of the compressed third data packet with a sequence number of the second data packet. If the sequence number of the compressed third data packet is greater than the sequence number of the second data packet, it indicates that there is another data packet that is unsuccessfully decompressed after the first device resets the buffer. In this case, the first device may reset the buffer again. After resetting the buffer again, the first device compresses a currently uncompressed data packet by using a buffer that is reset again. Alternatively, if the sequence number of the compressed third data packet is less than or equal to the sequence number of the second data packet, it indicates that the compressed third data packet is a data packet that has been compressed before the buffer is reset, and an error is bound to occur during decompression of the compressed third data packet. In this case, the first device may perform no processing. For example, the first device may keep the buffer unchanged.

Figure 14:
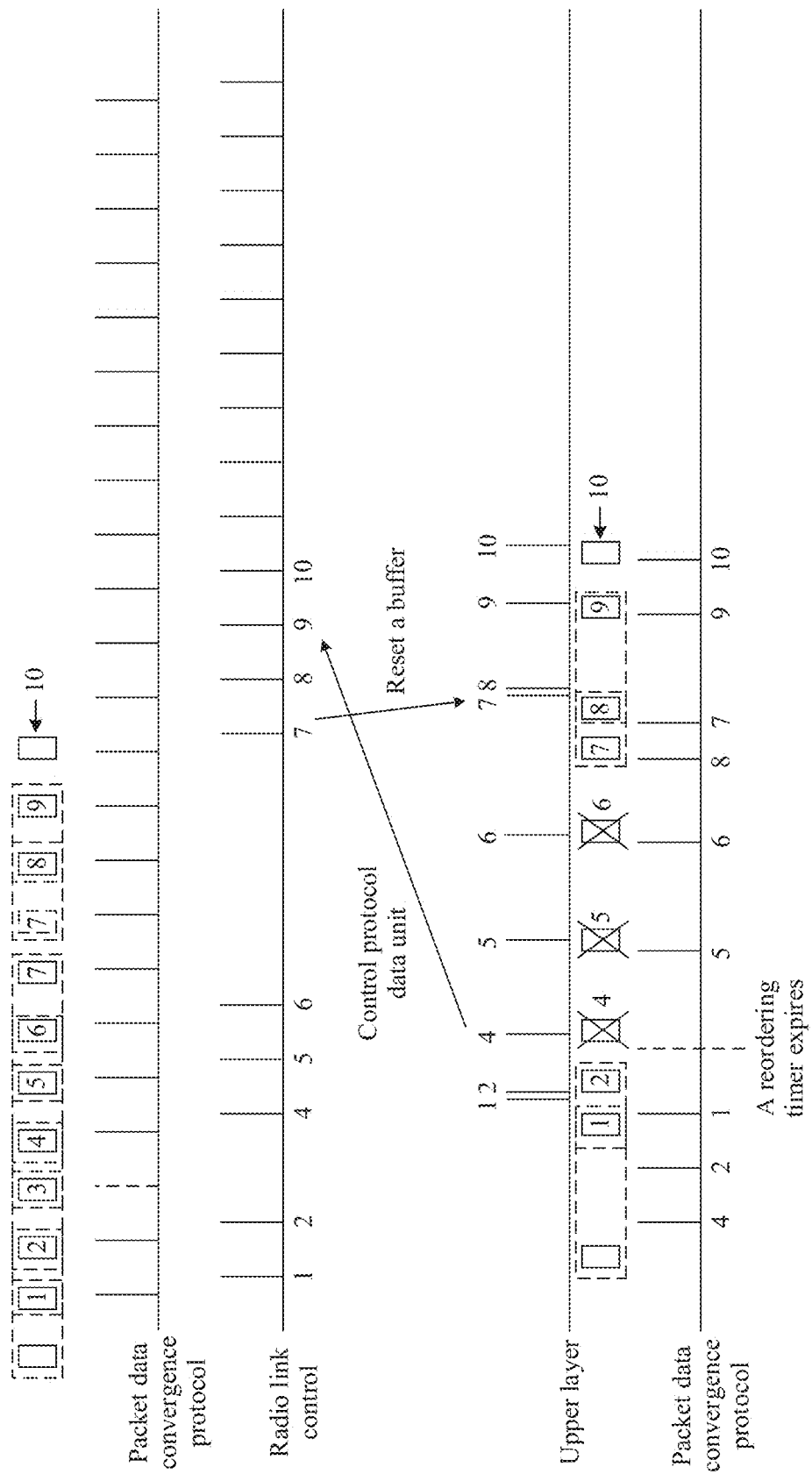
FIG. 14 shows an example of a processing process in an NR system according to an embodiment of this application.

For example, FIG. 14 shows an example of a processing process in an NR system. PDCP and RLC in upper two rows in FIG. 14 represent a PDCP layer and an RLC layer of a first device. For example, a size of a buffer is two data packets. Each dashed-line box represents content included in the buffer. In addition, a dashed-line box including "/" represents preset information included in the buffer. Each data packet is compressed based on content currently included in the buffer. PDCP in lower one row in FIG. 14 represents a PDCP layer of a second device. After receiving a compressed data packet, an RLC layer of the second device does not perform an operation such as ordering, but directly transfers the compressed data packet to the PDCP layer. Therefore, the RLC layer of the second device is not shown in FIG. 14. For example, in FIG. 14, if the first device deletes a data packet 3, the PDCP layer of the first device does not send a compressed data packet 3. However, the first device resets the buffer. When the buffer is reset, a data packet 4, a data packet 5, and a data packet 6 have been compressed, and a data packet 7 has not been compressed. In this case, the PDCP layer of the first device compresses the data packet 7 by using a reset buffer, and the first device normally sends all compressed data packets. The PDCP layer of the second device receives a compressed data packet 1, a compressed data packet 2, and a compressed data packet 4 in order of the compressed data packet 4, the compressed data packet 2, and the compressed data packet 1. In this case, after receiving the compressed data packet 4, the PDCP layer of the second device enables a reordering timer, to wait for receiving the compressed data packet 1, the compressed data packet 2, and the compressed data packet 3. When the reordering timer expires, if the PDCP layer of the second device receives only the compressed data packet 1 and the compressed data packet 2, and still does not receive the compressed data packet 3, the second device orders the compressed data packet 1, the compressed data packet 2, and the compressed data packet 4. After ordering, the PDCP layer of the second device decompresses the compressed data packet 1, the compressed data packet 2, and the compressed data packet 4. The PDCP layer of the second device does not receive the compressed data packet 3, and therefore an error occurs when the PDCP layer of the second device decompresses the compressed data packet 4. The PDCP layer of the second device may send a control PDU to the first device, where the control PDU indicates that an error occurs during decompression of the compressed data packet 4.

After receiving the control PDU, the PDCP layer of the first device compares a sequence number of the compressed data packet 4 with a sequence number of the data packet 7. Because 4 is less than 7, the first device determines that the compressed data packet 4 is a data packet that has been compressed before the buffer is reset, and the error is bound to occur during decompression of the compressed data packet 4. In this case, the first device keeps the buffer unchanged. Then, the second device receives a compressed data packet 5, and an error still occurs when the PDCP layer of the second device decompresses the compressed data packet 5. For example, the PDCP layer of the second device may continue to send a control PDU to the first device, where the control PDU indicates that an error occurs during decompression of the compressed data packet 5. After receiving the control PDU, the PDCP layer of the first device compares a sequence number of the compressed data packet 5 with the sequence number of the data packet 7. Because 5 is less than 7, the first device determines that the compressed data packet 5 is a data packet that has been compressed before the buffer is reset, and the error is bound to occur during decompression of the compressed data packet 5. In this case, the first device keeps the buffer unchanged. Likewise, for a compressed data packet 6, an error may also occur when the PDCP layer of the second device decompresses the compressed data packet 6.

Then, the second device further receives the compressed data packet 7, and the second device may determine, based on a second identifier carried in the compressed data packet 7, that the compressed data packet 7 is compressed by using the reset buffer. In this case, the PDCP layer of the second device decompresses the compressed data packet 7 based on preset information. Then, the second device receives a compressed data packet 8, a compressed data packet 9, and a compressed data packet 10, and can correctly decompress these data packets.

All numbers of data packets shown in FIG. 14 are sequence numbers of the data packets at the PDCP layer.

Figure 15:
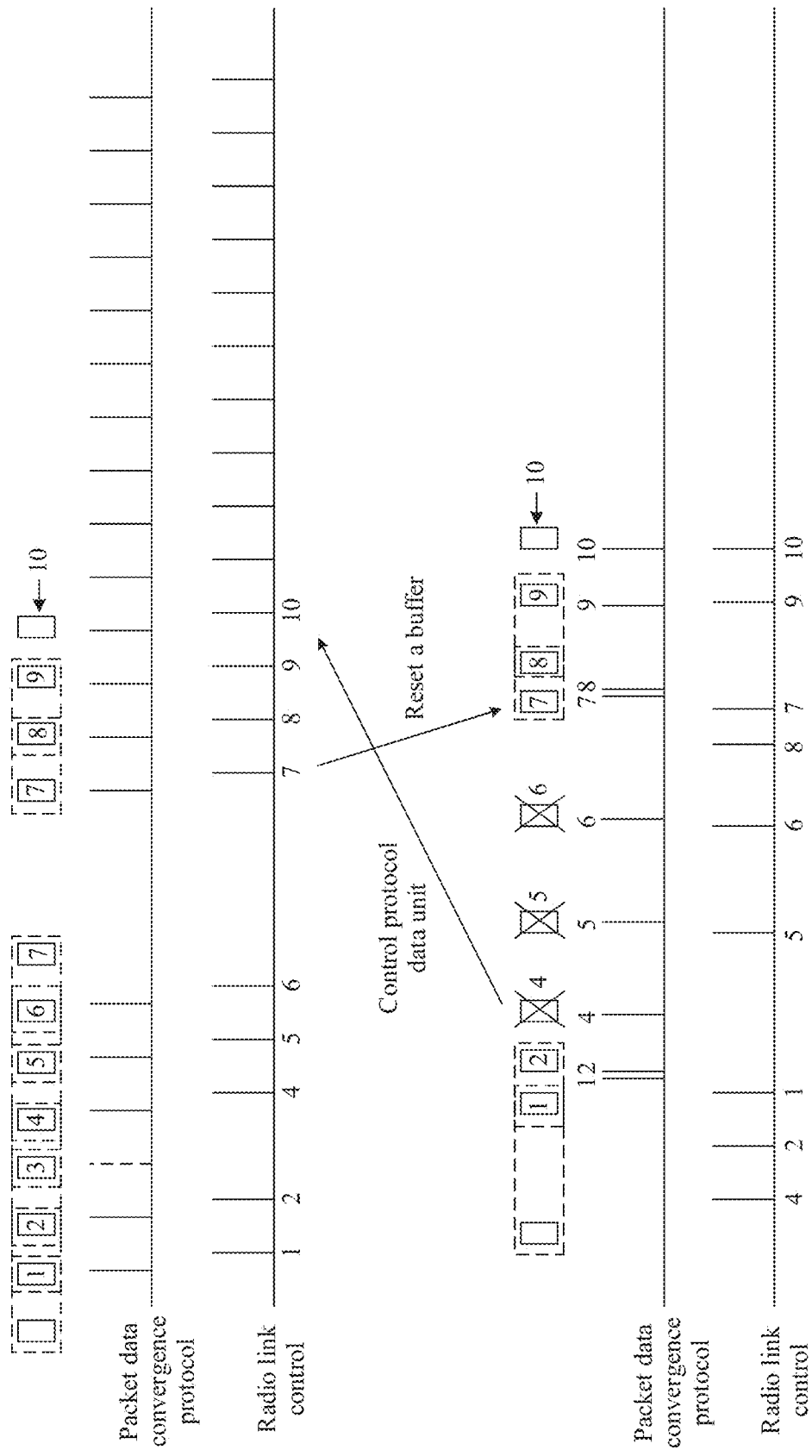
FIG. 15 shows an example of a processing process in an LTE system according to an embodiment of this application.

FIG. 15 also shows an example of a data packet compression and decompression process in an LTE system. PDCP and RLC in upper two rows in FIG. 15 represent a PDCP layer and an RLC layer of a first device. For example, a size of a buffer is two data packets. Each dashed-line box represents content included in the buffer. In addition, a dashed-line box including "/" represents preset information included in the buffer. Each data packet is compressed based on content currently included in the buffer. PDCP and RLC in lower two rows in FIG. 15 represent a PDCP layer and an RLC layer of a second device. In the LTE system, the RLC layer of the second device orders received data packets, and then transfers the ordered data packets to the PDCP layer. For example, if the PDCP layer of the first device determines to delete a data packet 3, the PDCP layer of the first device does not send a compressed data packet 3. However, the first device resets the buffer. When the buffer is reset, a data packet 4, a data packet 5, and a data packet 6 have been compressed, and a data packet 7 has not been compressed. In this case, the PDCP layer of the first device compresses the data packet 7 by using a reset buffer, and the first device normally sends all compressed data packets. For example, the RLC layer of the second device receives a compressed data packet 1, a compressed data packet 2, and a compressed data packet 4 in order of the compressed data packet 4, the compressed data packet 2, and the compressed data packet 1. In this case, after receiving the compressed data packet 1, the RLC layer of the second device orders the three compressed data packets, and then transfers the three compressed data packets to the PDCP layer of the second device in regular order. After receiving the three compressed data packets, the PDCP layer of the second device sequentially decompresses the three compressed data packets. The PDCP layer of the second device does not receive the compressed data packet 3, and therefore an error occurs when the PDCP layer of the second device decompresses the compressed data packet 4. The PDCP layer of the second device may send a control PDU to the first device, where the control PDU indicates that an error occurs during decompression of the compressed data packet 4.

After receiving the control PDU, the PDCP layer of the first device compares a sequence number of the compressed data packet 4 with a sequence number of the data packet 7. Because 4 is less than 7, the first device determines that the compressed data packet 4 is a data packet that has been compressed before the buffer is reset, and the error is bound to occur during decompression of the compressed data packet 4. In this case, the first device keeps the buffer unchanged. Then, the second device receives a compressed data packet 5, and an error still occurs when the PDCP layer of the second device decompresses the compressed data packet 5. For example, the PDCP layer of the second device may continue to send a control PDU to the first device, where the control PDU indicates that an error occurs during decompression of the compressed data packet 5. After receiving the control PDU, the PDCP layer of the first device compares a sequence number of the compressed data packet 5 with the sequence number of the data packet 7. Because 5 is less than 7, the first device determines that the compressed data packet 5 is a data packet that has been compressed before the buffer is reset, and the error is bound to occur during decompression of the compressed data packet 5. In this case, the first device keeps the buffer unchanged. Likewise, for a compressed data packet 6, an error may also occur when the PDCP layer of the second device decompresses the compressed data packet 6.

Then, the second device further receives the compressed data packet 7, and the second device may determine, based on a second identifier carried in the compressed data packet 7, that the compressed data packet 7 is compressed by using the reset buffer. In this case, the PDCP layer of the second device decompresses the compressed data packet 7 based on preset information. Then, the second device receives a compressed data packet 8, a compressed data packet 9, and a compressed data packet 10, and can correctly decompress these data packets.

All numbers of data packets shown in FIG. 15 are sequence numbers of the data packets at the PDCP layer.

In this embodiment of this application, when deleting the first data packet, the first device may reset the buffer in a timely manner without waiting for a control PDU (indicating a decompression error) from the second device. Compared with a solution in which the first device resets the buffer after receiving a control PDU from the second device, this solution in this embodiment of this application can decrease a quantity of data packets that have been compressed before the buffer is reset, reduce impact of a deleted data packet on a subsequent data packet, and decrease a quantity of data packets that cannot be correctly decompressed by the second device, namely, decrease a quantity of lost data packets.

Figure 16:
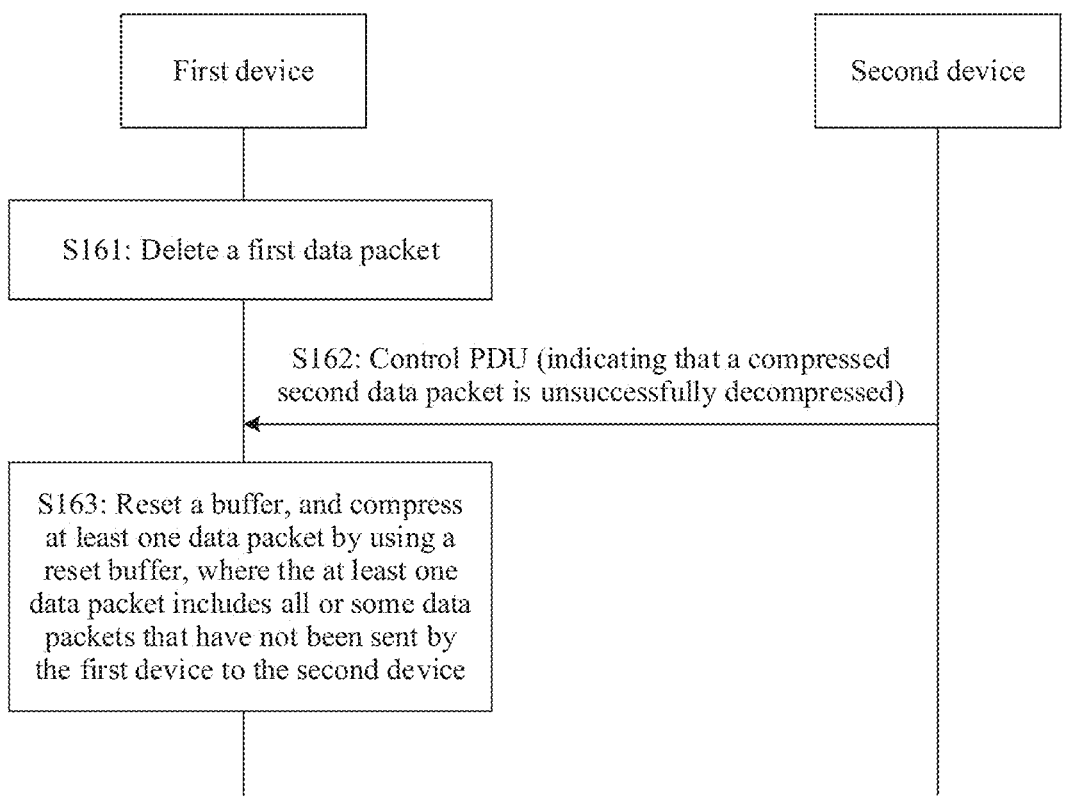
FIG. 16 is a flowchart of a fourth communication method according to an embodiment of this application.

An embodiment of this application provides a fourth communication method, to resolve same technical problems. FIG. 16 is a flowchart of the method. The following provides descriptions by using an example in which the method is applied to a network architecture shown in FIG. 6A or FIG. 6B. In addition, the method may be executed by two communication apparatuses. The two communication apparatuses are, for example, a seventh communication apparatus and an eighth communication apparatus. The seventh communication apparatus may be a network device or a communication apparatus that can support a network device in implementing functions of the method. Alternatively, the seventh communication apparatus may be a terminal device or a communication apparatus that can support a terminal device in implementing functions of the method. Certainly, the seventh communication apparatus may alternatively be another communication apparatus, for example, a chip system. Similarly, the eighth communication apparatus may be a network device or a communication apparatus that can support a network device in implementing functions of the method. Alternatively, the eighth communication apparatus may be a terminal device or a communication apparatus that can support a terminal device in implementing functions of the method. Certainly, the eighth communication apparatus may alternatively be another communication apparatus, for example, a chip system. In addition, implementations of the seventh communication apparatus and the eighth communication apparatus are not limited. For example, the seventh communication apparatus may be a network device, and the eighth communication apparatus may be a terminal device; both the seventh communication apparatus and the eighth communication apparatus may be network devices; both the seventh communication apparatus and the eighth communication apparatus may be terminal devices; or the seventh communication apparatus may be a network device, and the eighth communication apparatus may be a communication apparatus that can support a terminal device in implementing functions of the method. The network device is, for example, a base station.

For ease of description, the following provides descriptions by using an example in which the method is performed by a network device and a terminal device, that is, by using an example in which the seventh communication apparatus is the network device and the eighth communication apparatus is the terminal device. Because this embodiment provides descriptions by using the example in which the method is applied to the network architecture shown in FIG. 6A or FIG. 6B, a second device described below may be the network device in the network architecture shown in FIG. 6A or FIG. 6B, and a first device described below may be the terminal device in the network architecture shown in FIG. 6A or FIG. 6B.

S161: The first device deletes a first data packet.

For example, after obtaining the first data packet from an upper layer, a PDCP layer of the first device may enable a discard timer. When the discard timer expires, if the first data packet is not sent from an air interface of the first device, the PDCP layer may delete the first data packet.

S162: The first device receives a control PDU from the second device, where the control PDU indicates that a compressed second data packet is unsuccessfully decompressed.

After deleting the first data packet, the first device compresses and sends another data packet in a normal manner. For example, the first device deletes a data packet 3. When the data packet 3 is deleted, the first device has compressed a data packet 4, a data packet 5, a data packet 6, a data packet 7, and a data packet 8, and normally sends data packets. In this case, the second device cannot correctly decompress a compressed data packet 4, a compressed data packet 5, a compressed data packet 6, a compressed data packet 7, and a compressed data packet 8. After unsuccessfully decompressing the compressed data packet 4, a PDCP layer of the second device may send a control PDU to the first device, to notify the first device of a decompression error. In this embodiment of this application, the control PDU may indicate that an error occurs during decompression of the compressed data packet 4. For example, the control PDU may carry a serial number of the compressed data packet 4.

S163: The first device resets a buffer, and compresses at least one data packet by using a reset buffer, where the at least one data packet includes all or some data packets that have not been sent by the first device to the second device.

After receiving the control PDU from the second device, the first device may reset the buffer. For a specific operation of resetting the buffer, refer to the descriptions in the embodiment shown in FIG. 13. After resetting the buffer, the first device compresses the at least one data packet by using the reset buffer. The at least one data packet may include all or some data packets that have not been sent by the first device to the second device. The data packets that have not been sent by the first device to the second device may include a data packet that has been compressed by the first device (where the compression is performed before the buffer is reset), or may include a data packet that has not been compressed by the first device. Therefore, the at least one data packet may include a data packet that has been compressed by the first device, include a data packet that has not been compressed by the first device, or include a data packet that has been compressed by the first device and a data packet that has not been compressed by the first device.

In addition, the first device may further add a first identifier to a compressed fourth data packet, where the first identifier indicates that the compressed fourth data packet is a data packet compressed by using the reset buffer. For example, the PDCP layer of the first device may add the first identifier to the compressed fourth data packet, for example, add the first identifier to a header of the compressed fourth data packet. Alternatively, an RLC layer of the first device may add the first identifier to the compressed fourth data packet, for example, add the first identifier to a header of the compressed fourth data packet. Alternatively, the first identifier may be added to the compressed fourth data packet in another manner. A third data packet may be a data packet with a serial number ranking the first position in a serial number of the at least one data packet. The serial number ranking the first position means that a generation time of the fourth data packet is earlier than that of any data packet in the at least one data packet other than the fourth data packet. For example, the at least one data packet includes a data packet 4, a data packet 5, and a data packet 6, and the fourth data packet is the data packet 4. After the first identifier is added, the second device can determine which compressed data packet can start to be decompressed based on preset information.

Figure 17:
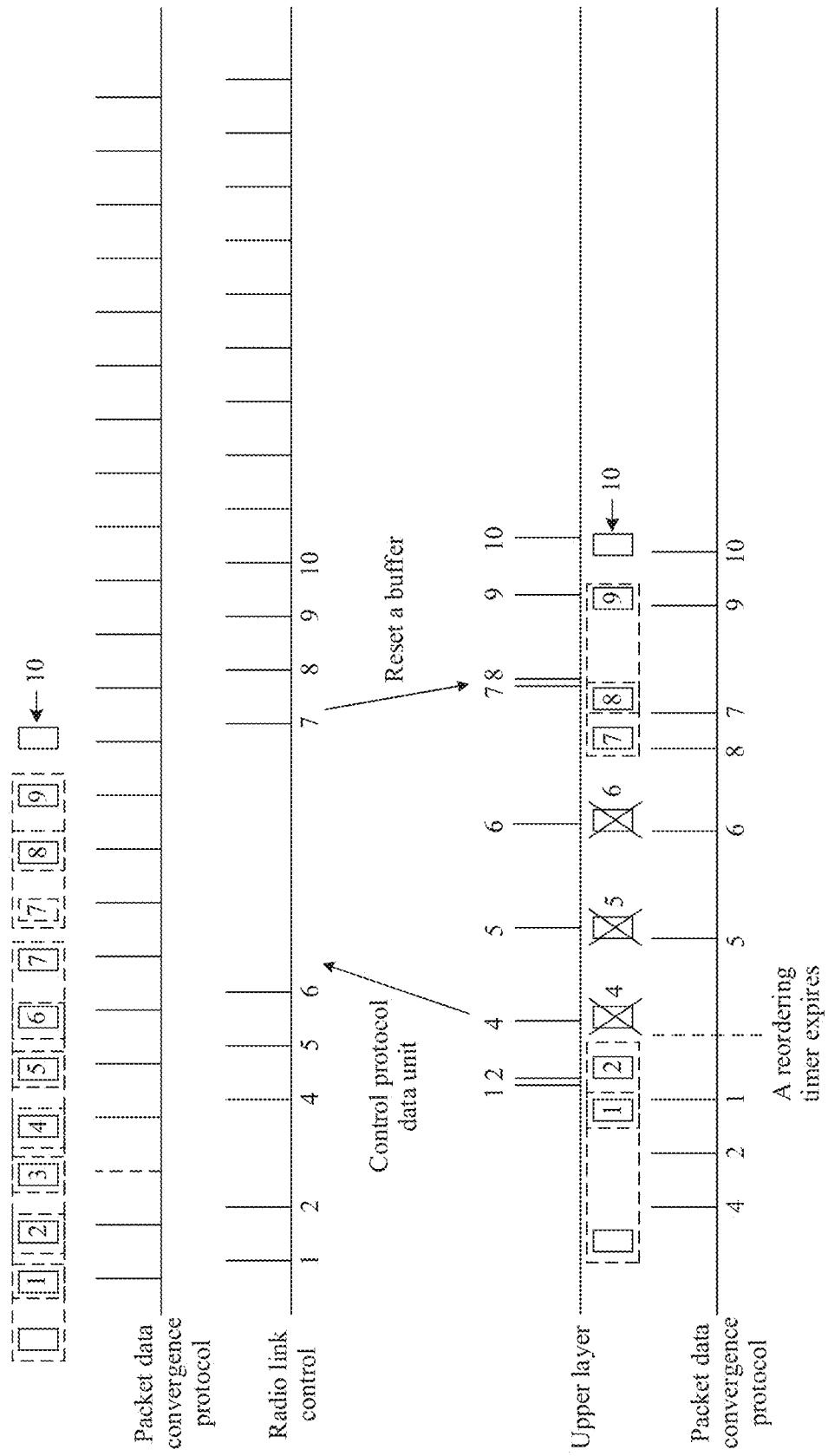
FIG. 17 shows an example of a processing process in an NR system according to an embodiment of this application.

For example, FIG. 17 shows an example of a processing process in an NR system. PDCP and RLC in upper two rows in FIG. 17 represent a PDCP layer and an RLC layer of a first device. For example, a size of a buffer is two data packets. Each dashed-line box represents content included in the buffer. In addition, a dashed-line box including "/" represents preset information included in the buffer. Each data packet is compressed based on content currently included in the buffer. PDCP in lower one row in FIG. 17 represents a PDCP layer of a second device. After receiving a compressed data packet, an RLC layer of the second device does not perform an operation such as ordering, but directly transfers the compressed data packet to the PDCP layer. Therefore, the RLC layer of the second device is not shown in FIG. 17. For example, in FIG. 17, if the first device deletes a data packet 3, the PDCP layer of the first device does not send a compressed data packet 3. The PDCP layer of the first device normally compresses and sends other data packets. For example, when the data packet 3 is deleted, a data packet 4, a data packet 5, and a data packet 6 have been compressed, and a data packet 7 has not been compressed. In this case, the first device may send the data packet 4 and the like, and may compress the data packet 7. The PDCP layer of the second device receives a compressed data packet 1, a compressed data packet 2, and a compressed data packet 4 in order of the compressed data packet 4, the compressed data packet 2, and the compressed data packet 1. In this case, after receiving the compressed data packet 4, the PDCP layer of the second device enables a reordering timer, to wait for receiving the compressed data packet 1, the compressed data packet 2, and the compressed data packet 3. When the reordering timer expires, if the PDCP layer of the second device receives only the compressed data packet 1 and the compressed data packet 2, and still does not receive the compressed data packet 3, the second device orders the compressed data packet 1, the compressed data packet 2, and the compressed data packet 4. After ordering, the PDCP layer of the second device decompresses the compressed data packet 1, the compressed data packet 2, and the compressed data packet 4. The PDCP layer of the second device does not receive the compressed data packet 3, and therefore an error occurs when the PDCP layer of the second device decompresses the compressed data packet 4. The PDCP layer of the second device may send a control PDU to the first device, where the control PDU indicates that an error occurs during decompression of the compressed data packet 4.

After receiving the control PDU, the PDCP layer of the first device may reset the buffer. For example, after the buffer is reset, the data packet 4, the data packet 5, and the data packet 6 have been sent, the data packet 7 and a data packet 8 have been compressed but not sent, and a data packet 9 and a data packet 10 have not been compressed. In this case, the PDCP layer of the first device may re-compress the data packet 7 and the data packet 8 by using a reset buffer, and compress the data packet 9 and the data packet 10 by using the reset buffer. It may be understood as: The PDCP layer compresses the data packet 7 based on preset information. Then, the PDCP layer compresses the data packet 8, the data packet 9, and the data packet 10 based on content in the buffer. In addition, because the data packet 7 is compressed by using the reset buffer, the first device may add a first identifier to the data packet 7 when sending the data packet 7, where the first identifier indicates that the data packet 7 is a data packet compressed by using the reset buffer. The first identifier does not need to be added to a subsequent compressed data packet. The first device may send a re-compressed data packet 7 and a re-compressed data packet 8, and normally send a compressed data packet 9 and a compressed data packet 10.

Then, the second device receives a compressed data packet 5, and an error still occurs when the PDCP layer of the second device decompresses the compressed data packet 5. Likewise, for a compressed data packet 6, an error may also occur when the PDCP layer of the second device decompresses the compressed data packet 6.

Then, the second device further receives the compressed data packet 7, and the second device may determine, based on the first identifier carried in the compressed data packet 7, that the compressed data packet 7 is compressed by using the reset buffer. In this case, the PDCP layer of the second device decompresses the compressed data packet 7 based on the preset information. Then, the second device receives the compressed data packet 8, the compressed data packet 9, and the compressed data packet 10, and can correctly decompress these data packets.

All serial numbers of data packets (or serial numbers of compressed data packets) shown in FIG. 17 are sequence numbers of the data packets at the PDCP layer.

Figure 18:
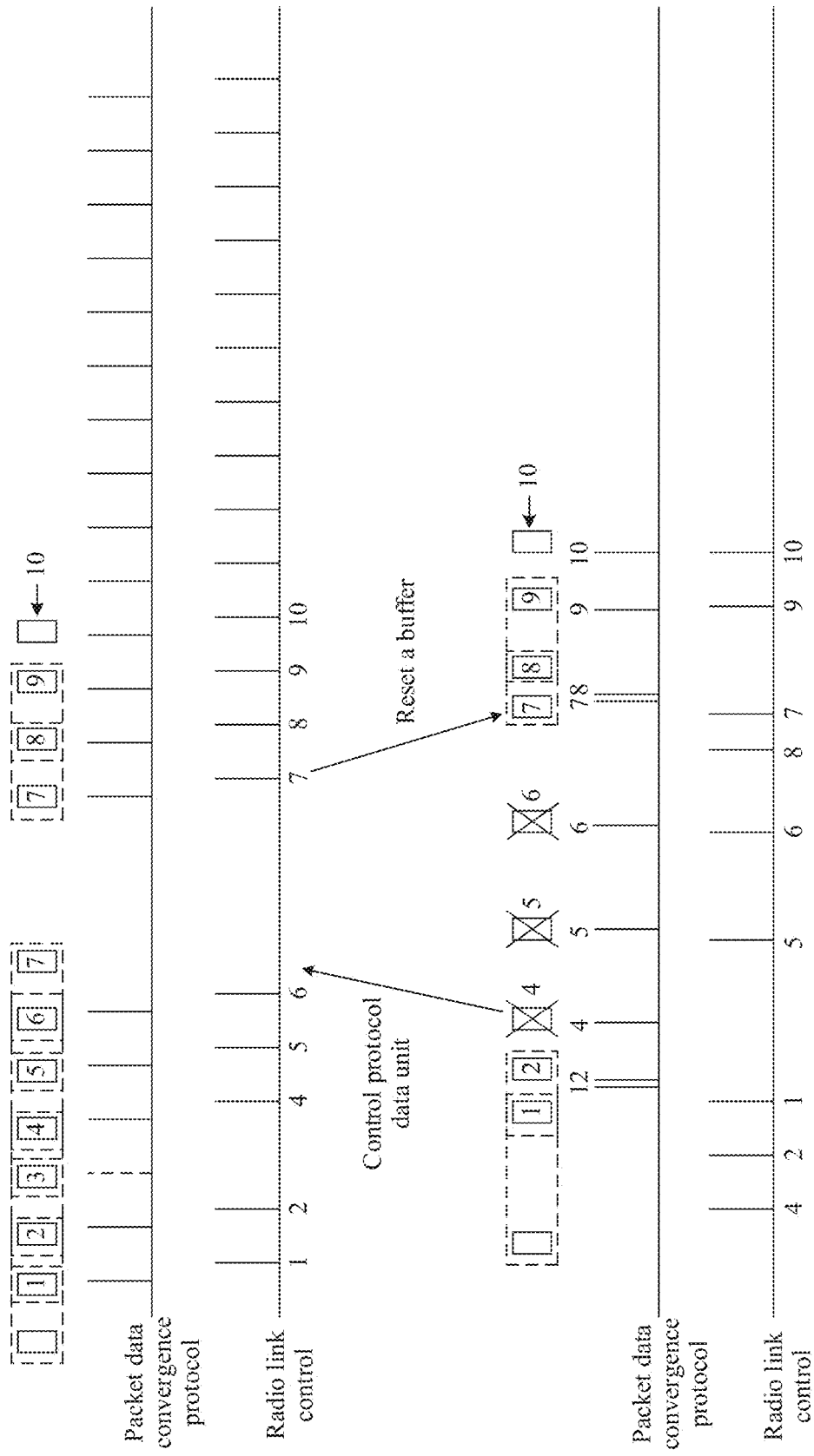
FIG. 18 shows an example of a processing process in an LTE system according to an embodiment of this application.

FIG. 18 also shows an example of a data packet compression and decompression process in an LTE system. PDCP and RLC in upper two rows in FIG. 18 represent a PDCP layer and an RLC layer of a first device. For example, a size of a buffer is two data packets. Each dashed-line box represents content included in the buffer. In addition, a dashed-line box including "/" represents preset information included in the buffer. Each data packet is compressed based on content currently included in the buffer. PDCP and RLC in lower two rows in FIG. 18 represent a PDCP layer and an RLC layer of a second device. In the LTE system, the RLC layer of the second device orders received compressed data packets, and then transfers the ordered compressed data packets to the PDCP layer. For example, if the PDCP layer of the first device determines to delete a data packet 3, the PDCP layer of the first device does not send a compressed data packet 3. The PDCP layer of the first device normally compresses and sends other data packets. For example, when the data packet 3 is deleted, a data packet 4, a data packet 5, and a data packet 6 have been compressed, and a data packet 7 has not been compressed. In this case, the first device may send the data packet 4 and the like, and may compress the data packet 7. For example, the RLC layer of the second device receives a compressed data packet 1, a compressed data packet 2, and a compressed data packet 4 in order of the compressed data packet 4, the compressed data packet 2, and the compressed data packet 1. In this case, after receiving the compressed data packet 1, the RLC layer of the second device orders the three compressed data packets, and then transfers the three compressed data packets to the PDCP layer of the second device in regular order. After receiving the three compressed data packets, the PDCP layer of the second device sequentially decompresses the three compressed data packets. The PDCP layer of the second device does not receive the compressed data packet 3, and therefore an error occurs when the PDCP layer of the second device decompresses the compressed data packet 4. The PDCP layer of the second device may send a control PDU to the first device, where the control PDU indicates that an error occurs during decompression of the compressed data packet 4.

After receiving the control PDU, the PDCP layer of the first device may reset the buffer. For example, after the buffer is reset, the data packet 4, the data packet 5, and the data packet 6 have been sent, the data packet 7 and a data packet 8 have been compressed but not sent, and a data packet 9 and a data packet 10 have not been compressed. In this case, the PDCP layer of the first device may re-compress the data packet 7 and the data packet 8 by using a reset buffer, and compress the data packet 9 and the data packet 10 by using the reset buffer. It may be understood as: The PDCP layer compresses the data packet 7 based on preset information. Then, the PDCP layer compresses the data packet 8, the data packet 9, and the data packet 10 based on content in the buffer. In addition, because the data packet 7 is compressed by using the reset buffer, the first device may add a first identifier to the data packet 7 when sending the data packet 7, where the first identifier indicates that the data packet 7 is a data packet compressed by using the reset buffer. The first identifier does not need to be added to a subsequent compressed data packet. The first device may send a re-compressed data packet 7 and a re-compressed data packet 8, and normally send a compressed data packet 9 and a compressed data packet 10.

Then, the second device receives a compressed data packet 5, and an error still occurs when the PDCP layer of the second device decompresses the compressed data packet 5. Likewise, for a compressed data packet 6, an error may also occur when the PDCP layer of the second device decompresses the compressed data packet 6.

Then, the second device further receives the compressed data packet 7, and the second device may determine, based on the first identifier carried in the compressed data packet 7, that the compressed data packet 7 is compressed by using the reset buffer. In this case, the PDCP layer of the second device decompresses the compressed data packet 7 based on the preset information. Then, the second device receives a compressed data packet 8, a compressed data packet 9, and a compressed data packet 10, and can correctly decompress these data packets.

All numbers of data packets shown in FIG. 18 are sequence numbers of the data packets at the PDCP layer.

As described above, the at least one data packet may include all or some data packets that have not been sent by the first device to the second device. In another optional manner, the at least one data packet may alternatively include all or some data packets that have been sent by the first device to the second device, and the at least one data packet includes the second data packet. In other words, after the first device receives the control PDU from the second device, the first device may re-compress, by using the reset buffer, both a data packet corresponding to a serial number indicated by the control PDU (where the serial number indicated by the control PDU is a serial number of the compressed second data packet, and an uncompressed data packet corresponding to the serial number is the second data packet) and another data packet whose serial number follows that of the second data packet. In this way, even if the first device has sent some compressed data packets to the second device before the buffer is reset, and an error occurs when the second device decompresses these compressed data packets, after the buffer is reset, the first device re-compresses and re-sends all these data packets, and the second device can still correctly decompress these compressed data packets. This decreases a quantity of lost data packets to a great extent.

Figure 19:
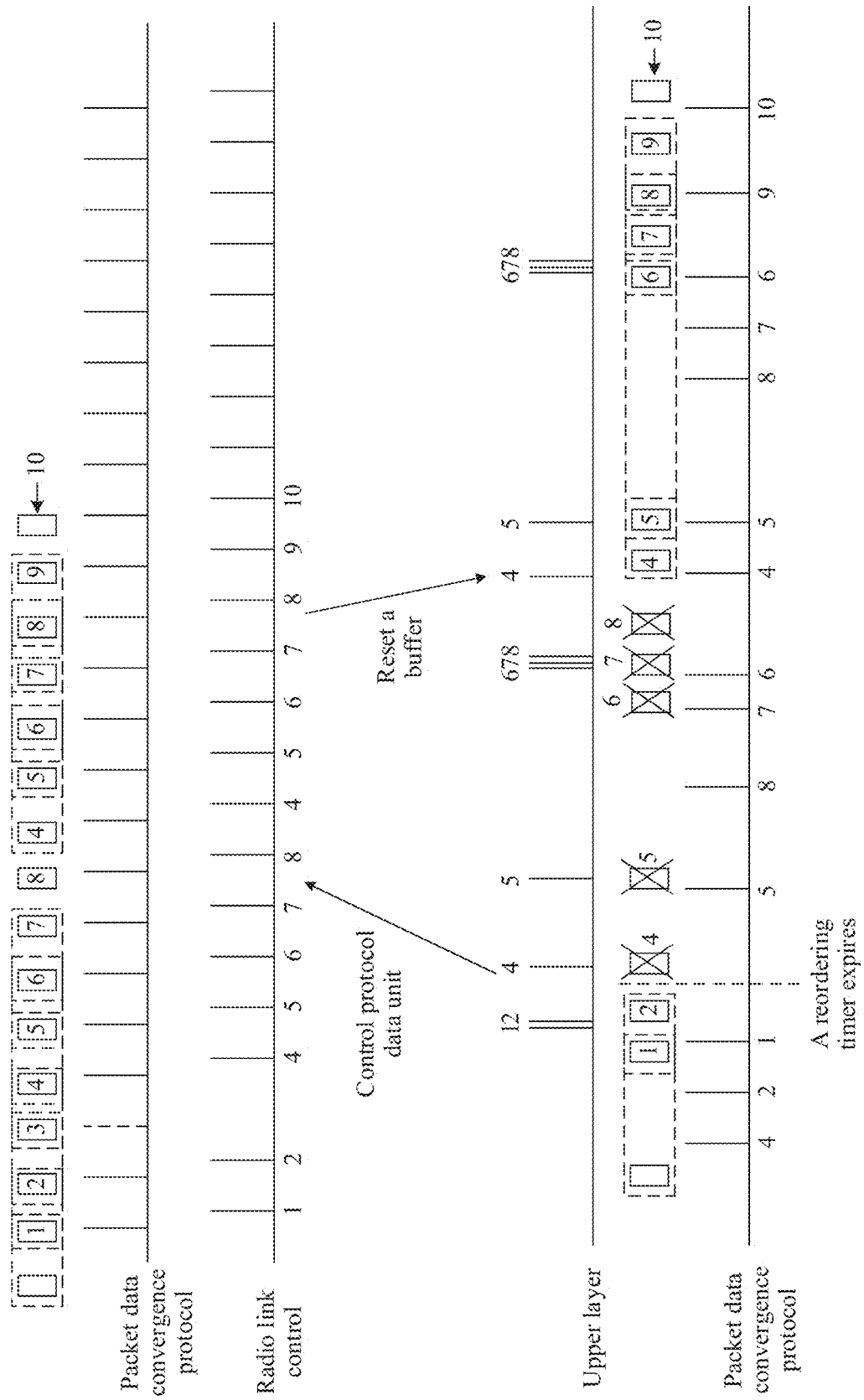
FIG. 19 shows an example of a processing process in an NR system according to an embodiment of this application.

For example, FIG. 19 shows an example of a processing process in an NR system. PDCP and RLC in upper two rows in FIG. 19 represent a PDCP layer and an RLC layer of a first device. For example, a size of a buffer is two data packets. Each dashed-line box represents content included in the buffer. In addition, a dashed-line box including "/" represents preset information included in the buffer. Each data packet is compressed based on content currently included in the buffer. PDCP in lower one row in FIG. 19 represents a PDCP layer of a second device. After receiving a compressed data packet, an RLC layer of the second device does not perform an operation such as ordering, but directly transfers the compressed data packet to the PDCP layer. Therefore, the RLC layer of the second device is not shown in FIG. 19. For example, in FIG. 19, if the first device deletes a data packet 3, the PDCP layer of the first device does not send a compressed data packet 3. The PDCP layer of the first device normally compresses and sends other data packets. For example, when the data packet 3 is deleted, a data packet 4, a data packet 5, and a data packet 6 have been compressed, and a data packet 7 has not been compressed. In this case, the first device may send the data packet 4 and the like, and may compress the data packet 7. The PDCP layer of the second device receives a compressed data packet 1, a compressed data packet 2, and a compressed data packet 4 in order of the compressed data packet 4, the compressed data packet 2, and the compressed data packet 1. In this case, after receiving the compressed data packet 4, the PDCP layer of the second device enables a reordering timer, to wait for receiving the compressed data packet 1, the compressed data packet 2, and the compressed data packet 3. When the reordering timer expires (as shown by a vertical dashed line in FIG. 19), if the PDCP layer of the second device receives only the compressed data packet 1 and the compressed data packet 2, and still does not receive the compressed data packet 3, the second device orders the compressed data packet 1, the compressed data packet 2, and the compressed data packet 4. After ordering, the PDCP layer of the second device decompresses the compressed data packet 1, the compressed data packet 2, and the compressed data packet 4. The PDCP layer of the second device does not receive the compressed data packet 3, and therefore an error occurs when the PDCP layer of the second device decompresses the compressed data packet 4. The PDCP layer of the second device may send a control PDU to the first device, where the control PDU indicates that an error occurs during decompression of the compressed data packet 4.

After receiving the control PDU, the PDCP layer of the first device may reset the buffer. For example, after the buffer is reset, the data packet 4, the data packet 5, the data packet 6, the data packet 7, and a data packet 8 have been sent, a data packet 9 has been compressed but not sent, and a data packet 10 has not been compressed. In this case, the PDCP layer of the first device may re-compress the data packet 4, the data packet 5, the data packet 6, the data packet 7, the data packet 8, and the data packet 9 by using a reset buffer, and compress the data packet 10 by using the reset buffer. It may be understood as: The PDCP layer compresses the data packet 4 based on preset information. Then, the PDCP layer compresses the data packet 5, the data packet 6, the data packet 7, the data packet 8, the data packet 9, and the data packet 10 based on content in the buffer. In addition, because the data packet 4 is compressed by using the reset buffer, the first device may add a first identifier to a compressed data packet 4 when sending the compressed data packet 4, where the first identifier indicates that the compressed data packet 4 is a data packet compressed by using the reset buffer. The first identifier does not need to be added to a subsequent compressed data packet. The first device may send a re-compressed data packet 4, a re-compressed data packet 5, a re-compressed data packet 6, a re-compressed data packet 7, a re-compressed data packet 8, and a re-compressed data packet 9, and normally send a compressed data packet 10.

Then, the second device receives a compressed data packet 5, and an error still occurs when the PDCP layer of the second device decompresses the compressed data packet 5. Likewise, for the compressed data packet 6, the compressed data packet 7, and the compressed data packet 8, errors still occur when the PDCP layer of the second device decompresses the compressed data packet 6, the compressed data packet 7, and the compressed data packet 8.

Then, the second device further receives the re-compressed data packet 4 (certainly, for the second device, the re-compressed data packet 4 is a "compressed data packet 4", and the second device does not know that the data packet 4 is re-compressed). The second device may determine, based on the first identifier carried in the re-compressed data packet 4, that the re-compressed data packet 4 is compressed by using the reset buffer, and the PDCP layer of the second device decompresses the re-compressed data packet 4 based on the preset information. Then, the second device receives the re-compressed data packet 5, the re-compressed data packet 6, the re-compressed data packet 7, the re-compressed data packet 8, the re-compressed data packet 9, and the compressed data packet 10, and can correctly decompress these data packets.

All numbers of data packets shown in FIG. 19 are sequence numbers of the data packets at the PDCP layer.

Figure 20:
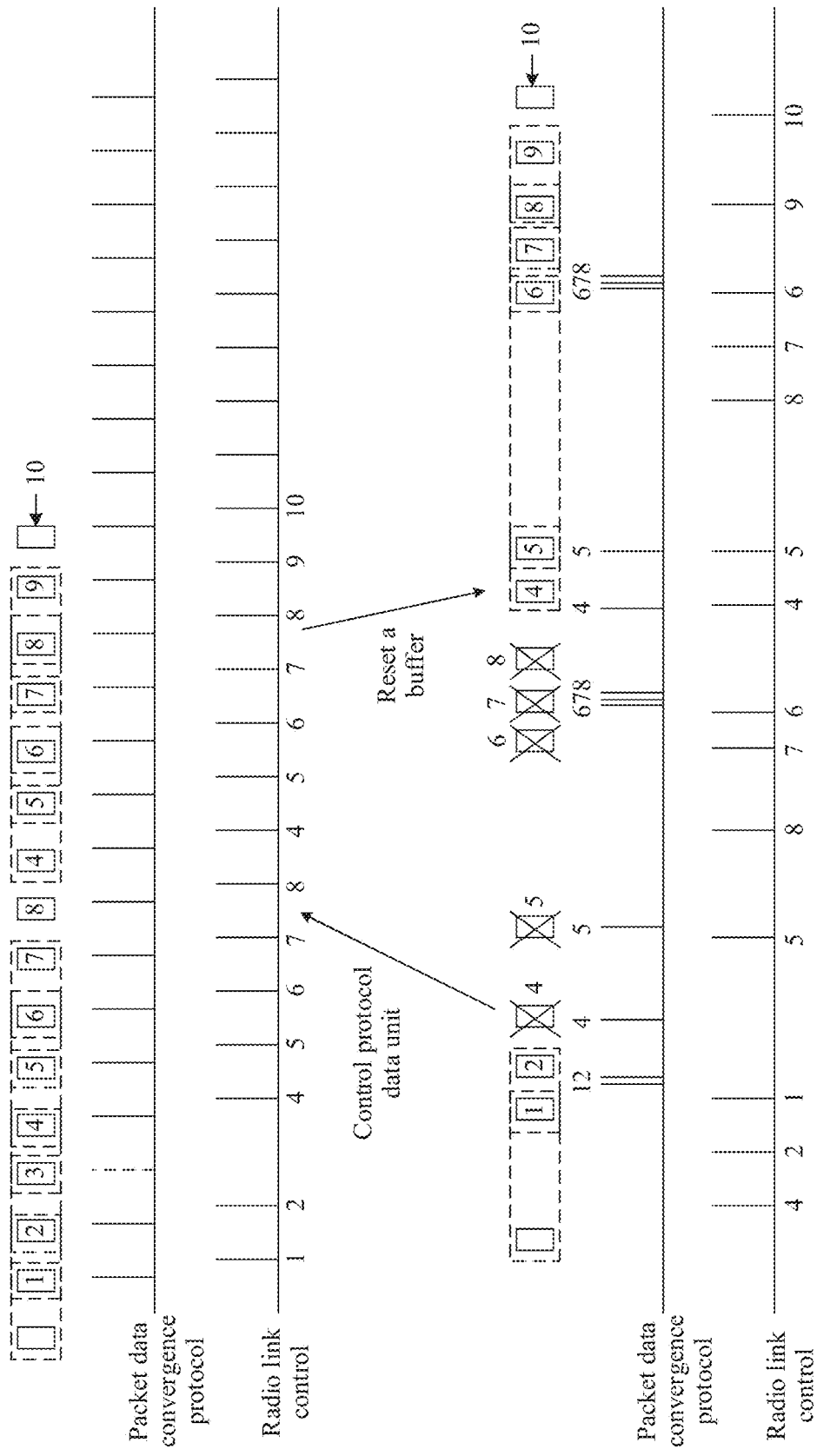
FIG. 20 shows an example of a processing process in an LTE system according to an embodiment of this application.

FIG. 20 also shows an example of a data packet compression and decompression process in an LTE system. PDCP and RLC in upper two rows in FIG. 20 represent a PDCP layer and an RLC layer of a first device. For example, a size of a buffer is two data packets. Each dashed-line box represents content included in the buffer. In addition, a dashed-line box including "/" represents preset information included in the buffer. Each data packet is compressed based on content currently included in the buffer. PDCP and RLC in lower two rows in FIG. 20 represent a PDCP layer and an RLC layer of a second device. In the LTE system, the RLC layer of the second device orders received data packets, and then transfers the ordered data packets to the PDCP layer. For example, if the PDCP layer of the first device determines to delete a data packet 3, the PDCP layer of the first device does not send a compressed data packet 3. The PDCP layer of the first device normally compresses and sends other data packets. For example, when the data packet 3 is deleted, a data packet 4, a data packet 5, and a data packet 6 have been compressed, and a data packet 7 has not been compressed. In this case, the first device may send the data packet 4 and the like, and may compress the data packet 7. For example, the RLC layer of the second device receives a compressed data packet 1, a compressed data packet 2, and a compressed data packet 4 in order of the compressed data packet 4, the compressed data packet 2, and the compressed data packet 1. In this case, after receiving the compressed data packet 1, the RLC layer of the second device orders the three compressed data packets, and then transfers the three compressed data packets to the PDCP layer of the second device in regular order. After receiving the three compressed data packets, the PDCP layer of the second device sequentially decompresses the three compressed data packets. The PDCP layer of the second device does not receive the compressed data packet 3, and therefore an error occurs when the PDCP layer of the second device decompresses the compressed data packet 4. The PDCP layer of the second device may send a control PDU to the first device, where the control PDU indicates that an error occurs during decompression of the compressed data packet 4.

After receiving the control PDU, the PDCP layer of the first device may reset the buffer. For example, after the buffer is reset, the data packet 4, the data packet 5, the data packet 6, the data packet 7, and a data packet 8 have been sent, a data packet 9 has been compressed but not sent, and a data packet 10 has not been compressed. In this case, the PDCP layer of the first device may re-compress the data packet 4, the data packet 5, the data packet 6, the data packet 7, the data packet 8, and the data packet 9 by using a reset buffer, and compress the data packet 10 by using the reset buffer. It may be understood as: The PDCP layer compresses the data packet 4 based on preset information. Then, the PDCP layer compresses the data packet 5, the data packet 6, the data packet 7, the data packet 8, the data packet 9, and the data packet 10 based on content in the buffer. In addition, because the data packet 4 is compressed by using the reset buffer, the first device may add a first identifier to a compressed data packet 4 when sending the compressed data packet 4, where the first identifier indicates that the compressed data packet 4 is a data packet compressed by using the reset buffer. The first identifier does not need to be added to a subsequent compressed data packet. The first device may send a re-compressed data packet 4, a re-compressed data packet 5, a re-compressed data packet 6, a re-compressed data packet 7, a re-compressed data packet 8, and a re-compressed data packet 9, and normally send a compressed data packet 10.

Then, the second device receives a compressed data packet 5, and an error still occurs when the PDCP layer of the second device decompresses the compressed data packet 5. Likewise, for the compressed data packet 6, the compressed data packet 7, and the compressed data packet 8, errors still occur when the PDCP layer of the second device decompresses the compressed data packet 6, the compressed data packet 7, and the compressed data packet 8.

Then, the second device further receives the re-compressed data packet 4 (certainly, for the second device, the re-compressed data packet 4 is a "compressed data packet 4", and the second device does not know that the data packet 4 is re-compressed). The second device may determine, based on the first identifier carried in the re-compressed data packet 4, that the re-compressed data packet 4 is compressed by using the reset buffer, and the PDCP layer of the second device decompresses the re-compressed data packet 4 based on the preset information. Then, the second device receives the re-compressed data packet 5, the re-compressed data packet 6, the re-compressed data packet 7, the re-compressed data packet 8, the re-compressed data packet 9, and the compressed data packet 10, and can correctly decompress these data packets.

All numbers of data packets shown in FIG. 20 are sequence numbers of the data packets at the PDCP layer.

In this embodiment of this application, when the first device deletes the first data packet (or after the first device deletes the first data packet), if the first device receives the control PDU (indicating a decompression error) from the second device, the first device may reset the buffer, and may compress, by using the reset buffer, a data packet that has not been sent, or a data packet that has not been sent and a data packet that has been sent. This manner can decrease a quantity of data packets compressed by using the buffer that has not been reset, decrease a quantity of data packets that cannot be correctly decompressed by the second device, and decrease a quantity of lost data packets.

Figure 21:
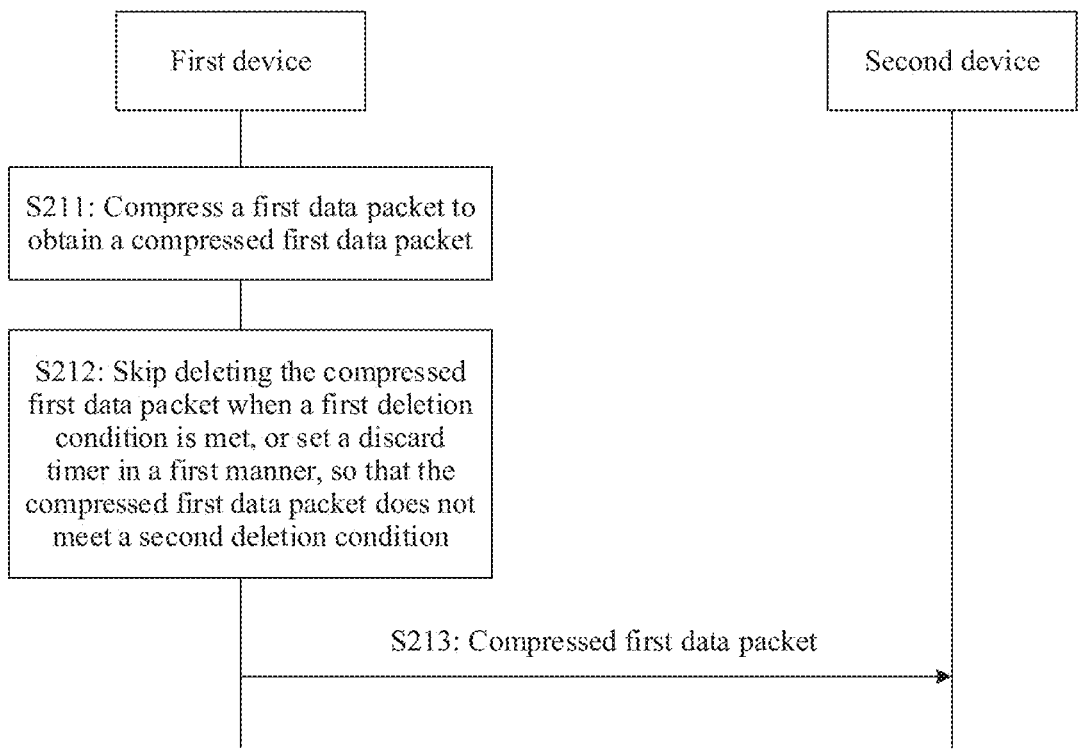
FIG. 21 is a flowchart of a fifth communication method according to an embodiment of this application.

An embodiment of this application provides a fifth communication method, to resolve same technical problems. FIG. 21 is a flowchart of the method. The following provides descriptions by using an example in which the method is applied to a network architecture shown in FIG. 6A or FIG. 6B. In addition, the method may be executed by two communication apparatuses. The two communication apparatuses are, for example, a ninth communication apparatus and a tenth communication apparatus. The ninth communication apparatus may be a network device or a communication apparatus that can support a network device in implementing functions of the method. Alternatively, the ninth communication apparatus may be a terminal device or a communication apparatus that can support a terminal device in implementing functions of the method. Certainly, the ninth communication apparatus may alternatively be another communication apparatus, for example, a chip system. Similarly, the tenth communication apparatus may be a network device or a communication apparatus that can support a network device in implementing functions of the method. Alternatively, the tenth communication apparatus may be a terminal device or a communication apparatus that can support a terminal device in implementing functions of the method. Certainly, the tenth communication apparatus may alternatively be another communication apparatus, for example, a chip system. In addition, implementations of the ninth communication apparatus and the tenth communication apparatus are not limited. For example, the ninth communication apparatus may be a network device, and the tenth communication apparatus may be a terminal device; both the ninth communication apparatus and the tenth communication apparatus may be network devices; both the ninth communication apparatus and the tenth communication apparatus may be terminal devices; or the ninth communication apparatus may be a network device, and the tenth communication apparatus may be a communication apparatus that can support a terminal device in implementing functions of the method. The network device is, for example, a base station.

For ease of description, the following provides descriptions by using an example in which the method is performed by a network device and a terminal device, that is, by using an example in which the ninth communication apparatus is the network device and the tenth communication apparatus is the terminal device. Because this embodiment provides descriptions by using the example in which the method is applied to the network architecture shown in FIG. 6A or FIG. 6B, a second device described below may be the network device in the network architecture shown in FIG. 6A or FIG. 6B, and a first device described below may be the terminal device in the network architecture shown in FIG. 6A or FIG. 6B.

S211: The first device compresses a first data packet to obtain a compressed first data packet.

The first device may normally compress the first data packet.

S212: The first device does not delete the compressed first data packet when a first deletion condition is met; or the first device sets a discard timer in a first manner, so that the compressed first data packet does not meet a second deletion condition.

For example, in a current standard procedure, after obtaining the first data packet from an upper layer, a PDCP layer may enable a discard timer corresponding to the first data packet. When the discard timer expires, the PDCP layer deletes the first data packet. In this case, if the first data packet has been transferred to an RLC layer, the PDCP layer also notifies the RLC layer to delete the first data packet, to prevent a transmit end from sending the timeout data packet through an air interface. It can be learned that the PDCP layer deletes the data packet due to existence of the discard timer. That the discard timer expires may be considered as a condition included in the second deletion condition. Alternatively, the second deletion condition may be another condition. A specific second deletion condition is not limited.

For another example, in a current implementation process, a plurality of services are transmitted by using one data bearer, and a PDCP layer may delete a data packet according to some service requirements. For example, a type of service has a delay requirement, and some data packets are discarded, to optimize this type of service, avoid a waste of air interface resources, and satisfy the delay requirement. For example, the PDCP layer needs to discard the first data packet according to a service requirement. In this case, it is considered that the compressed first data packet (or the first data packet) meets the first deletion condition. Alternatively, the first deletion condition may be another condition. A specific first deletion condition is not limited.

Regardless of a specific reason for deleting a data packet, if the PDCP layer deletes the compressed first data packet, buffer state inconsistency occurs between the first device and the second device, and consequently the data packet is discarded.

In this embodiment of this application, if the first deletion condition is met, the first device may not delete the compressed first data packet, or the first device may avoid deleting the compressed first data packet, so that a buffer state of the first device can keep consistent with a buffer state of the second device. This decreases a quantity of lost data packets. Alternatively, the first device may set the discard timer in the first manner, so that the compressed first data packet (or the first data packet) does not meet the second deletion condition. Because the compressed first data packet (or the first data packet) does not meet the second deletion condition, the first device does not delete the compressed first data packet, and a buffer state of the first device can keep consistent with a buffer state of the second device.

The first manner may include plurality of implementations, which are described below by using examples.

In a first implementation of the first manner, the first device may set timing duration of the discard timer to infinity. For example, when enabling the discard timer corresponding to the first data packet, before enabling the discard timer corresponding to the first data packet, or after enabling the discard timer corresponding to the first data packet, the first device may set the timing duration of the discard timer to infinity, so that the discard timer does not expire, and the first device correspondingly does not delete the first data packet or the compressed first data packet. Because the first device does not delete the compressed first data packet, buffer state inconsistency caused by deletion of the compressed first data packet does not occur between the first device and the second device. Setting the discard timer herein may be setting a discard timer for only one compressed data packet, or may be setting discard timers for all data packets.

The first device may set the timing duration of the discard timer to infinity. Alternatively, the second device may send a first message to the first device, where the first message indicates to set the timing duration of the discard timer corresponding to the first data packet to infinity. After receiving the first message, the first device may set the timing duration of the discard timer corresponding to the first data packet to infinity. Certainly, if the second device sends the first message to the first device, the first message may specifically indicate to set the timing duration of the discard timer corresponding to the first data packet to infinity, or may generally indicate to set timing duration of a discard timer to infinity. If the first message specifically indicates to set the timing duration of the discard timer corresponding to the first data packet to infinity, the first device only needs to set the timing duration of the discard timer corresponding to the first data packet to infinity, and may not set timing duration of a discard timer corresponding to another data packet. If the second device needs to indicate to set timing duration of discard timers corresponding to a plurality of data packets to infinity, the second device may send a plurality of messages for respective indications. In this case, the indication is implemented at a fine granularity. Alternatively, if the first message generally indicates to set timing duration of a discard timer to infinity, the first device may set timing duration of discard timers corresponding to all data packets to infinity, without requiring the second device to send quite many messages. This helps reduce signaling overheads.

In a second implementation of the first manner, after compressing the first data packet, the first device may disable the discard timer corresponding to the first data packet. For example, after the first device compresses the first data packet, if the discard timer corresponding to the first data packet does not expire, the first device may disable the discard timer, so that the discard timer does not expire, and the first device correspondingly does not delete the first data packet or the compressed first data packet. Because the first device does not delete the compressed first data packet, buffer state inconsistency caused by deletion of the compressed first data packet does not occur between the first device and the second device. In this case, the first device does not need to reset the timing duration of the discard timer, but only needs to disable the discard timer. Therefore, this implementation is relatively simple.

The foregoing two implementations are merely examples of the first manner. The first manner may include the first implementation or the second implementation, or may further include another implementation form. This is not specifically limited.

In addition, if the first data packet is not compressed when the discard timer corresponding to the first data packet expires, the first device may directly delete the first data packet in an existing processing manner. In this case, buffer states of the two devices are not affected.

S213: The first device sends the compressed first data packet to the second device, and the second device receives the compressed first data packet from the first device.

The second device only needs to normally receive a compressed data packet sent by the first device and normally decompress the compressed data packet.

S213 is an optional step, and is not necessarily performed.

In this embodiment of this application, the first device may not delete the compressed first data packet, so that a buffer state of the first device can keep consistent with a buffer state of the second device. This decreases a probability that the second device cannot perform decompression, and decreases a quantity of lost data packets.

The following describes, with reference to the accompanying drawings, apparatuses configured to implement the foregoing methods in the embodiments of this application. Therefore, all the foregoing content can be used in the following embodiments, and repeated content is not described again.

Figure 22:
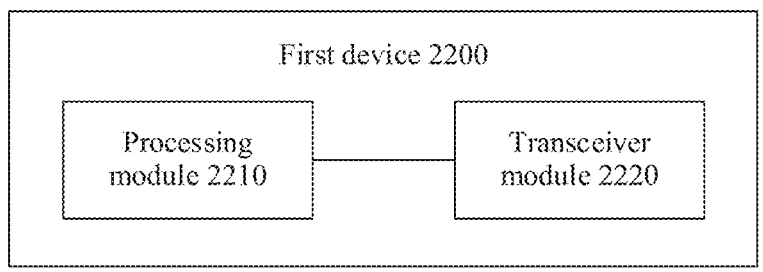
FIG. 22 is a schematic block diagram of a first device of a first type according to an embodiment of this application.

FIG. 22 is a schematic, block diagram of a communication device 2200 according to an embodiment of this application. For example, the communication device 2200 is a first device 2200. The first device 2200 includes a processing module 2210 and a transceiver module 2220. The processing module 2210 may be configured to perform all operations such as S71 performed by the first device in the embodiment shown in FIG. 7 except receiving and sending operations, and/or support another process of the technology described in this specification. The transceiver module 2220 may be configured to perform all receiving and sending operations such as S72 performed by the first device in the embodiment shown in FIG. 7, and/or support another process of the technology described in this specification. The transceiver module 2220 may be one functional module, or may be a general term of two functional modules. The two functional modules are a sending module and a receiving module. The sending module is configured to perform all the sending operations performed by the first device in the embodiment shown in FIG. 7, and/or support another process of the technology described in this specification. The receiving module is configured to perform all the receiving operations performed by the first device in the embodiment shown in FIG. 7, and/or support another process of the technology described in this specification.

For example, the processing module 2210 is configured to delete a first data packet.

The transceiver module 2220 is configured to send first signaling to a second device, where the first signaling includes or indicates a first buffer, the first buffer is used to compress a second data packet or used to decompress a compressed second data packet, a serial number of the first data packet and a serial number of the second data packet are consecutive, the serial number of the second data packet follows the serial number of the first data packet, and the second device is a receiving device of the compressed second data packet.

In an optional implementation, the first signaling is a control PDU.

In an optional implementation, the first signaling further includes the serial number of the first data packet, the serial number of the second data packet, or a serial number of the first buffer.

It should be understood that the processing module 2210 in this embodiment of this application may be implemented by a processor or a processor-related circuit component, and the transceiver module 2220 may be implemented by a transceiver or a transceiver-related circuit component.

Figure 23:
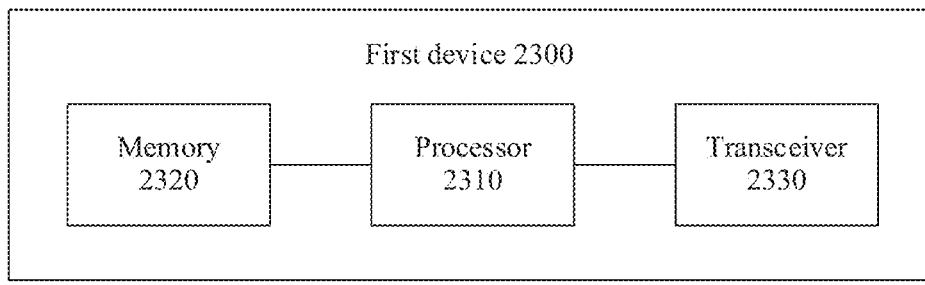
FIG. 23 is another schematic block diagram of a first device of a first type according to an embodiment of this application.

As shown in FIG. 23, an embodiment of this application further provides a communication device 2300. For example, the communication device 2300 is a first device 2300. The first device 2300 includes a processor 2310, a memory 2320, and a transceiver 2330. The memory 2320 stores instructions or a program. The processor 2310 is configured to execute the instructions or the program stored in the memory 2320. When the instructions or the program stored in the memory 2320 is executed, the processor 2310 is configured to perform the operations performed by the processing module 2210 in the foregoing embodiment, and the transceiver 2330 is configured to perform the operations performed by the transceiver module 2220 in the foregoing embodiment. The transceiver 2330 may be one functional component, and the functional component may implement both a receiving function and a sending function. Alternatively, the transceiver 2330 may be a general term of two functional components, and the two functional components are a transmitter and a receiver. The transmitter is configured to implement a function of the first device 2300 for sending information to another device, and the receiver is configured to implement a function of the first device 2300 for receiving information from another device.

It should be understood that the first device 2200 or the first device 2300 in the embodiments of this application may correspond to the first device in the embodiment shown in FIG. 7, and operations and/or functions of the modules of the first device 2200 or the first device 2300 are intended to implement corresponding procedures in the embodiment shown in FIG. 7. For brevity, details are not described herein.

Figure 24:
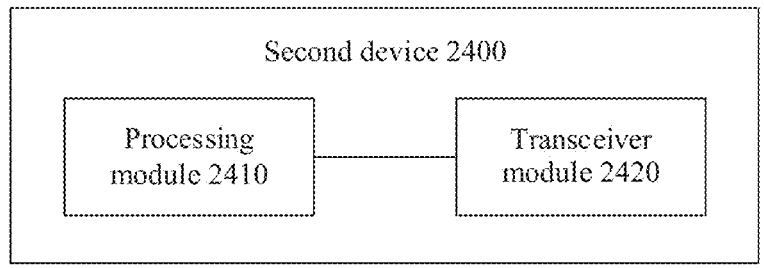
FIG. 24 is a schematic block diagram of a second device of a first type according to an embodiment of this application.

FIG. 24 is a schematic block diagram of a communication device 2400 according to an embodiment of this application. For example, the communication device 2400 is a second device 2400. The second device 2400 includes a processing module 2410 and a transceiver module 2420. The processing module 2410 may be configured to perform all operations such as S73 performed by the second device in the embodiment shown in FIG. 7 except receiving and sending operations, and/or support another process of the technology described in this specification. The transceiver module 2420 may be configured to perform all receiving and sending operations such as S72 performed by the second device in the embodiment shown in FIG. 7, and/or support another process of the technology described in this specification. The transceiver module 2420 may be one functional module, or may be a general term of two functional modules. The two functional modules are a sending module and a receiving module. The sending module is configured to perform all the sending operations performed by the second device in the embodiment shown in FIG. 7, and/or support another process of the technology described in this specification. The receiving module is configured to perform all the receiving operations performed by the second device in the embodiment shown in FIG. 7, and/or support another process of the technology described in this specification.

For example, the transceiver module 2420 is configured to receive first signaling from a first device.

The processing module 2410 is configured to decompress a compressed second data packet by using a PDCP layer by using a first buffer included in or indicated by the first signaling.

In an optional implementation, the transceiver module 2420 is configured to receive the first signaling from the first device in the following manner:

receiving the first signaling from the first device before a reordering timer of the PDCP layer expires, where the reordering timer is used by the second device to detect a data packet that has not been received.

In an optional implementation, the processing module 2410 is configured to decompress, in the following manner, the compressed second data packet by using the first buffer indicated by the first signaling:

when the reordering timer expires, decompressing the compressed second data packet by using the first buffer included in or indicated by the first signaling; or when the first signaling is received, decompressing the compressed second data packet by using the first buffer included in or indicated by the first signaling.

In an optional implementation, the transceiver module 2420 is further configured to receive the compressed second data packet from the first device before receiving the first signaling from the first device;

the processing module 2410 is further configured to unsuccessfully decompress the compressed second data packet; and the processing module 2410 is further configured to store the compressed second data packet.

In an optional implementation, the first signaling further includes a serial number of a first data packet, a serial number of the second data packet, or a serial number of the first buffer.

It should be understood that the processing module 2410 in this embodiment of this application may be implemented by a processor or a processor-related circuit component, and the transceiver module 2420 may be implemented by a transceiver or a transceiver-related circuit component.

Figure 25:
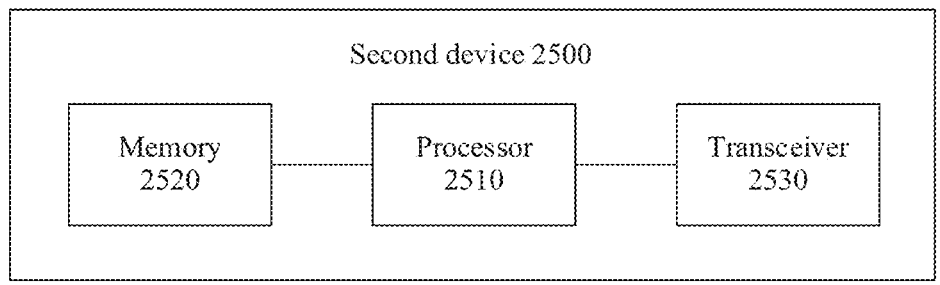
FIG. 25 is another schematic block diagram of a second device of a first type according to an embodiment of this application.

As shown in FIG. 25, an embodiment of this application further provides a communication device 2500. For example, the communication device 2500 is a second device 2500. The second device 2500 includes a processor 2510, a memory 2520, and a transceiver 2530. The memory 2520 stores instructions or a program. The processor 2510 is configured to execute the instructions or the program stored in the memory 2520. When the instructions or the program stored in the memory 2520 is executed, the processor 2510 is configured to perform the operations performed by the processing module 2410 in the foregoing embodiment, and the transceiver 2530 is configured to perform the operations performed by the transceiver module 2420 in the foregoing embodiment. The transceiver 2530 may be one functional component, and the functional component may implement both a receiving function and a sending function. Alternatively, the transceiver 2530 may be a general term of two functional components, and the two functional components are a transmitter and a receiver. The transmitter is configured to implement a function of the second device 2500 for sending information to another device, and the receiver is configured to implement a function of the second device 2500 for receiving information from another device.

It should be understood that the second device 2400 or the second device 2500 in the embodiments of this application may correspond to the first device in the embodiment shown in FIG. 7, and operations and/or functions of the modules in the second device 2400 or the second device 2500 are intended to implement corresponding procedures in the embodiment shown in FIG. 7. For brevity, details are not described herein.

Figure 26:
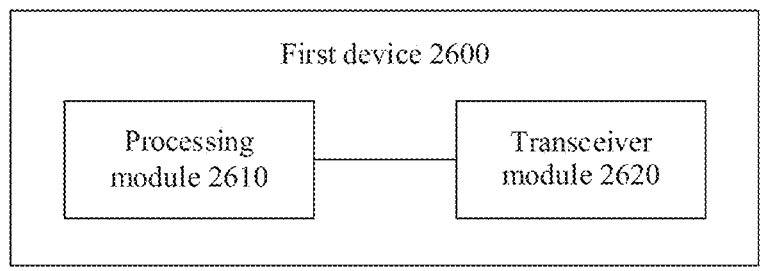
FIG. 26 is a schematic block diagram of a first device of a second type according to an embodiment of this application.

FIG. 26 is a schematic block diagram of a communication device 2600 according to an embodiment of this application. For example, the communication device 2600 is a first device 2600. The first device 2600 includes a processing module 2610 and a transceiver module 2620. The processing module 2610 may be configured to perform all operations such as S101 performed by the first device in the embodiment shown in FIG. 10 except receiving and sending operations, and/or support another process of the technology described in this specification. The transceiver module 2620 may be configured to perform all receiving and sending operations such as S102 performed by the first device in the embodiment shown in FIG. 10, and/or support another process of the technology described in this specification. The transceiver module 2620 may be one functional module, or may be a general term of two functional modules. The two functional modules are a sending module and a receiving module. The sending module is configured to perform all the sending operations performed by the first device in the embodiment shown in FIG. 10, and/or support another process of the technology described in this specification. The receiving module is configured to perform all the receiving operations performed by the first device in the embodiment shown in FIG. 10, and/or support another process of the technology described in this specification.

For example, the processing module 2610 is configured to delete a first data packet by using a PDCP layer.

The transceiver module 2620 is configured to send first information to a second device, where the first information indicates that a second data packet is used only for decompression or buffer state synchronization, and the second data packet is a compressed first data packet.

In an optional implementation, the transceiver module 2620 is configured to send the first information to the second device in the following manner:

sending the second data packet to the second device, where the second data packet carries a first identifier corresponding to the PDCP layer or an RLC layer, and the first identifier indicates that the second data packet is used only for decompression or buffer state synchronization; or sending a control PDU to the second device, where the control PDU carries the second data packet, and the control PDU indicates that the second data packet is used only for decompression or buffer state synchronization.

In an optional implementation, the control PDU includes a serial number of a first data packet or a serial number of the second data packet.

It should be understood that the processing module 2610 in this embodiment of this application may be implemented by a processor or a processor-related circuit component, and the transceiver module 2620 may be implemented by a transceiver or a transceiver-related circuit component.

Figure 27:
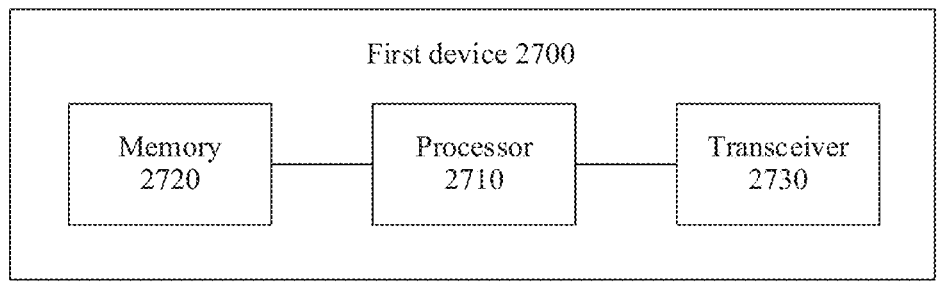
FIG. 27 is another schematic block diagram of a first device of a second type according to an embodiment of this application.

As shown in FIG. 27, an embodiment of this application further provides a communication device 2700. For example, the communication device 2700 is a first device 2700. The first device 2700 includes a processor 2710, a memory 2720, and a transceiver 2730. The memory 2720 stores instructions or a program. The processor 2710 is configured to execute the instructions or the program stored in the memory 2720. When the instructions or the program stored in the memory 2720 is executed, the processor 2710 is configured to perform the operations performed by the processing module 2610 in the foregoing embodiment, and the transceiver 2730 is configured to perform the operations performed by the transceiver module 2620 in the foregoing embodiment. The transceiver 2730 may be one functional component, and the functional component may implement both a receiving function and a sending function. Alternatively, the transceiver 2730 may be a general term of two functional components, and the two functional components are a transmitter and a receiver. The transmitter is configured to implement a function of the first device 2700 for sending information to another device, and the receiver is configured to implement a function of the first device 2700 for receiving information from another device.

It should be understood that the first device 2600 or the first device 2700 in the embodiments of this application may correspond to the first device in the embodiment shown in FIG. 10, and operations and/or functions of the modules of the first device 2600 or the first device 2700 are intended to implement corresponding procedures in the embodiment shown in FIG. 10. For brevity, details are not described herein.

Figure 28:
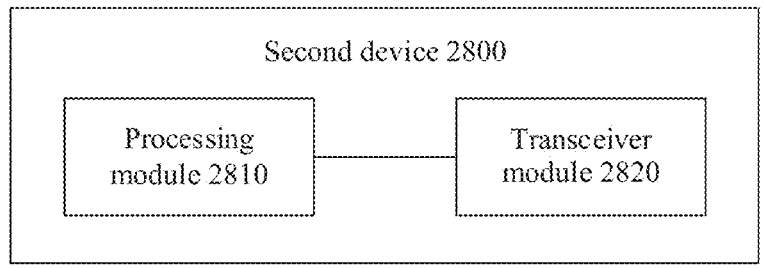
FIG. 28 is a schematic block diagram of a second device of a second type according to an embodiment of this application.

FIG. 28 is a schematic block diagram of a communication device 2800 according to an embodiment of this application. For example, the communication device 2800 is a second device 2800. The second device 2800 includes a processing module 2810 and a transceiver module 2820. The processing module 2810 may be configured to perform all operations such as S103 performed by the second device in the embodiment shown in FIG. 10 except receiving and sending operations, and/or support another process of the technology described in this specification. The transceiver module 2820 may be configured to perform all receiving and sending operations such as S102 performed by the second device in the embodiment shown in FIG. 10, and/or support another process of the technology described in this specification. The transceiver module 2820 may be one functional module, or may be a general term of two functional modules. The two functional modules are a sending module and a receiving module. The sending module is configured to perform all the sending operations performed by the second device in the embodiment shown in FIG. 10, and/or support another process of the technology described in this specification. The receiving module is configured to perform all the receiving operations performed by the second device in the embodiment shown in FIG. 10, and/or support another process of the technology described in this specification.

For example, the transceiver module 2820 is configured to receive first information from a first device, where the first information indicates that a second data packet is used only for decompression or buffer state synchronization.

The processing module 2810 is configured to decompress a compressed third data packet based on the second data packet by using a PDCP layer, where a serial number of the compressed third data packet follows a serial number of the second data packet.

In an optional implementation, the transceiver module 2820 is configured to receive the first information from the first device in the following manner, where the first information indicates that the second data packet is used only for decompression or buffer state synchronization:

receiving the second data packet from the first device, where the second data packet carries a first identifier corresponding to the PDCP layer or an RLC layer, and the first identifier indicates that the second data packet is used only for decompression or buffer state synchronization; or receiving a control PDU from the second device, where the control PDU carries the second data packet, and the control PDU indicates that the second data packet is used only for decompression or buffer state synchronization.

In an optional implementation, the processing module 2810 is further configured to:

decompress the second data packet by using the PDCP layer, to obtain a first data packet; and skip transferring the first data packet to an upper layer of the PDCP layer by using the PDCP layer.

In an optional implementation, the control PDU includes a serial number of the first data packet or the serial number of the second data packet.

It should be understood that the processing module 2810 in this embodiment of this application may be implemented by a processor or a processor-related circuit component, and the transceiver module 2820 may be implemented by a transceiver or a transceiver-related circuit component.

Figure 29:
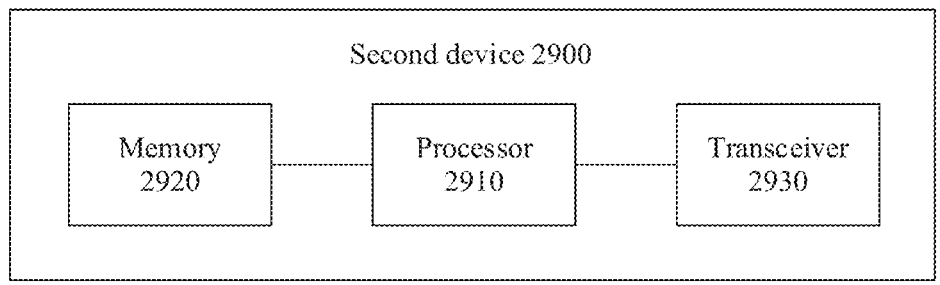
FIG. 29 is another schematic block diagram of a second device of a second type according to an embodiment of this application.

As shown in FIG. 29, an embodiment of this application further provides a communication device 2900. For example, the communication device 2900 is a second device 2900. The second device 2900 includes a processor 2910, a memory 2920, and a transceiver 2930. The memory 2920 stores instructions or a program. The processor 2910 is configured to execute the instructions or the program stored in the memory 2920. When the instructions or the program stored in the memory 2920 is executed, the processor 2910 is configured to perform the operations performed by the processing module 2810 in the foregoing embodiment, and the transceiver 2930 is configured to perform the operations performed by the transceiver module 2820 in the foregoing embodiment. The transceiver 2930 may be one functional component, and the functional component may implement both a receiving function and a sending function. Alternatively, the transceiver 2930 may be a general term of two functional components, and the two functional components are a transmitter and a receiver. The transmitter is configured to implement a function of the second device 2900 for sending information to another device, and the receiver is configured to implement a function of the second device 2900 for receiving information from another device.

It should be understood that the second device 2800 or the second device 2900 in the embodiments of this application may correspond to the first device in the embodiment shown in FIG. 10, and operations and/or functions of the modules in the second device 2800 or the second device 2900 are intended to implement corresponding procedures in the embodiment shown in FIG. 10. For brevity, details are not described herein.

Figure 30:
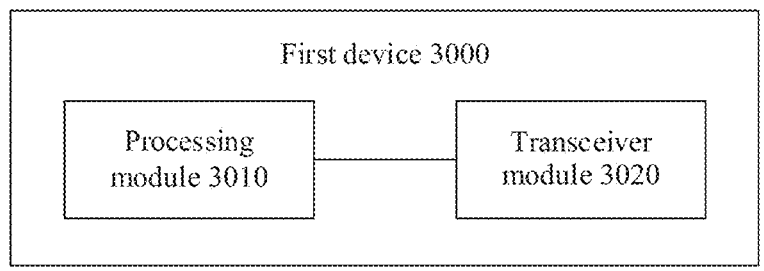
FIG. 30 is a schematic block diagram of a first device of a third type according to an embodiment of this application.

FIG. 30 is a schematic block diagram of a communication device 3000 according to an embodiment of this application. For example, the communication device 3000 is a first device 3000. The first device 3000 includes a processing module 3010 and a transceiver module 3020. The processing module 3010 may be configured to perform all operations such as S131 and S132 performed by the first device in the embodiment shown in FIG. 13 except receiving and sending operations, and/or support another process of the technology described in this specification. The transceiver module 3020 may be configured to perform all receiving and sending operations such as S133 performed by the first device in the embodiment shown in FIG. 13, and/or support another process of the technology described in this specification. The transceiver module 3020 may be one functional module, or may be a general term of two functional modules. The two functional modules are a sending module and a receiving module. The sending module is configured to perform all the sending operations performed by the first device in the embodiment shown in FIG. 13, and/or support another process of the technology described in this specification. The receiving module is configured to perform all the receiving operations performed by the first device in the embodiment shown in FIG. 13, and/or support another process of the technology described in this specification.

For example, the processing module 3010 is configured to delete a first data packet.

The processing module 3010 is further configured to: reset a buffer, and compress a second data packet by using a reset buffer, to obtain a compressed second data packet, where the second data packet is a data packet that has not been compressed by the first device.

The transceiver module 3020 is configured to send the compressed second data packet to a second device.

In an optional implementation, the transceiver module 3020 is further configured to receive a control PDU from the second device, where the control PDU indicates that a compressed third data packet is unsuccessfully decompressed; and the processing module 3010 is further configured to: reset the buffer again when a serial number of the compressed third data packet is greater than a serial number of the second data packet; otherwise, keep, by the first device, the buffer unchanged.

In an optional implementation, the processing module 3010 is configured to reset the buffer in the following manner:

clearing the buffer;

clearing the buffer, and then configuring a predefined dictionary for the buffer; or configuring a predefined dictionary for the buffer.

In an optional implementation, the processing module 3010 is further configured to configure a predefined dictionary for the buffer after resetting the buffer.

It should be understood that the processing module 3010 in this embodiment of this application may be implemented by a processor or a processor-related circuit component, and the transceiver module 3020 may be implemented by a transceiver or a transceiver-related circuit component.

Figure 31:
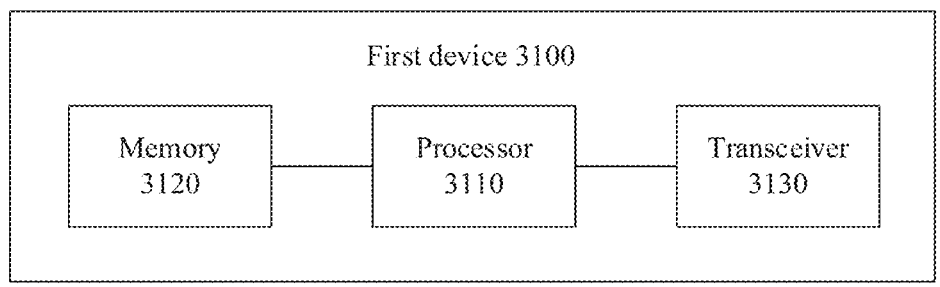
FIG. 31 is another schematic block diagram of a first device of a third type according to an embodiment of this application.

As shown in FIG. 31, an embodiment of this application further provides a communication device 3100. For example, the communication device 3100 is a first device 3100. The first device 3100 includes a processor 3110, a memory 3120, and a transceiver 3130. The memory 3120 stores instructions or a program. The processor 3110 is configured to execute the instructions or the program stored in the memory 3120. When the instructions or the program stored in the memory 3120 is executed, the processor 3110 is configured to perform the operations performed by the processing module 3010 in the foregoing embodiment, and the transceiver 3130 is configured to perform the operations performed by the transceiver module 3020 in the foregoing embodiment. The transceiver 3130 may be one functional component, and the functional component may implement both a receiving function and a sending function. Alternatively, the transceiver 3130 may be a general term of two functional components, and the two functional components are a transmitter and a receiver. The transmitter is configured to implement a function of the first device 3100 for sending information to another device, and the receiver is configured to implement a function of the first device 3100 for receiving information from another device.

It should be understood that the first device 3000 or the first device 3100 in the embodiments of this application may correspond to the first device in the embodiment shown in FIG. 13, and operations and/or functions of the modules of the first device 3000 or the first device 3100 are intended to implement corresponding procedures in the embodiment shown in FIG. 13. For brevity, details are not described herein.

Figure 32:
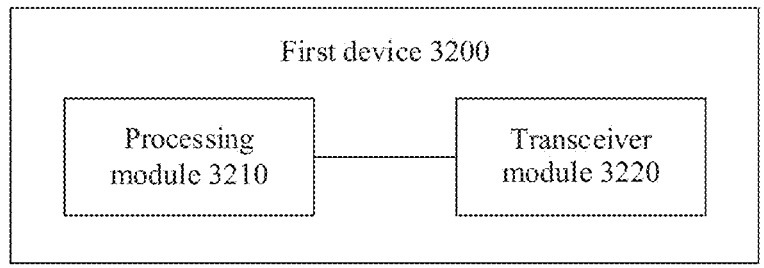
FIG. 32 is a schematic block diagram of a first device of a fourth type according to an embodiment of this application.

FIG. 32 is a schematic block diagram of a communication device 3200 according to an embodiment of this application. For example, the communication device 3200 is a first device 3200. The first device 3200 includes a processing module 3210 and a transceiver module 3220. The processing module 3210 may be configured to perform all operations such as S161 and S163 performed by the first device in the embodiment shown in FIG. 16 except receiving and sending operations, and/or support another process of the technology described in this specification. The transceiver module 3220 may be configured to perform all receiving and sending operations such as S162 performed by the first device in the embodiment shown in FIG. 16, and/or support another process of the technology described in this specification. The transceiver module 3220 may be one functional module, or may be a general term of two functional modules. The two functional modules are a sending module and a receiving module. The sending module is configured to perform all the sending operations performed by the first device in the embodiment shown in FIG. 16, and/or support another process of the technology described in this specification. The receiving module is configured to perform all the receiving operations performed by the first device in the embodiment shown in FIG. 16, and/or support another process of the technology described in this specification.

For example, the processing module 3210 is configured to delete a first data packet.

The transceiver module 3220 is configured to receive a control PDU from a second device, where the control PDU indicates that a compressed second data packet is unsuccessfully decompressed.

The processing module 3210 is further configured to: reset a buffer, and compress at least one data packet by using a reset buffer, where the at least one data packet includes all or some data packets that have not been sent by the first device to the second device.

In an optional implementation, the at least one data packet further includes all or some data packets that have been sent by the first device to the second device, a serial number of a third data packet in the at least one data packet is greater than or equal to a serial number of the compressed second data packet, when the serial number of the third data packet is greater than the serial number of the compressed second data packet, the serial number of the third data packet and the serial number of the compressed second data packet are consecutive, and the third data packet is a data packet with a smallest serial number in the at least one data packet.

In an optional implementation, the processing module 3210 is configured to reset the buffer in the following manner:

clearing the buffer;

clearing the buffer, and then configuring a predefined dictionary for the buffer; or configuring a predefined dictionary for the buffer.

In an optional implementation, the processing module 3210 is further configured to configure a predefined dictionary for the buffer after resetting the buffer.

It should be understood that the processing module 3210 in this embodiment of this application may be implemented by a processor or a processor-related circuit component, and the transceiver module 3220 may be implemented by a transceiver or a transceiver-related circuit component.

Figure 33:
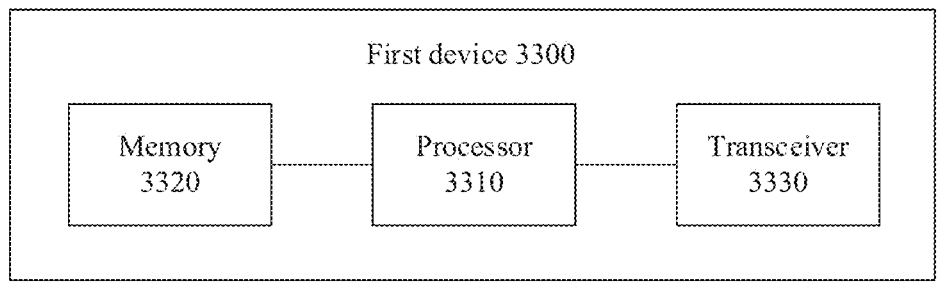
FIG. 33 is another schematic block diagram of a first device of a fourth type according to an embodiment of this application.

As shown in FIG. 33, an embodiment of this application further provides a communication device 3300. For example, the communication device 3300 is a first device 3300. The first device 3300 includes a processor 3310, a memory 3320, and a transceiver 3330. The memory 3320 stores instructions or a program. The processor 3310 is configured to execute the instructions or the program stored in the memory 3320. When the instructions or the program stored in the memory 3320 is executed, the processor 3310 is configured to perform the operations performed by the processing module 3210 in the foregoing embodiment, and the transceiver 3330 is configured to perform the operations performed by the transceiver module 3220 in the foregoing embodiment. The transceiver 3330 may be one functional component, and the functional component may implement both a receiving function and a sending function. Alternatively, the transceiver 3330 may be a general term of two functional components, and the two functional components are a transmitter and a receiver. The transmitter is configured to implement a function of the first device 3300 for sending information to another device, and the receiver is configured to implement a function of the first device 3300 for receiving information from another device.

It should be understood that the first device 3200 or the first device 3300 in the embodiments of this application may correspond to the first device in the embodiment shown in FIG. 16, and operations and/or functions of the modules of the first device 3200 or the first device 3300 are intended to implement corresponding procedures in the embodiment shown in FIG. 16. For brevity, details are not described herein.

Figure 34:
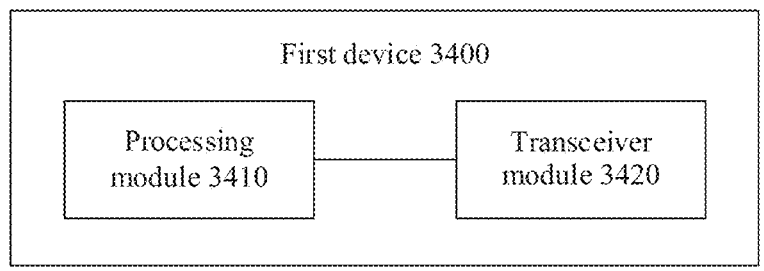
FIG. 34 is a schematic block diagram of a first device of a fifth type according to an embodiment of this application.

FIG. 34 is a schematic block diagram of a communication device 3400 according to an embodiment of this application. For example, the communication device 3400 is a first device 3400. The first device 3400 includes a processing module 3410 and a transceiver module 3420. The processing module 3410 may be configured to perform all operations such as S211 and S212 performed by the first device in the embodiment shown in FIG. 21 except receiving and sending operations, and/or support another process of the technology described in this specification. The transceiver module 3420 may be configured to perform all receiving and sending operations such as S213 performed by the first device in the embodiment shown in FIG. 21, and/or support another process of the technology described in this specification. The transceiver module 3420 may be one functional module, or may be a general term of two functional modules. The two functional modules are a sending module and a receiving module. The sending module is configured to perform all the sending operations performed by the first device in the embodiment shown in FIG. 21, and/or support another process of the technology described in this specification. The receiving module is configured to perform all the receiving operations performed by the first device in the embodiment shown in FIG. 21, and/or support another process of the technology described in this specification.

For example, the processing module 3410 is configured to compress a first data packet to obtain a compressed first data packet.

The processing module 3410 is further configured to: skip deleting the compressed first data packet when a first deletion condition is met, or set a discard timer in a first manner, so that the compressed first data packet does not meet a second deletion condition.

In an optional implementation, the first manner includes:
setting timing duration of the discard timer to infinity; or
disabling the discard timer after compressing the first data packet.

In an optional implementation, the transceiver module 3420 is configured to receive a first message from a second device, where the first message indicates that the timing duration of the discard timer is infinity.

It should be understood that the processing module 3410 in this embodiment of this application may be implemented by a processor or a processor-related circuit component, and the transceiver module 3420 may be implemented by a transceiver or a transceiver-related circuit component.

Figure 35:
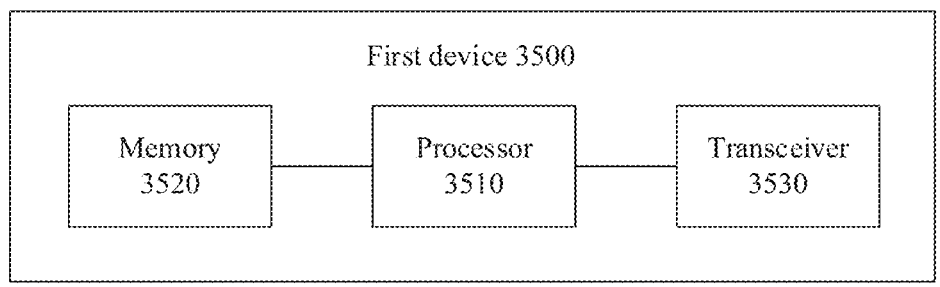
FIG. 35 is another schematic block diagram of a first device of a fifth type according to an embodiment of this application.

As shown in FIG. 35, an embodiment of this application further provides a communication device 3500. For example, the communication device 3500 is a first device 3500. The first device 3500 includes a processor 3510, a memory 3520, and a transceiver 3530. The memory 3520 stores instructions or a program. The processor 3510 is configured to execute the instructions or the program stored in the memory 3520. When the instructions or the program stored in the memory 3520 is executed, the processor 3510 is configured to perform the operations performed by the processing module 3410 in the foregoing embodiment, and the transceiver 3530 is configured to perform the operations performed by the transceiver module 3420 in the foregoing embodiment. The transceiver 3530 may be one functional component, and the functional component may implement both a receiving function and a sending function. Alternatively, the transceiver 3530 may be a general term of two functional components, and the two functional components are a transmitter and a receiver. The transmitter is configured to implement a function of the first device 3500 for sending information to another device, and the receiver is configured to implement a function of the first device 3500 for receiving information from another device.

It should be understood that the first device 3400 or the first device 3500 in the embodiments of this application may correspond to the first device in the embodiment shown in FIG. 21, and operations and/or functions of the modules of the first device 3400 or the first device 3500 are intended to implement corresponding procedures in the embodiment shown in FIG. 21. For brevity, details are not described herein.

An embodiment of this application further provides a communication apparatus. The communication apparatus may be a terminal device or a circuit. The communication apparatus may be configured to perform actions performed by the first device or the second device in the method embodiment shown in FIG. 7, may be configured to perform actions performed by the first device or the second device in the method embodiment shown in FIG. 10, may be configured to perform actions performed by the first device in the method embodiment shown in FIG. 13, may be configured to perform actions performed by the first device in the method embodiment shown in FIG. 16, or may be configured to perform actions performed by the first device in the method embodiment shown in FIG. 21.

Figure 36:
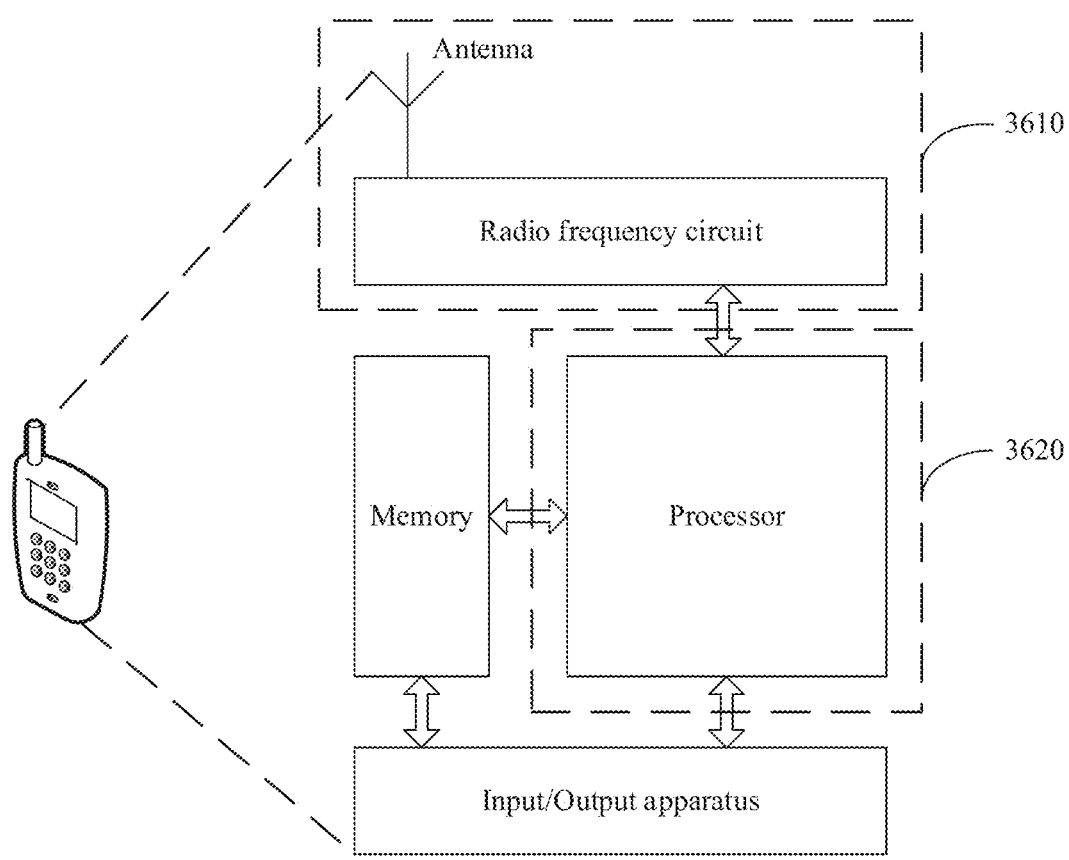
FIG. 36 is a schematic block diagram of a communication apparatus according to an embodiment of this application.

When the communication apparatus is a terminal device, FIG. 36 is a simplified schematic diagram of a structure of the terminal device. For ease of understanding and illustration, descriptions are provided by using an example that the terminal device is a mobile phone in FIG. 36. As shown in FIG. 36, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is mainly configured to store the software program and the data. The radio frequency circuit is mainly configured to: perform conversion between a baseband signal and a radio frequency signal, and process the radio frequency signal. The antenna is mainly configured to send and receive a radio frequency signal in a form of an electromagnetic wave. The input/output apparatus, for example, a touchscreen, a display, or a keyboard, is mainly configured to: receive data input by a user and output data to the user. It should be noted that some types of terminal devices may have no input/output apparatus.

When data needs to be sent, the processor performs baseband processing on to-be-sent data, and outputs a baseband signal to the radio frequency circuit. The radio frequency circuit performs radio frequency processing on the baseband signal and then sends a radio frequency signal to the outside in a form of an electromagnetic wave through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data. For ease of description, only one memory and one processor are shown in FIG. 36. An actual terminal device product may include one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna that has sending and receiving functions and the radio frequency circuit may be considered as a transceiver unit of the terminal device, and the processor that has a processing function may be considered as a processing unit of the terminal device. As shown in FIG. 36, the terminal device includes the transceiver unit 3610 and the processing unit 3620. The transceiver unit may also be referred to as a transceiver, a transceiver machine, a transceiver apparatus, or the like. The processing unit may also be referred to as a processor, a processing board, a processing module, a processing apparatus, or the like. Optionally, a component for implementing a receiving function in the transceiver unit 3610 may be considered as a receiving unit, and a component for implementing a sending function in the transceiver unit 3610 may be considered as a sending unit. In other words, the transceiver unit 3610 includes the receiving unit and the sending unit. The transceiver unit sometimes may also be referred to as a transceiver machine, a transceiver, a transceiver circuit, or the like. The receiving unit sometimes may also be referred to as a receiver machine, a receiver, a receiver circuit, or the like. The sending unit sometimes may also be referred to as a transmitter machine, a transmitter, a transmitter circuit, or the like.

It should be understood that the transceiver unit 3610 is configured to perform a sending operation and a receiving operation on the first device side in the method embodiment shown in FIG. 7, and the processing unit 3620 is configured to perform operations other than the receiving and sending operations on the first device side in the method embodiment shown in FIG. 7.

For example, in an implementation, the transceiver unit 3610 is configured to perform all receiving and sending steps such as S72 on the first device side in the embodiment shown in FIG. 7. The processing unit 3620 is configured to perform operations such as S71 other than the receiving and sending operations on the first device side in the embodiment shown in FIG. 7, and/or support another process of the technology described in this specification.

Alternatively, the transceiver unit 3610 is configured to perform a sending operation and a receiving operation on the second device side in the method embodiment shown in FIG. 7, and the processing unit 3620 is configured to perform operations other than the receiving and sending operations on the second device side in the method embodiment shown in FIG. 7.

For example, in an implementation, the transceiver unit 3610 is configured to perform all receiving and sending steps such as S72 on the second device side in the embodiment shown in FIG. 7. The processing unit 3620 is configured to perform operations such as S73 other than the receiving and sending operations on the second device side in the embodiment shown in FIG. 7, and/or support another process of the technology described in this specification.

Alternatively, the transceiver unit 3610 is configured to perform a sending operation and a receiving operation on the first device side in the method embodiment shown in FIG. 10, and the processing unit 3620 is configured to perform operations other than the receiving and sending operations on the first device side in the method embodiment shown in FIG. 10.

For example, in an implementation, the transceiver unit 3610 is configured to perform all receiving and sending steps such as S102 on the first device side in the embodiment shown in FIG. 10. The processing unit 3620 is configured to perform operations such as S101 other than the receiving and sending operations on the first device side in the embodiment shown in FIG. 10, and/or support another process of the technology described in this specification.

Alternatively, the transceiver unit 3610 is configured to perform a sending operation and a receiving operation on the second device side in the method embodiment shown in FIG. 10, and the processing unit 3620 is configured to perform operations other than the receiving and sending operations on the second device side in the method embodiment shown in FIG. 10.

For example, in an implementation, the transceiver unit 3610 is configured to perform all receiving and sending steps such as S102 on the second device side in the embodiment shown in FIG. 10. The processing unit 3620 is configured to perform operations such as S103 other than the receiving and sending operations on the second device side in the embodiment shown in FIG. 10, and/or support another process of the technology described in this specification.

Alternatively, the transceiver unit 3610 is configured to perform a sending operation and a receiving operation on the first device side in the method embodiment shown in FIG. 13, and the processing unit 3620 is configured to perform operations other than the receiving and sending operations on the first device side in the method embodiment shown in FIG. 13.

For example, in an implementation, the transceiver unit 3610 is configured to perform all receiving and sending steps such as S133 on the first device side in the embodiment shown in FIG. 13. The processing unit 3620 is configured to perform operations such as S131 and S132 other than the receiving and sending operations on the first device side in the embodiment shown in FIG. 13, and/or support another process of the technology described in this specification.

Alternatively, the transceiver unit 3610 is configured to perform a sending operation and a receiving operation on the first device side in the method embodiment shown in FIG. 16, and the processing unit 3620 is configured to perform operations other than the receiving and sending operations on the first device side in the method embodiment shown in FIG. 16.

For example, in an implementation, the transceiver unit 3610 is configured to perform all receiving and sending steps such as S162 on the first device side in the embodiment shown in FIG. 16. The processing unit 3620 is configured to perform operations such as S161 and S163 other than the receiving and sending operations on the first device side in the embodiment shown in FIG. 16, and/or support another process of the technology described in this specification.

Alternatively, the transceiver unit 3610 is configured to perform a sending operation and a receiving operation on the first device side in the method embodiment shown in FIG. 21, and the processing unit 3620 is configured to perform operations other than the receiving and sending operations on the first device side in the method embodiment shown in FIG. 21.

For example, in an implementation, the transceiver unit 3610 is configured to perform all receiving and sending steps such as S213 on the first device side in the embodiment shown in FIG. 21. The processing unit 3620 is configured to perform operations such as S211 and S212 other than the receiving and sending operations on the first device side in the embodiment shown in FIG. 21, and/or support another process of the technology described in this specification.

When the communication apparatus is a chip, the chip includes a transceiver unit and a processing unit. The transceiver unit may be an input/output circuit or a communication interface. The processing unit is a processor, a microprocessor, or an integrated circuit integrated on the chip.

Figure 37:
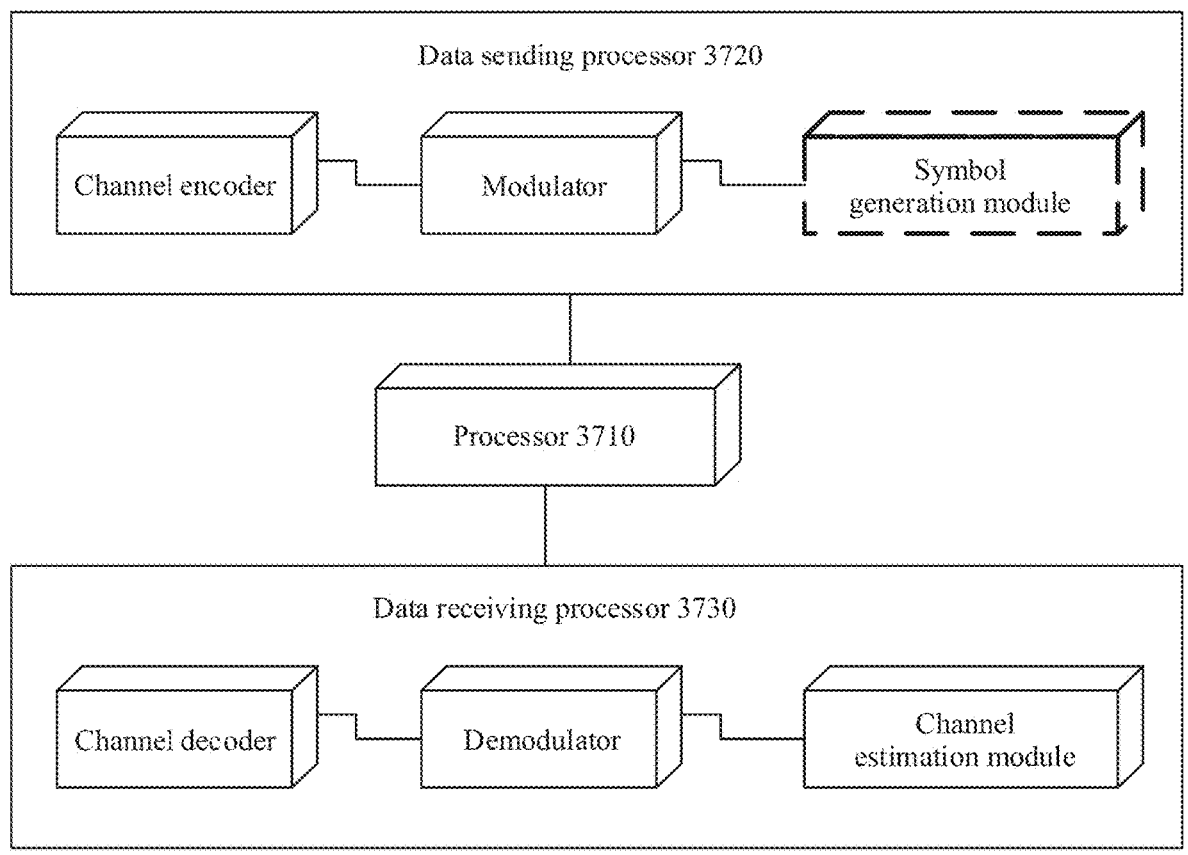
FIG. 37 is another schematic block diagram of a communication apparatus according to an embodiment of this application.

When the communication apparatus in this embodiment of this application is a terminal device, for details, reference may be made to a device shown in FIG. 37. In an example, the device may implement functions similar to those of a processor 3710 in FIG. 37. In FIG. 37, the device includes the processor 3710, a data sending processor 3720, and a data receiving processor 3730. The processing module 410 in the foregoing embodiments may be the processor 3710 in FIG. 37, and implements corresponding functions. The transceiver module 420 in the foregoing embodiments may be the data sending processor 3720 and/or the data receiving processor 3730 in FIG. 37.

Although FIG. 37 shows a channel encoder and a channel decoder, it may be understood that these modules are merely examples and do not constitute a limitation on this embodiment.

Figure 38:
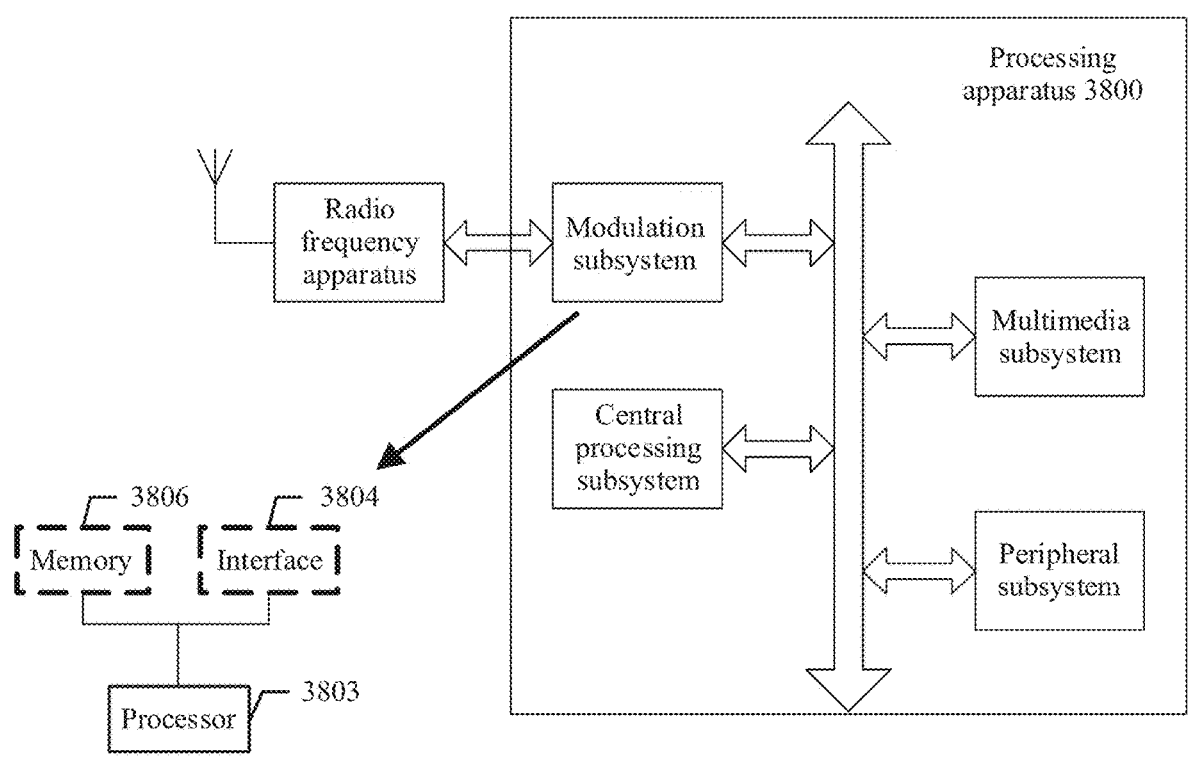
FIG. 38 is still another schematic block diagram of a communication apparatus according to an embodiment of this application.

FIG. 38 shows another form of this embodiment. A processing apparatus 3800 includes modules such as a modulation subsystem, a central processing subsystem, and a peripheral subsystem. The communication apparatus in this embodiment may be used as the modulation subsystem in the processing apparatus 3800. Specifically, the modulation subsystem may include a processor 3803 and an interface 3804. The processor 3803 implements the functions of the processing module 2210, and the interface 3804 implements the functions of the transceiver module 2220. Alternatively, the processor 3803 implements the functions of the processing module 2410, and the interface 3804 implements the functions of the transceiver module 2420. Alternatively, the processor 3803 implements the functions of the processing module 2610, and the interface 3804 implements the functions of the transceiver module 2620. Alternatively, the processor 3803 implements the functions of the processing module 2810, and the interface 3804 implements the functions of the transceiver module 2820. Alternatively, the processor 3803 implements the functions of the processing module 3010, and the interface 3804 implements the functions of the transceiver module 3020. Alternatively, the processor 3803 implements the functions of the processing module 3210, and the interface 3804 implements the functions of the transceiver module 3220. Alternatively, the processor 3803 implements the functions of the processing module 3410, and the interface 3804 implements the functions of the transceiver module 3420. As another variant, the modulation subsystem includes a memory 3806, a processor 3803, and a program that is stored in the memory 3806 and that can be executed by the processor. When executing the program, the processor 3803 implements the method on the first device side or the second device side in the method embodiment shown in FIG. 7. Alternatively, when executing the program, the processor 3803 implements the method on the first device side or the second device side in the method embodiment shown in FIG. 10. Alternatively, when executing the program, the processor 3803 implements the method on the first device side in the method embodiment shown in FIG. 13. Alternatively, when executing the program, the processor 3803 implements the method on the first device side in the method embodiment shown in FIG. 16. Alternatively, when executing the program, the processor 3803 implements the method on the first device side in the method embodiment shown in FIG. 21. It should be noted that the memory 3806 may be a nonvolatile memory or a volatile memory. The memory 3806 may be located in the modulation subsystem, or may be located in the processing apparatus 3800, provided that the memory 3806 can be connected to the processor 3803.

An embodiment of this application further provides a communication system. The communication system may include the first device in the embodiment shown in FIG. 7, and include the second device in the embodiment shown in FIG. 7. The first device is, for example, the first device 2200 in FIG. 22 or the first device 2300 in FIG. 23, and the second device is, for example, the second device 2400 in FIG. 24 or the second device 2500 in FIG. 25. For example, the first device may be configured to perform all operations performed by the first device in the embodiment shown in FIG. 7, for example, S71 and S72 in the embodiment shown in FIG. 7, and/or support another process of the technology described in this specification. The second device may be configured to perform all operations performed by the second device in the embodiment shown in FIG. 7, for example, S72 and S73 in the embodiment shown in FIG. 7, and/or support another process of the technology described in this specification.

An embodiment of this application further provides a communication system. The communication system may include the first device in the embodiment shown in FIG. 10, and include the second device in the embodiment shown in FIG. 10. The first device is, for example, the first device 2600 in FIG. 26 or the first device 2700 in FIG. 27, and the second device is, for example, the second device 2800 in FIG. 28 or the second device 2900 in FIG. 29. For example, the first device may be configured to perform all operations performed by the first device in the embodiment shown in FIG. 10, for example, S101 and S102 in the embodiment shown in FIG. 10, and/or support another process of the technology described in this specification. The second device may be configured to perform all operations performed by the second device in the embodiment shown in FIG. 10, for example, S102 and S103 in the embodiment shown in FIG. 10, and/or support another process of the technology described in this specification.

The two communication systems may be a same communication system or different communication systems.

An embodiment of this application further provides a computer-readable storage medium. The computer-readable storage medium stores a computer program. When the program is executed by a processor, a procedure related to the first device in the embodiment shown in FIG. 7 provided in the foregoing method embodiments may be implemented.

An embodiment of this application further provides a computer-readable storage medium. The computer-readable storage medium stores a computer program. When the program is executed by a processor, a procedure related to the second device in the embodiment shown in FIG. 7 provided in the foregoing method embodiments may be implemented.

An embodiment of this application further provides a computer-readable storage medium. The computer-readable storage medium stores a computer program. When the program is executed by a processor, a procedure related to the first device in the embodiment shown in FIG. 10 provided in the foregoing method embodiments may be implemented.

An embodiment of this application further provides a computer-readable storage medium. The computer-readable storage medium stores a computer program. When the program is executed by a processor, a procedure related to the second device in the embodiment shown in FIG. 10 provided in the foregoing method embodiments may be implemented.

An embodiment of this application further provides a computer-readable storage medium. The computer-readable storage medium stores a computer program. When the program is executed by a processor, a procedure related to the first device in the embodiment shown in FIG. 13 provided in the foregoing method embodiments may be implemented.

An embodiment of this application further provides a computer-readable storage medium. The computer-readable storage medium stores a computer program. When the program is executed by a processor, a procedure related to the first device in the embodiment shown in FIG. 16 provided in the foregoing method embodiments may be implemented.

An embodiment of this application further provides a computer-readable storage medium. The computer-readable storage medium stores a computer program. When the program is executed by a processor, a procedure related to the first device in the embodiment shown in FIG. 21 provided in the foregoing method embodiments may be implemented.

An embodiment of this application further provides a computer program product including instructions. When the instructions are executed, the method on the first device side in the method embodiment shown in FIG. 7 is performed.

An embodiment of this application further provides a computer program product including instructions. When the instructions are executed, the method on the second device side in the method embodiment shown in FIG. 7 is performed.

An embodiment of this application further provides a computer program product including instructions. When the instructions are executed, the method on the first device side in the method embodiment shown in FIG. 10 is performed.

An embodiment of this application further provides a computer program product including instructions. When the instructions are executed, the method on the second device side in the method embodiment shown in FIG. 10 is performed.

An embodiment of this application further provides a computer program product including instructions. When the instructions are executed, the method on the first device side in the method embodiment shown in FIG. 13 is performed.

An embodiment of this application further provides a computer program product including instructions. When the instructions are executed, the method on the first device side in the method embodiment shown in FIG. 16 is performed.

An embodiment of this application further provides a computer program product including instructions. When the instructions are executed, the method on the first device side in the method embodiment shown in FIG. 21 is performed.

It should be understood that the processor in the embodiments of this application may be a central processing unit (central processing unit, CPU), or may be another general-purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate, a transistor logic device, a discrete hardware component, or the like. The general-purpose processor may be a microprocessor, or the processor may be any conventional processor or the like.

It should be further understood that the memory in the embodiments of this application may be a volatile memory or a nonvolatile memory, or may include both a volatile memory and a nonvolatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM) that is used as an external cache. By way of example but not limitation, RAMs in many forms may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be noted that when the processor is a general-purpose processor, a DSP, an ASIC, an FPGA or another programmable logic device, a discrete gate, a transistor logic device, or a discrete hardware component, the memory (a storage module) is integrated into the processor.

It should be noted that the memory described in this specification aims to include but is not limited to these memories and any memory of another proper type.

It should be understood that serial numbers of the foregoing processes do not mean execution sequences in the embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or the units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions in the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of the embodiments of this application. Any variation or replacement readily figured out by a person skilled in the art within the technical scope disclosed in the embodiments of this application shall fall within the protection scope of this application. Therefore, the protection scope of the embodiments of this application shall be subject to the protection scope of the claims.

What is claimed is:

1. A method, comprising:
deleting, at a first device, a first data packet without transmitting the first data packet from a plurality of data packets; and
sending, from the first device in response to deleting the first data packet, a first signaling to a second device, wherein the first signaling comprises a first buffer state, wherein the first buffer state comprises content of a buffer of the first device that is based on the first data packet not sent to the second device,
wherein the first buffer state is used to compress, based on the first data packet, a second data packet or decompress, based on the first data packet, a compressed second data packet,
wherein the content of the buffer of the first device comprises a first serial number of the first data packet and a second serial number of the second data packet,
wherein the first serial number of the first data packet and the second serial number of the second data packet are consecutive,
wherein the second serial number follows the first serial number, and
wherein the second device is a receiving device of the compressed second data packet and is not sent the first data packet.

2. The method of claim 1, wherein the first signaling is a control protocol data unit (PDU).

3. The method of claim 1, wherein the first signaling further comprises a third serial number of the first buffer state.

4. The method of claim 1, wherein the first serial number of the first data packet is configured to enable identifying a location of corresponding data in the plurality of data packets.

5. The method of claim 1, further comprising sending, from the first device to the second device, the first signaling before a reordering timer of a Packet Data Convergence Protocol (PDCP) layer of the second device expires, wherein the reordering timer is for detecting a data packet that has not been received.

6. A method, comprising:
receiving, at a second device and from a first device, a compressed second data packet;
receiving, from the first device, a first signaling before a reordering timer of a Packet Data Convergence Protocol (PDCP) layer expires, wherein the reordering timer is for detecting a data packet that has not been received, wherein the first signaling comprises a first buffer state, and wherein the first buffer state indicates content of a buffer of the first device that is based on a first data packet that is deleted, non-transmitted, and not received by the second device, wherein the content of the buffer of the first device comprises a first serial number of the first data packet and a second serial number of the compressed second data packet, wherein the first serial number of the first data packet and the second serial number of the compressed second data packet are consecutive, and wherein the second serial number follows the first serial number; and
decompressing, by the PDCP layer of the second device, the compressed second data packet using the first buffer state.

7. The method of claim 6, further comprising:
identifying that the reordering timer has expired; and
decompressing, in response to the identifying, the compressed second data packet using the first buffer state.

8. The method of claim 6, wherein before receiving the first signaling, the method further comprises:
attempting to perform decompression of the compressed second data packet;
identifying that the decompression has failed; and
storing, in response to identifying that the decompression has failed, the compressed second data packet.

9. The method of claim 6, further comprising decompressing the compressed second data packet using the first buffer state included in the first signaling when receiving the first signaling.

10. The method of claim 6, further comprising decompressing the compressed second data packet using the first buffer state indicated by the first signaling when receiving the first signaling.

11. The method of claim 6, wherein the first signaling further comprises a third serial number of the first buffer state.

12. The method of claim 6, wherein the first serial number of the first data packet is configured to enable the second device to identify a location of corresponding data in a plurality of data packets.

13. A first device comprising:
a memory configured to store instructions; and
one or more processors coupled to the memory and configured to execute the instructions to cause the first device to:
delete a first data packet without transmitting the first data packet from a plurality of data packets; and
send, in response to deleting the first data packet, from the first device a first signaling to a second device, wherein the first signaling comprises a first buffer state, wherein the first buffer state comprises content of a buffer of the first device that is based on the first data packet not sent to the second device,
wherein the first buffer state is used to compress, based on the first data packet, a second data packet or decompress, based on the first data packet, a compressed second data packet,
wherein the content of the buffer of the first device comprises a first serial number of the first data packet and a second serial number of the second data packet,
wherein the first serial number of the first data packet and the second serial number of the second data packet are consecutive,
wherein the first serial number follows the second serial number, and wherein the second device is a receiving device of the compressed second data packet and is not sent the first data packet.

14. The first device of claim 13, wherein the first signaling is a control protocol data unit (PDU).

15. The first device of claim 13, wherein the first signaling further comprises a third serial number of the first buffer state.

16. The first device of claim 13, wherein the first serial number of the first data packet is configured to enable identifying a location of corresponding data in the plurality of data packets.

17. The first device of claim 13, wherein the one or more processors are further configured to execute the instructions to cause the first device to send, to the second device, the first signaling before a reordering timer of a Packet Data Convergence Protocol (PDCP) layer of the second device expires, wherein the reordering timer is for detecting a data packet that has not been received.

* * * * *